(12) United States Patent
Hedayat et al.

(10) Patent No.: US 12,082,170 B2
(45) Date of Patent: *Sep. 3, 2024

(54) METHODS AND APPARATUS FOR SUPPORTING PRIORITIZED TRANSMISSION OPPORTUNITY (TXOP) SHARING

(71) Applicant: Charter Communications Operating, LLC, St. Louis, MO (US)

(72) Inventors: Ahmad Reza Hedayat, Carlsbad, CA (US); Amitav Mukherjee, Elk Grove, CA (US); Maulik Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,890

(22) Filed: Oct. 17, 2022

(65) Prior Publication Data

US 2023/0042554 A1    Feb. 9, 2023

Related U.S. Application Data

(63) Continuation of application No. 16/870,685, filed on May 8, 2020, now Pat. No. 11,477,781.

(51) Int. Cl.
*H04W 72/0446*    (2023.01)
*H04W 72/56*      (2023.01)
*H04W 84/12*      (2009.01)
*H04W 88/08*      (2009.01)

(52) U.S. Cl.
CPC ....... *H04W 72/0446* (2013.01); *H04W 72/56* (2023.01); *H04W 84/12* (2013.01); *H04W 88/08* (2013.01)

(58) Field of Classification Search
None
See application file for complete search history.

(56) References Cited

U.S. PATENT DOCUMENTS

| | | |
|---|---|---|
| 2018/0110046 A1* | 4/2018 | Patil ................. H04W 72/0446 |
| 2019/0021106 A1* | 1/2019 | Oteri ..................... H04L 1/0006 |
| 2019/0082387 A1* | 3/2019 | Kim .................. H04W 52/0216 |

* cited by examiner

*Primary Examiner* — Faruk Hamza
*Assistant Examiner* — Cassandra L Decker
(74) *Attorney, Agent, or Firm* — Straub & Straub; Michael P. Straub; Stephen T. Straub

(57) ABSTRACT

Methods and apparatus for supporting prioritized transmission opportunity (TXOP) sharing in wireless communications systems, e.g., various 802.11 wireless communications systems, are described. A wireless station may be allocated a transmission opportunity. A shared transmission type of trigger frame is implemented, which allows the wireless station, acting as a host station, to make available transmission resources, which have been acquired by the wireless station, to one or more guest stations. A trigger based (TB) frame, corresponding to the transmitted shared transmission type trigger frame, is used by the host station and one or more guest stations to transmit data to an access point. An access point transmits priority information, e.g., in management frames, to control the use of shared resources in TB frames corresponding to shared transmission type trigger frames. The priority information identifies which particular stations are authorized to be a guest station corresponding to a particular transmission opportunity.

20 Claims, 42 Drawing Sheets

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8-15 | RESERVED |

TRIGGER TYPE SUBFIELD ENCODING

FIGURE 6

TRIGGER FRAME FORMAT

USER INFO FIELD FORMAT

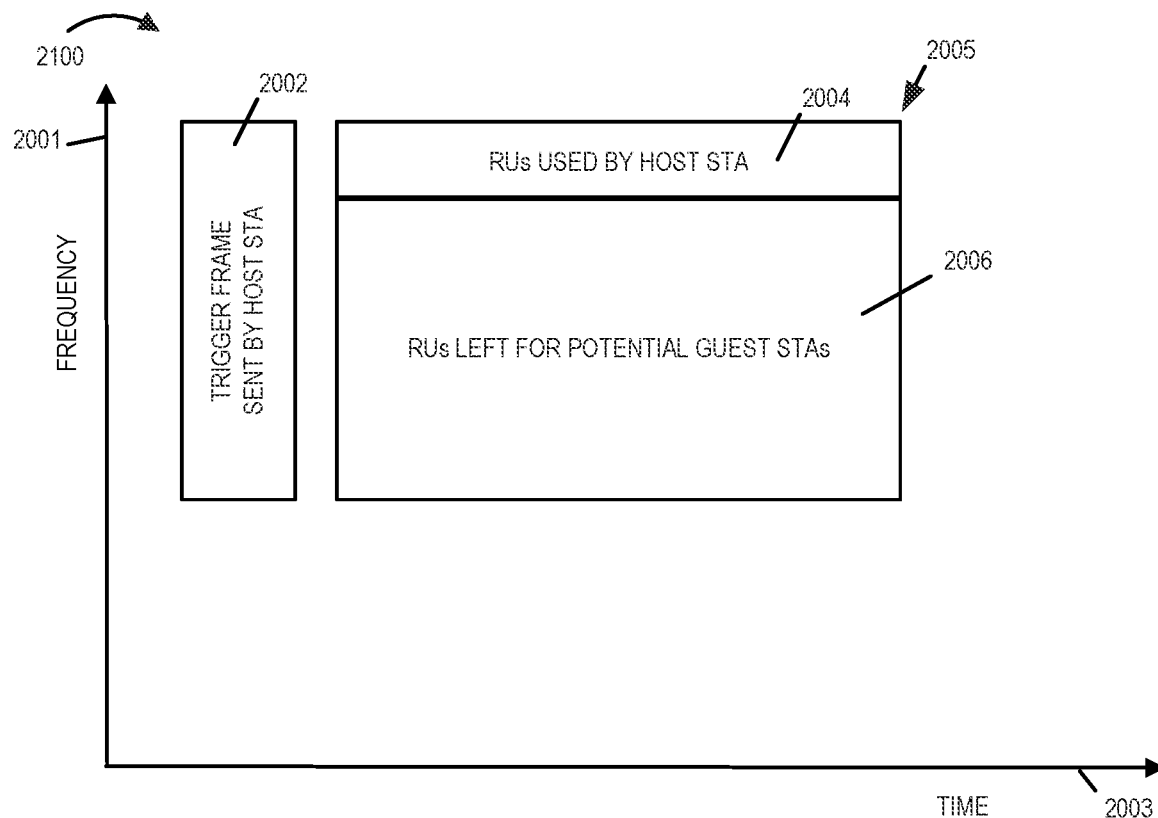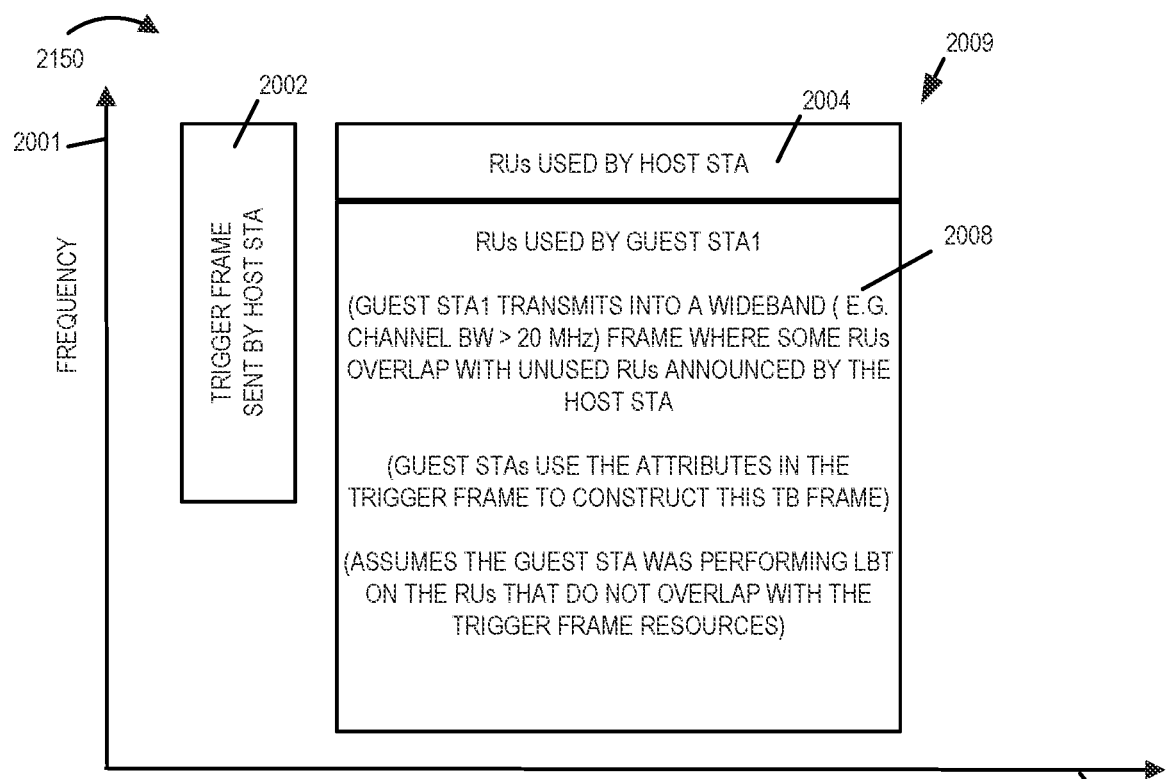
FIGURE 21

| FIGURE 28A | FIGURE 28B | FIGURE 28C |

| FIGURE 30A | FIGURE 30B | FIGURE 30C |

FIGURE 30

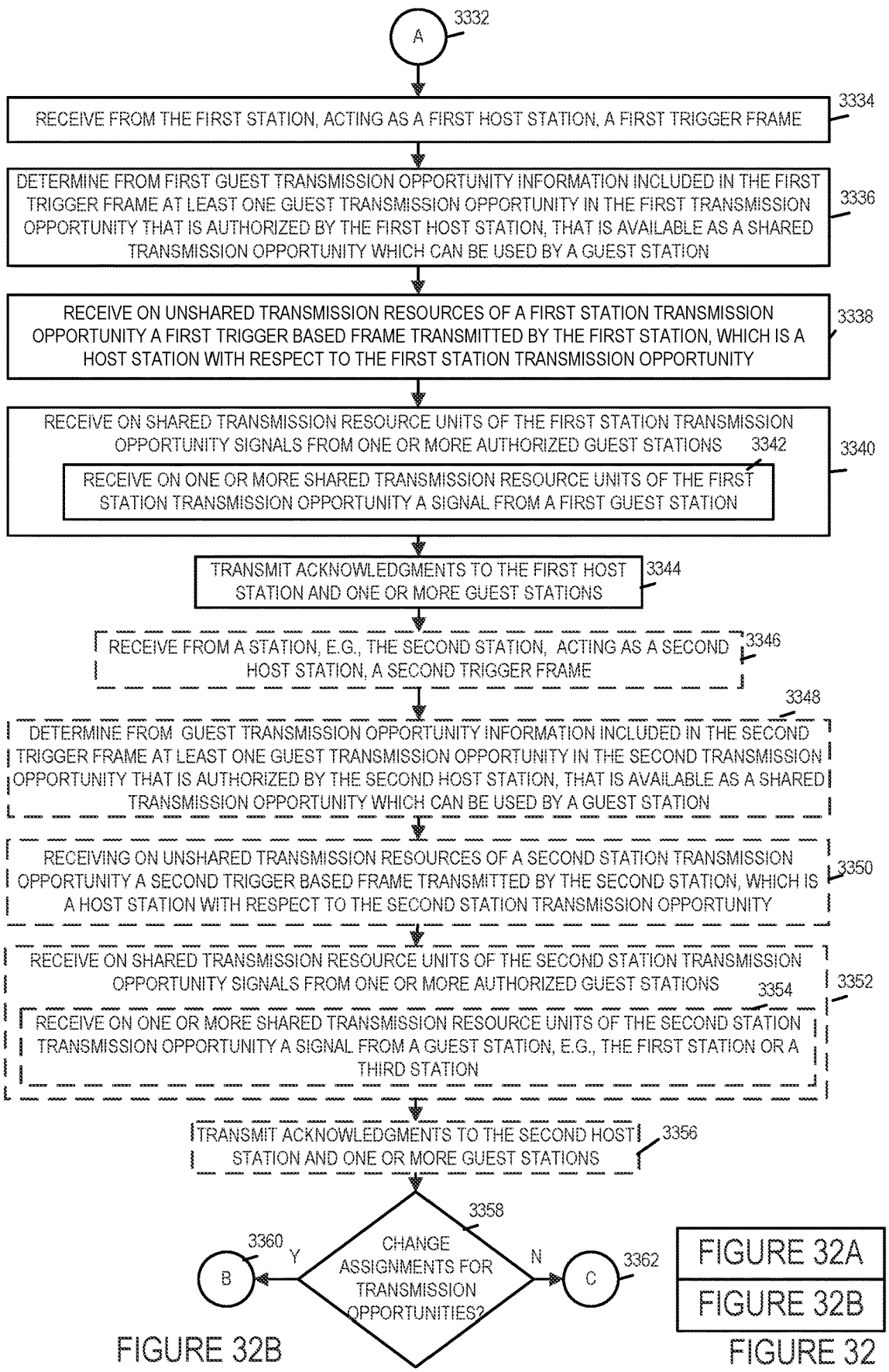

METHODS AND APPARATUS FOR SUPPORTING PRIORITIZED TRANSMISSION OPPORTUNITY (TXOP) SHARING

RELATED APPLICATIONS

The present application is a continuation of U.S. patent application Ser. No. 16/870,685 filed on May 8, 2020, which published as U.S. patent publication US 2021-0352663 A1 on Nov. 11, 2021, and which is hereby expressly incorporated by reference in its entirety.

FIELD

The present application relates to communications methods and apparatus, and more particularly, to methods and apparatus for supporting prioritized transmission opportunity sharing, e.g., facilitating low latency uplink traffic such as 802.11 uplink traffic.

BACKGROUND

The next generation 802.11/WiFi technology, 802.11be, is under development. The main candidate features that have been discussed are: larger bandwidth (e.g., 320 MHz) and more efficient utilization of non-contiguous spectrum, Multi-band/multi-channel aggregations and operation, 16 spatial streams and Multiple Input Multiple Output (MIMO) protocols enhancements, Multi-Access Point (AP) Coordination (e.g., coordinated and joint transmission), Enhanced link adaptation and retransmission protocol (e.g., Hybrid Automatic Repeat Request (HARQ)), and if needed, adaptation to regulatory rules to 6 GHz spectrum.

The 802.11be project definition is as follows: "New high-throughput, low latency applications will proliferate such a virtual reality or augmented reality, gaming, remote office and cloud computing (e.g., latency lower than 5 ms for real-time gaming). With the high throughput and stringent real-time delay requirements of these applications, users expect enhanced throughput, enhanced reliability, reduced latency and jitter, and improved power efficiency in supporting their applications over WLAN."

802.11 technologies are prone to channel access delay and variation in channel access delay, i.e., jitter. This makes 802.11/WiFi undesirable for low-latency applications such as gaming, virtual reality (VR) applications, etc.

With new 11ax/be features, especially multi-link and multi-band aggregation, there is an opportunity to tackle the channel access issue that 802.11 technologies have had.

In all 802.11 formats, there exist legacy PHY header (Legacy-Short Training Field (L-STF), Legacy-Long Training (L-LTF), Legacy-Signal (L-SIG)), originated from the first WiFi generation; 802.11a. All future versions of 802.11, in 2.4/5/6 GHz, recognize this header and defer to the framework that follows it.

FIG. 1 includes a drawing of an 802.11a message 102 illustrating message format also referred to as non-High Throughput (non-HT) format. The 802.11a non-HT message 102 includes a L-STF field, a L-LTF field, a L-SIG field, a service field (16 bits), a Physical Layer Convergence Procedure (PLCP) Service Data Unit (PSDU) field, a 6-Ngg Tail bits field, and a Pad bits field. The service field (16 bits), PSDU field, 6-Ngg Tail bits field, Pad bits field are part of the DATA portion of the message 102.

Newer generations after 11a, also search for indications after the legacy header to identify if what follows is 11n/ac/ax/be.

FIG. 1 further includes a drawing of an 802.11ac message 104 illustrating message Very High Throughput (VHT) format. The 802.11ac (VHT format) message 104 includes a L-STF field of duration TSHORT, a L-LTF field of duration TLONG, a L-SIG field of duration TSIGNAL, a VHT-SIG-A field of 8 micro-second duration, a VHT-LTF field, with each VHT-LTF symbol having a duration of 4 microsecond, a VHT-SIG-B field of 4 micro-second, a service field (16 bits), a PSDU field, and a Pad bits field, and a 6-Ngg Tail bits field. The service field (16 bits), PSDU field, Pad bits field are part of the DATA (non-LDCP case only) portion of the message 104.

FIG. 2 is a drawing 200 illustrating various 802.11ax (High Efficiency (HE) FORMATS). Drawing 200 of FIG. 2 includes an 802.11ax message 2002 illustrating HE Single User (SU) Format PLPC Protocol Data Unit (PPDU). The 802.11ax HE SU Format PPDU message 202 includes a L-STF field of 8 micro-second duration, a L-LTF field of 8 micro-second duration, a L-SIG field of 4 micro-second duration, a Repeated Legacy-Signal (RL-SIG) field of 4 micro-second duration, a HE-SIG-A field of 8 micro-second duration, a HE-STF field of 4 micro-second duration, and a field of HE-LTF symbols of variable durations per HE-LTF symbol, a data field, and a Packet Extension (PE) field. The LTF-STF field, L-LTF field and L-SIG field are included in the legacy preamble portion of the message 202. The RL-SIG field, the HE-SIG-A field, the HE-STF field and the field of HE-LTF symbols are included in the HE preamble portion of the message 202. The data field and PE field are included in the DATA portion of the message 202.

Drawing 200 of FIG. 2 further includes an 802.11ax message 204 illustrating HE extended range SU Format PPDU. The 802.11ax HE Extended Range SU Format PPDU message 204 includes a L-STF field of 8 micro-second (micro-sec) duration, a L-LTF field of 8 micro-second duration, a L-SIG field of 4 micro-second duration, a RL-SIG field of 4 micro-second duration, a HE-SIG-A field of 16 micro-second duration, a HE-STF field of 4 micro-second duration, and a field of HE-LTF symbols of variable durations per HE-LTF symbol, a data field, and a PE field. The LTF-STF field, L-LTF field and L-SIG field are included in the legacy preamble portion of the message 204. The RL-SIG field, the HE-SIG-A field, the HE-STF field, and the field of HE-LTF symbols are included in the HE preamble portion of the message 204. The data field and PE field are included in the DATA portion of the message 204.

Drawing 200 of FIG. 2 further includes an 802.11ax message 206 illustrating HE Trigger Based (TB) Format PPDU. The 802.11ax HE TB Format PPDU message 206 includes a L-STF field of 8 micro-second duration, a L-LTF field of 8 micro-second duration, a L-SIG field of 4 micro-second duration, a RL-SIG field of 4 micro-second duration, a HE-SIG-A field of 8 micro-second duration, a HE-STF field of 8 micro-second duration, and a field of HE-LTF symbols of variable durations per HE-LTF symbol, a data field, and a PE field. The LTF-STF field, L-LTF field and L-SIG field are included in the legacy preamble portion of the message 206. The RL-SIG field, the HE-SIG-A field, the HE-STF field, and the field of HE-LTF symbols are included in the HE preamble portion of the message 206. The data field and PE field are included in the DATA portion of the message 206.

Drawing 200 of FIG. 2 further includes an 802.11ax message 208 illustrating HE Multi-User (MU) Format PPDU. The 802.11ax HE MU Format PPDU message 208 includes a L-STF field of 8 micro-second duration, a L-LTF field of 8 micro-second duration, a L-SIG field of 4 micro-second duration, a RL-SIG field of 4 micro-second duration, a HE-SIG-A field of 8 micro-second duration, a HE-SIG-B field with each symbol having a duration of 4 micro-sec, a HE-STF field of 4 micro-second duration, and a field of HE-LTF symbols of variable durations per HE-LTF symbol, a data field, and a PE field. The LTF-STF field, L-LTF field and L-SIG field are included in the legacy preamble portion of the message 208. The RL-SIG field, the HE-SIG-A field, HE-SIG-B field, the HE-STF field, and the field of HE-LTF symbols are included in the HE preamble portion of the message 208. The data field and PE field are included in the DATA portion of the message 208.

In the 802.11ax PHY layer header symbols: i) the HE-STF training symbol field allows receivers to synchronize to the timing and frequency of the incoming frame before decoding the packet body; and ii) the HE-LTF is important for channel estimation, enabling beamforming and MIMO spatial diversity.

While 802.11be is under development, it is expected to have similar STF/LTF symbols.

In 802.11ax, multi-user UL transmission is enabled by exchanging of Trigger frame (from an access point (AP)) and transmission by identified/responding stations (STAs). This is shown in drawing 700 of FIG. 7. Drawing 700 of FIG. 7 includes a vertical axis 702 representing frequency, and a horizontal axis 704 representing time. Trigger frame 706 is sent (transmitted) by the AP in the downlink. Trigger based (TB) PPDUs 708 are send by STAs in the uplink including data for one or more STAs (data for STA 1 712, data for STA 2 714, . . . , data for STA m) 716. ACKs 710 are sent by the AP in the downlink.

FIG. 6 is a table 600 showing a few identified varieties of trigger frames and the Trigger Type subfield encoding corresponding to each type of trigger frame. First column 602 of table 600 lists trigger type subfield value and second column 604 of table 600 lists trigger frame variant. A Trigger Type subfield value of 0 indicates Basic. A Trigger Type subfield value of 1 indicates Beamforming Report Poll (BFRP). A Trigger Type subfield value of 2 indicates MU-BAR. A Trigger Type subfield value of 3 indicates MU-RTS. A Trigger Type subfield value of 4 indicates Buffer Status Report Poll (BSRP). A Trigger Type subfield value of 5 indicates GCR MU-BAR. A Trigger Type subfield value of 6 indicates Bandwidth Query Report Poll (BQRP). A Trigger Type subfield value of 7 indicates NDP Feedback Report Poll (NFRP). Trigger Type Subfield values of 8-15 are reserved.

FIG. 3 is a drawing 300 illustrates fields in a Trigger frame format message 302 and the corresponding number of bits 304 for each field. The Trigger frame format message 302 includes a MAC header 300, which includes a frame control field of 2 octets of bits, a duration field of 2 octets of bits, a RA field of 6 octets of bits, and a TA field of 6 octets of bits. The trigger frame format message 302 further includes a Common Info field of 8 or more octets of bits, a User Info field of variable length, a padding field of variable length and a FCS field of 4 octets of bits.

FIG. 4 is a drawing 400 which illustrates fields within Common Field 402 of the Trigger frame format message 302, the corresponding number of bits 304 for each field within the Common Field 402, and the corresponding bit designations 406 for each field within the Common field. The Common field 402 includes a trigger type field of 4 bits (B0 . . . B3), a UL field of 12 bits (B4 . . . B15), a MORE TF field of 1 bit (B16), a CS Required field of 1 bit (B17), an UL BW field of 2 bits (B18, B19), a GI and HE-LTF type field of 2 bits (B20, B21), a MU-MIMO HE-LTF mode field of 1 bit (B22) and a number of He-LTF symbols and mid-amble periodicity field of 3 bits (B23 . . . B25), an UL STBC field of 1 bit (B26), a LPDC extra symbol SEG. field of 1 bit (B27), and AP TX power field of 6 bits (B28 . . . B 33), a pre-FEC padding factor field of 2 bits (B34 . . . B35), a PE Dis-ambiguity filed of 1 bit (B36), and UL spatial Rouse field of 16 bits (B37 . . . B52), a Doppler field of 1 bit (B53), an UL He-SAG-A2 field of nine bits (B54 . . . B63), a Reserved field of 1 bit (B63) and a trigger dependent common info field of variable length.

FIG. 5 is a drawing 500 which illustrates fields within User Info Field 502 of the Trigger frame format message 302, the corresponding number of bits 504 for each field within the User Info Field 502, and the corresponding bit designations 506 for each field within the User Info field. The User Info field 502 includes an AID12 field of 12 bits (B0 . . . B11), a RU Allocation field of 8 bits (B12 . . . B19), an UL FEC Coding Type field of 1 bit (B20), an UL HE-MCS field of 4 bits (B21 . . . B24), an UL DCM field of 1 bit (B25), a SS Allocation/RA RU information field of 6 bits (B26 . . . B31), an UL target RSSI field of 7 bits (B32 . . . B38), a Reserved field of 1 bit (B39) and a Trigger Defendant User Info field of variable length.

Within the trigger frame format, the "Common info" is applicable to the whole upcoming trigger-based (TB) frame. For the individual resource portions assigned to a STA, the separate field "USER Info List" is used.

As described above with the high throughput and stringent real-time delay requirements of many new and expected future applications, users expect enhanced throughput, enhanced reliability, reduced latency and jitter, and improved power efficiency in supporting their applications. Current 802.11 technologies are prone to channel access delay and variation in channel access delay, i.e. jitter. This makes current 802.11/WiFi undesirable for low-latency applications such as gaming, virtual reality (VR) applications, etc.

Based on the above, there is a need for new methods and apparatus to improve 802.11/WiFi wireless communications particularly with regard to low-latency applications.

SUMMARY

Methods and apparatus for supporting wireless medium, e.g., wireless spectrum, sharing in wireless communications systems, e.g., various 802.11 wireless communications systems such as 802.11be wireless communications systems, are described. Various methods and apparatus are well suited for use with low latency applications. A novel shared transmission type of trigger frame is implemented, which allows a wireless station, acting as a host station, to make available transmission resources, which have been acquired by the wireless station, to one or more guest stations. A shared transmission type of trigger frame, generated and transmitted by the host station communicates information identifying the attributes of a corresponding trigger based (TB) frame, information identifying resources of the TB frame to be used by the host station and information identifying one or more set of shared resources which may be used by guest station(s). The trigger based (TB) frame, corresponding to the transmitted shared transmission type trigger frame, is used by the host station and one or more guest stations to transmit data to an access point. At different times the same wireless station may act as a host station or a guest station.

Thus, host station may, and sometimes does, make available, unused frequency-time resources, in the set of frequency channels it has acquired, to one or more guest stations, which may need those resources to maintain low latency application(s) running on the guest stations. The shared resource type trigger frame/TB frame approach, in accordance with an exemplary embodiment, provides an efficient mechanism for rapidly reallocating air link resources among a plurality of wireless stations. An individual wireless station may act as a host station during some time intervals and act as a guest station during other time intervals.

Methods and apparatus for supporting prioritized transmission opportunity (TXOP) sharing in wireless communications systems, e.g., various 802.11 wireless communications systems, are described. An access point transmits priority information, e.g., in management frames, to control the sharing of shared resources in trigger based (TB) frames corresponding to shared transmission type trigger frames which may occur in a transmission opportunity allocated to or acquired by a wireless station. The management frames in some embodiments are beacon frames. For purposes of explaining the invention, the invention will be explained in the exemplary context were management frames are beacon frames. Thus the access point, via communicating priority information in management, e.g., beacon, frames, controls access to which station(s) are allowed to be a guest station and use shared resource units made available by a host station corresponding to one more particular upcoming transmission opportunities following the transmitted beacon frame. The access point may, and sometimes does change, e.g., update, priority information, on a beacon time interval basis, in response to changing needs and/or conditions in the system, e.g., latency requirements, data requirements, etc. of the various stations being prioritized. By prioritizing particular stations and de-prioritizing others corresponding to particular transmissions opportunities where the prioritization may and sometimes does depend on which station acts as a host station during a particular transmission opportunity, or a particular beacon time interval, the likelihood that a wireless station in need of guest resource units will be able to successfully use guest resource units is increased, the likelihood of collision by multiple stations concurrently attempting to use a set of guest resource units is decreased or eliminated. In addition, a wireless station need not search all trigger based shared transmission frames, but can go to sleep and conserve power during time intervals when it has been de-prioritized by the access point.

In some embodiments the prioritization information transmitted by an AP includes mapping of a second station to a first sharing opportunity. The first sharing opportunity may be and sometimes is an opportunity where a first station, different from the first station, acts as a host station. The AP can and sometimes does indicate different priorities with regard to different transmission opportunities, e.g., with some stations being indicated as having guest station transmission opportunity priority after a number of guest station transmission opportunities have passed.

In various embodiments stations use a listen before talk (LBT) operation to determine if the station performing the LBT operation is authorized to use a transmission opportunity and thus obtain the right to act as a host station with regard to an individual transmission opportunity. In such cases, guest station priority for a given transmission opportunity may and sometimes does depend on which station acts as a host station. For this reason, in some embodiments, an AP in communicating priority information for guest stations provides priority information which depends on which station is acting as a host with regard to a given transmission opportunity. Different stations prioritized for acting as guest stations may be and sometimes are indicated for different host stations. Thus in such cases which station is authorized to act as a guest station can be determined based on which station is acting as the host station for a given transmission opportunity which will be known based on which station transmits a trigger based frame for a given transmission opportunity and the guest station priority information associated with the host station in the AP transmitted priority information.

In other embodiments an AP allocates transmission opportunities to stations, in such cases the guest station priority may be determined based on the host station associated with a transmission opportunity and guest station priority information associated with the host that was transmitted by the AP. However, in such embodiments where the AP allocates transmission opportunities to stations it may also specify guest station priorities with regard to specific transmission opportunities.

From the above it should be appreciated that guest station prioritization need not depend on the AP allocating transmission opportunities and that the AP prioritization information can be provided in a way, e.g., based on which station acts as a host, that stations can determine whether or not they are allowed to use a transmission opportunity based on a LBT operation and also which guest stations have priority once the host for a given transaction is known based on a LBT result and/or which device transmits a trigger frame indicating that guest station use of one or more transmission resources in a transmission opportunity is permitted.

In some embodiments, exemplary methods and apparatus allow a guest station, corresponding to a different BSS color, than the host station's BSS color, using trigger based (TB) frame shared resource units, made available by the host station, said TB frame corresponding to a shared transmission type of trigger frame transmitted by the host STA and including a flag indicating that guest stations of other BSS colors are allowed. An exemplary method of operating an access point, e.g., first access point, in accordance with some embodiments, comprises: transmitting, from the access point, a first management frame, e.g. a first beacon frame, including shared transmission opportunity prioritization information providing information prioritizing stations with respect to one or more shared station transmission opportunities which occur following transmission of said first management frame; and receiving on one or more shared transmission resource units of a first station transmission opportunity a signal from a first guest station.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 6 is a table showing a few identified varieties of trigger frames and the Trigger Type subfield encoding corresponding to each type of trigger frame.

FIG. 21 includes a time frequency plot illustrating an exemplary trigger frame and a corresponding TB frame in accordance with an exemplary embodiment, and a time frequency plot illustrating the trigger frame, resource units of the TB frame used by the host STA and resource units (RUs) used by exemplary guest STA1 (including some RUs of the TB frame and some RUs outside the TB frame) in accordance with an exemplary embodiment.

FIG. 30 comprises the combination of FIG. 30A, FIG. 30B and FIG. 30C.

FIG. 32B is a second part of a flowchart of an exemplary method of operating an access point (AP), in which the access point transmits shared transmission opportunity prioritization information providing information prioritizing stations with respect to one or more share transmission opportunities, in accordance with an exemplary embodiment.

FIG. 32 comprises the combination of FIG. 32A and FIG. 32B.

DETAILED DESCRIPTION

Medium sharing in uplink (UL) in accordance with various embodiment of the present invention will now be described. The principle of various embodiments, in accordance with the present invention, are based on medium sharing between stations (STAs) and AP/STAs. The medium sharing generally happens during a Transmission Opportunity (TXOP) (or Channel occupancy Time (COT)). The details described here are regarding the STAs behaviors during TXOP establishment and during frame transmission. The main aspect here is that a host STA initiates an UL transmission (either in a series of frames, i.e., a TXOP, or in a single frame) and a subset of resources are left unused for other guest STSs, e.g., with urgent and low latency (LL) traffic.

In 802.11ax and 802.11be, STAs are capable of transmitting trigger based (TB) frames after receiving a trigger from their own AP. In various embodiments, in accordance with the present invention, using this capability, additional novel STA and AP behaviors are implemented to enable medium sharing with a frame.

Note, in subsequent embodiments, symbols such as HE-SIG-A, HE-SIG-B, HE-STF and HE-LTF are named in reference to 802.11ax frame structure. However, for 802.11be, other prefixes such as ET may be used, e.g. ET-STF, etc.

Figure 8:
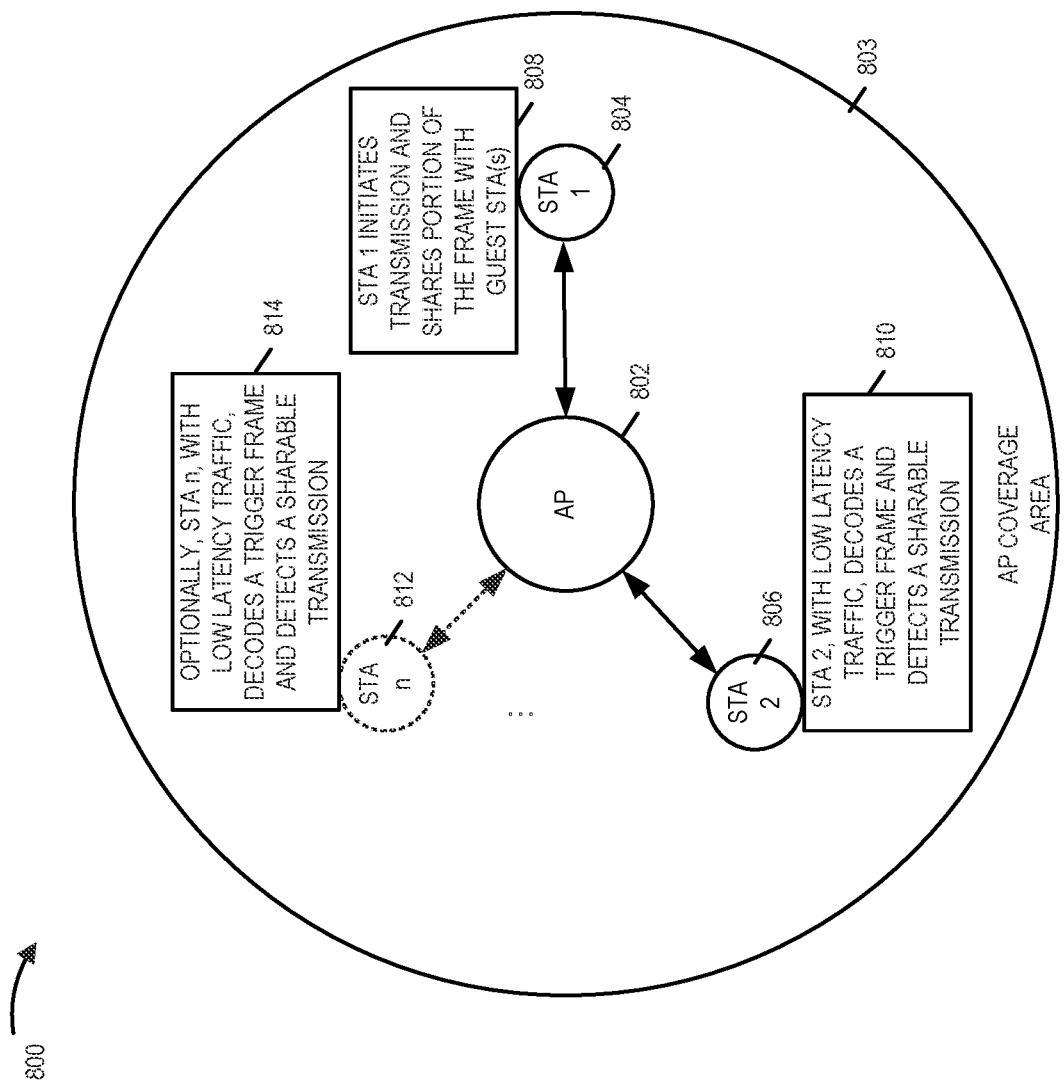
FIG. 8 is a drawing illustrating medium sharing in UL transmission in accordance with an exemplary embodiment.

FIG. 8 is a drawing 800 illustrating medium sharing in UL transmission in accordance with an exemplary embodiment. Drawing 800 includes an access point (AP) 802 with a corresponding coverage area 803, and a plurality of stations (STAs) including a host STA, which is STA 1 804, and guest STAs including STA2 806, and, optionally additional guest STAs, e.g., STA n 812. STA 1 804 initiates transmission and shares portion of the frame with guest STA(s), as indicated by block 808. STA 2 806, with low latency traffic, decodes a trigger frame, which was transmitted by STA 1 804, and detects a sharable transmission, as indicated by block 810. Optionally STA n 812, with low latency traffic, decodes the trigger frame, which was transmitted by STA 1 804, and detects a sharable transmission, as indicated by block 814.

A first exemplary embodiment of medium sharing in UL transmission will now be described. A host STA initiates UL transmission but transmits no energy on a subset of resources. The leftover resources may be, and sometimes are, used by other guest STAs, e.g., guest STA with low latency (LL) traffic, and may be of the following forms a subset of spatial streams, a subset of OFDMA resource units (RU), or both.

To announce such transmission, a trigger frame followed by trigger-based (TB) frame mechanism is used, with specific behavior by host/guest STAs and AP which are outlined in the following. The host STA may, and sometimes does, transmit a trigger frame identifying: i) the type of trigger, wherein type is: Trigger frame variant=Shared Transmission, value=8 (see row 906 of Trigger Type Subfield encoding table 900 of FIG. 9); and ii) a list of left over frequency resources (e.g., set of RUs or 20 MHz sub-bands unused by the host STA). In some embodiments, this list is specified in an additional User Info field (see guest info 1 1010, . . . guest info m 1012 of user info list 1006 of trigger frame format 1010 of FIG. 10). Alternatively, there may be only one "User info" which is the Host info (see host info 1008 of trigger frame format 1010 of FIG. 10). the RUs listed in the Host info are the only RUs used by the host STA, and the remaining RUs (out of all possible RUs) are the shared RUs, available for one or more guest STA. The MCS to be used for the leftover RUs may, also be, and sometimes are, specified by the host STA. If none are specified it is assumed by the guest STAs and the AP that the same MCS as the one used by the host STA (for its own RUS) is used.

The PHY header attributes of the next TB frame, e.g. SIG-A and especially the number of LTF symbols (e.g., HE LTF) can be obtained from the common info field of the trigger frame.

The host STA transmits the TB frame and does not transmit in the leftover RU (identified in the trigger frame.

Figure 9:
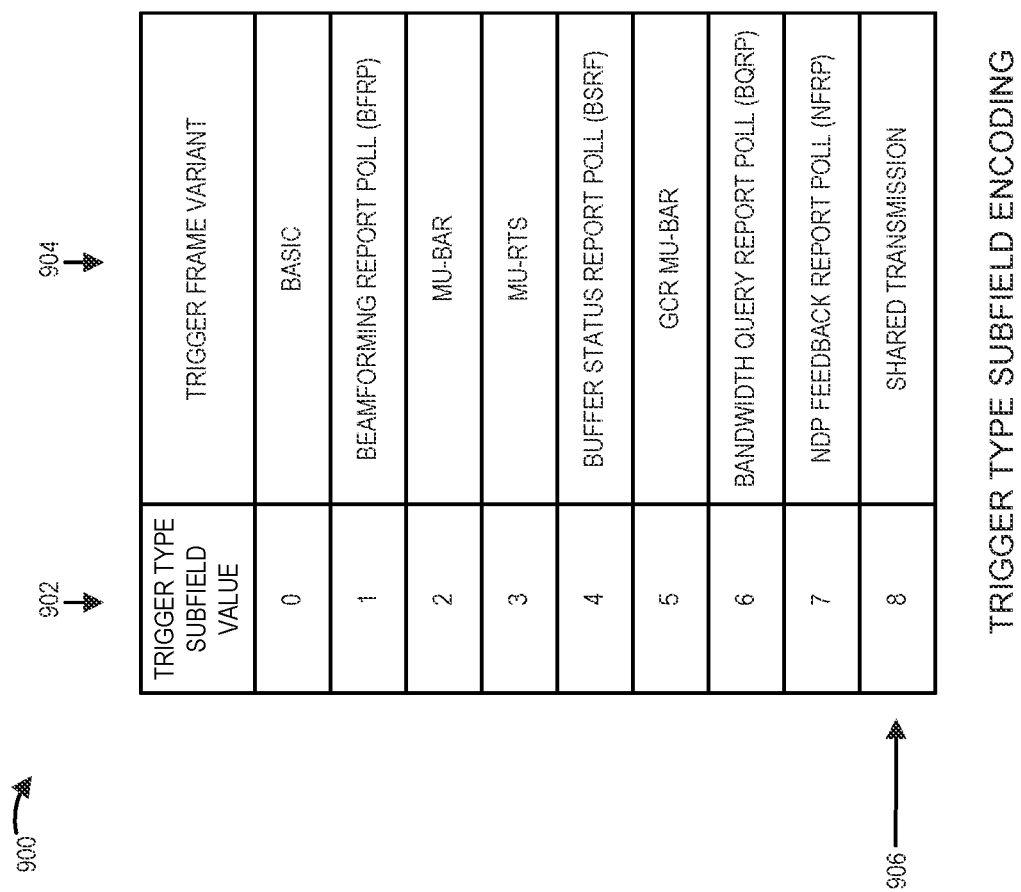
FIG. 9 is a table including a list of different trigger frames and the Trigger Type subfield encoding corresponding to each type of trigger frame, said list of different trigger frame times including a Shared Transmission Trigger Frame type, in accordance with an exemplary embodiment.

FIG. 9 is a table 900 showing identified varieties of trigger frames and the Trigger Type subfield encoding corresponding to each type of trigger frame in accordance with an exemplary embodiment. First column 902 of table 900 lists trigger type subfield value and second column 904 of table 900 lists trigger frame variant. A Trigger Type subfield value of 0 indicates Basic. A Trigger Type subfield value of 1 indicates Beamforming Report Poll (BFRP). A Trigger Type subfield value of 2 indicates MU-BAR. A Trigger Type subfield value of 3 indicates MU-RTS. A Trigger Type subfield value of 4 indicates Buffer Status Report Poll (BSRP). A Trigger Type subfield value of 5 indicates GCR MU-BAR. A Trigger Type subfield value of 6 indicates Bandwidth Query Report Poll (BQRP). A Trigger Type subfield value of 7 indicates NDP Feedback Report Poll (NFRP). Row 906 indicates that a trigger type subfield value of 8 indicates Shared Transmission.

Figure 10:
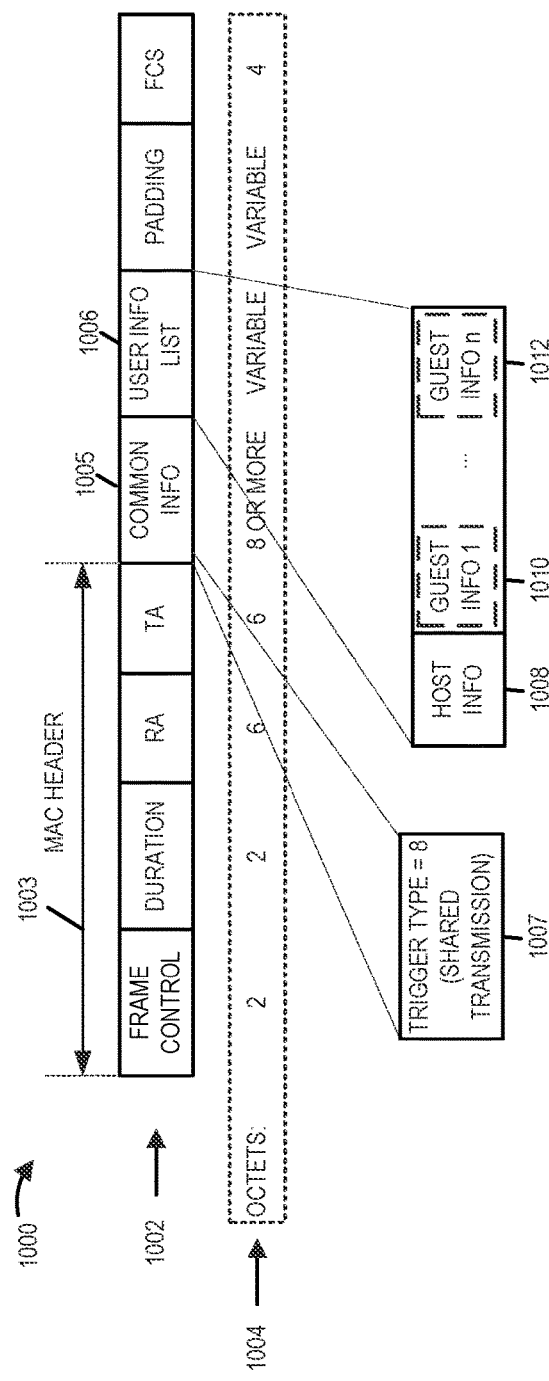
FIG. 10 is a drawing illustrating fields in an exemplary Trigger frame format message in accordance with an exemplary embodiment, and the corresponding number of bits for each field of the trigger frame.

FIG. 10 is a drawing 1000 illustrates fields in an exemplary Trigger frame format message 1002, in accordance with an exemplary embodiment, and the corresponding number of bits 1004 for each field. The Trigger frame format message 1002 includes a MAC header 1000, which includes a frame control field of 2 octets of bits, a duration field of 2 octets of bits, a RA field of 6 octets of bits, and a TA field of 6 octets of bits. The trigger frame format message 1002 further includes a Common Info field 1005 of 8 or more octets of bits, a User Info field 1006 of variable length, a padding field of variable length and a FCS field of 4 octets of bits.

Common Info field 1005 a trigger type subfield field 1007 including a trigger type value of 8 indicating "Shared Transmission".

User info list field 1006 includes a host information field 1008, and in some embodiments, includes one or more guest information fields (guest info 1 field 1010, . . . , guest info n field 1012).

Figure 11:
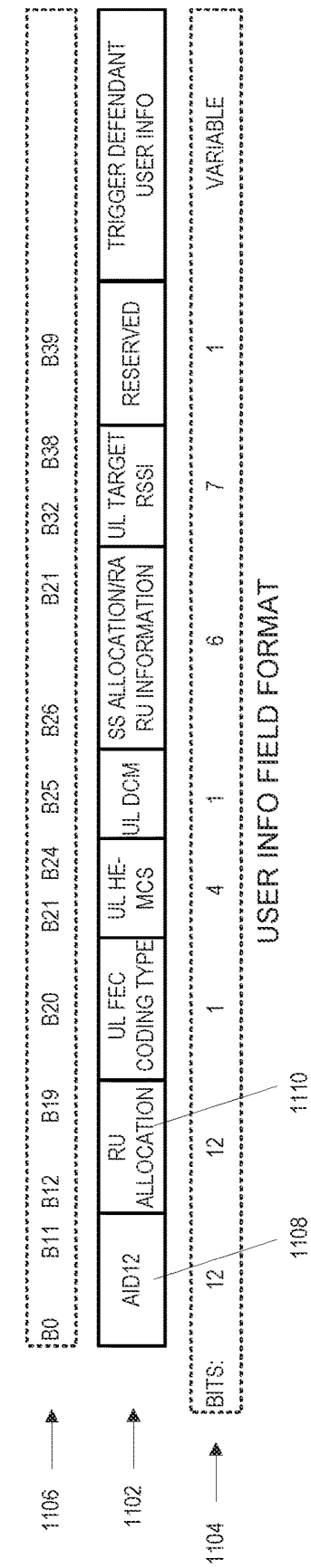
FIG. 11 is drawing illustrating a User Info field format for a User Info field within a User Info List field within a Trigger Frame message, in accordance with an exemplary embodiment, the corresponding number of bits for each field within the user info field, and the corresponding bit designations for each field within the User Info field.

FIG. 11 is drawing 1100 illustrating User Information field format 1102 for a User Info field within a user info list field within a Trigger Frame message, in accordance with an exemplary embodiment, the corresponding number of bits 1004 for each field within the user info field, and the corresponding bit designations 1106 for each field within the User Info field. Exemplary User Info fields, for which the User Info field format is used, include, e.g., host info field 1008, guest info 1 field 1010 and guest info n field 1012.

FIG. 11 is a drawing 1100 which illustrates fields within User Info Field 1102 of the Trigger frame format message 1002, the corresponding number of bits 1104 for each field within the User Info Field 1102, and the corresponding bit designations 1106 for each field within the User Info field. The User Info field 1102 includes an Association ID12 (AID12) field 1108 of 12 bits (B0 . . . B11), a RU Allocation field 1110 of 8 bits (B12 . . . B19), an UL FEC Coding Type field of 1 bit (B20), an UL HE-MCS field of 4 bits (B21 . . . B24), an UL DCM field of 1 bit (B25), a SS Allocation/RA RU information field of 6 bits (B26 . . . B31), an UL target RSSI field of 7 bits (B32 . . . B38), a Reserved field of 1 bit (B39) and a Trigger Defendant User Info field of variable length.

Figure 12:
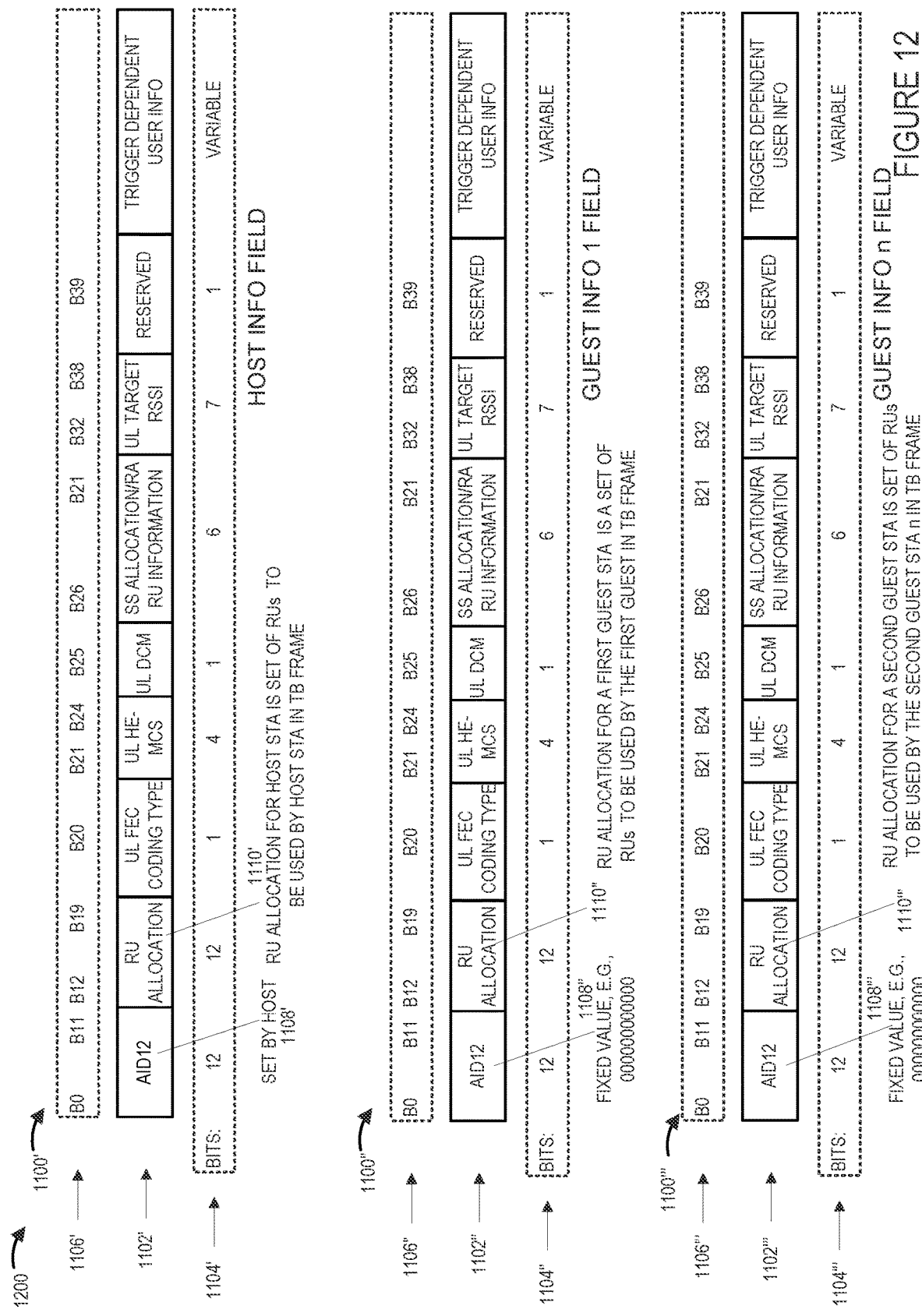
FIG. 12 is a drawing which illustrates exemplary User Information fields for an example in which a Trigger Frame, which is generated and transmitted by a host STA includes a trigger type value=8 signifying "Shared Transmission", and the User Info list field of the Trigger Frame includes a Host Information field, a Guest Information 1 field and a Guest Information n field, in accordance with an exemplary embodiment.

FIG. 12 is a drawing 1200 which illustrates exemplary user information fields for an example in which a trigger message, which is generated and transmitted by a host STA includes a trigger type value=8 (which is part of the common information field (bits B0-B3)) of trigger frame message in accordance with the format of 1002, and the user info list 1006 includes host information 1008, guest information 1 1010 and guest information n 1012. Drawing 1200 includes drawing 1100' representing the host information field 1008, drawing 1100" representing guest information 1 1010 field, and drawing 1100''' representing guest information n field 1012.

Drawing 1100' which illustrates fields within User Info Field 1102' (representing host info field 1008) of the Trigger frame format message 1002, the corresponding number of bits 1104' for each field within the User Info Field 1102, and the corresponding bit designations 1106' for each field within the User Info field. The value of the AID12 field 1108' is set by the host STA, e.g., the 12 least significant bits of the association identifier of the host STA. The value of RU allocation filed 1110' includes the RU allocation for the host STA and identifies a set of RUs to be used by the host STA in the TB frame.

Drawing 1100" which illustrates fields within User Info Field 1102" (representing guest info 1 field 1010) of the Trigger frame format message 1002, the corresponding number of bits 1104' for each field within the User Info Field 1102, and the corresponding bit designations 1106' for each field within the User Info field. The value of the AID12 field 1108" is set, by the host STA, to a fixed value, e.g. 000000000000, to indicate availability for guest STAs. The value of RU allocation filed 1110" includes the RU allocation for a first guest STA and identifies a set of RUs to be used by the first guest STA in the TB frame. Note that some of the fields within User Info Field 1102" (representing guest info 1 field 1010) may be left as reserved values, since the guest STA does not have enough information about the guest STAs to provide reasonable values. Alternatively, a subset of the fields in User Info Field 1102" may be provided by the guest STA.

Drawing 1100' which illustrates fields within User Info Field 1102''' (representing guest info 2 field 1012) of the Trigger frame format message 1002, the corresponding number of bits 1104" for each field within the User Info Field 1102, and the corresponding bit designations 1106" for each field within the User Info field. The value of the AID12 field 1108' is set by the host STA to a fixed value, e.g. 000000000000, to indicate availability for guest STAs. The value of RU allocation field 1110''' includes the RU allocation for a second guest STA and identifies a set of RUs to be used by the second guest STA in the TB frame. Note that some of the fields within User Info Field 1102''' (representing guest info 2 field 1012) may be left as reserved values, since the guest STA does not have enough information about the guest STAs to provide reasonable values. Alternatively, a subset of the fields in User Info Field 1102''' may be provided by the guest STA.

In some embodiments, the first guest STA is different than the second guest STA. Thus in some embodiments, a guest STA is only allowed to use one set of guest STA resources.

In some embodiments, the first and second guest STA can be, and sometimes is the same guest STA. Thus, in some embodiments, a guest STA is allowed to use multiple sets of guest resources which the host STA has indicated to be available.

Figure 13:
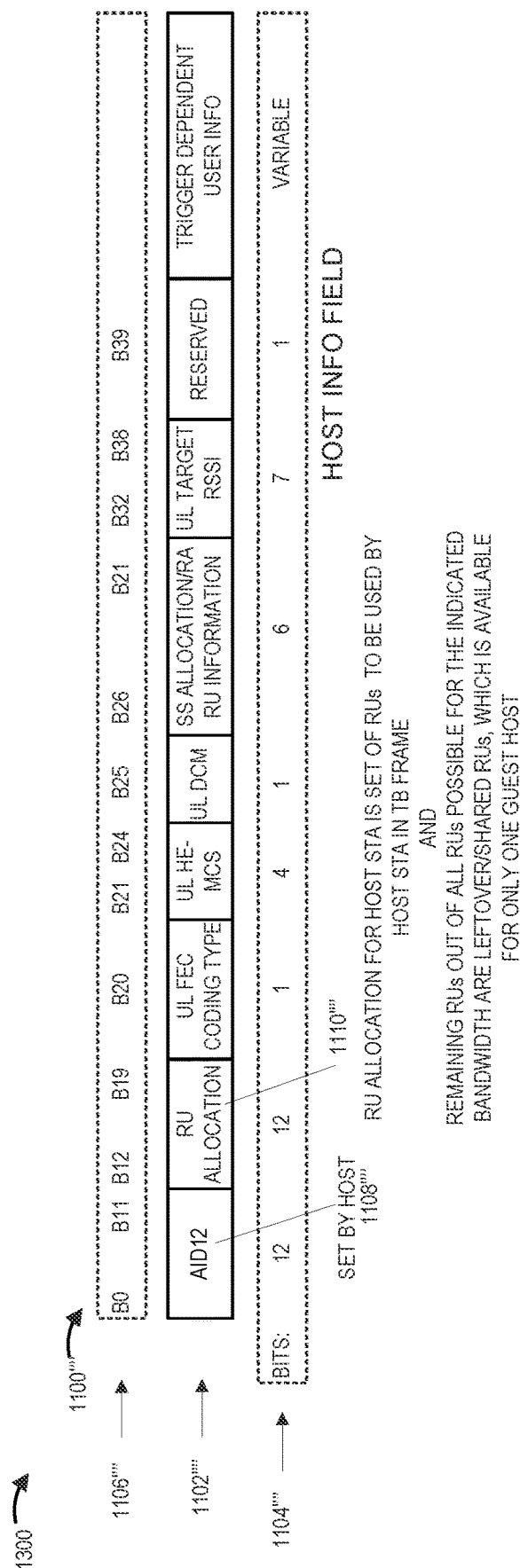
FIG. 13 is a drawing which illustrates an exemplary User Information field for an example in which a Trigger Frame, which is generated and transmitted by a host STA includes a trigger type value=8 signifying "Shared Transmission" and the User Info List field includes a Host Information field but does not include any Guest Info Fields, indicating that the resources units (RUs) which are not being used by the Host STA may be used by a single guest STA, in accordance with an exemplary embodiment.

FIG. 13 is a drawing 1300 which illustrates exemplary user information field for an example in which a trigger message, which is generated and transmitted by a host STA includes a trigger type value=8 (which is part of the common information field (bits B0-B3)) of trigger frame message in accordance with the format of 1002'''', and the user info list 1006 includes host information 1008. Drawing 1300 includes drawing 1100'''' representing the host information field 1008. In this exemplary embodiment, there may only be one "User info", which is the Host info (the User Info list consists of only host info). The value of the AID12 field 1108'''' is set by the host STA. The RUs (RU Allocation) 1110'''' listed in the Host Info 1102'''' (representing host info field 1008) are the RUs used by the host STA, and the remaining RUs (out of all possible RUs for the indicated bandwidth) are the leftover/shared RUs, which is available for only one guest host.

Various operation performed by a guest STA aiming to transmit on the leftover RUs will now be described. The guest STA, which has received the Trigger Frame transmitted by the Host STA, identifies if the trigger frame is of type "Shared Transmission". If the guest STA identifies that the received Trigger frame is of the type "Shared Transmission", the guest STA identifies the leftover RUs and then uses the trigger frame to sync with the host STA (to align with the upcoming TB frame).

Next the guest STA performs Point Coordination Function (PCF) Inter Frame Space (IFS) (PIFS) (Listen-Before-Talk (LBT) CAT2) back-off before transmission. Other categories of LBT may, and sometimes are, also used, as long as the alignment with the following TB frame is ensured. The type of channel sensing (LBT category) may also be, and sometimes is, identified within the "CS required" field in the Common Info.

The guest STA constructs the PHY header of the TB frame as follows. The guest STA constructs the legacy portion of the TB frame using the same attributes found in the legacy portion of the trigger frame, particularly the duration field in the L-SIG and RL-SIG. In some embodiments, the guest STA leaves the HE SIG-A field of the TB frame empty or constructs the HE SIG-A of the TB frame using the attributes in the trigger frame.

The guest STA transmits the HE-STF in the leftover RUs only.

The same number of HE-LTF as indicated in the trigger frame is transmitted and on the leftover RUs only.

Then the MAC payload, with the same Modulation and Coding Scheme (MCS) and MAC Protocol Data Unit (MPDU) size identified in the trigger frame is sent. If no MCS is identified for guest STA, then the same MCS of the host STA is used. This is to allow the AP to decode the guest STAs' payload with similar receiver processes as in 11ax. But, it is possible to allow variations if the AP can process the payload beyond 11 ax receiver process, and some embodiments, in which the AP can process the payload beyond flax receiver process, allow variations with regard to MCS. For example, a guest STA may use the +/−1 or +/−2 steps with respect to the MCS identified by the host STA in the trigger frame. The AP may attempt decoding the guest STA payload with each of these MCSs, e.g., when processing a received TB frame including information from a host STA and one or more guest STAs.

An AP receiving such an uplink (UL) TB frame (UL TB frame in response to a Trigger Frame (Shared Transmission Type)) e.g., UL Orthogonal Frequency-Division Multiple Access (OFDMA) TB frame, performs the following. The AP processes the portion of the RUs belonging to the guest STAs as usual. The AP processes the portion of the RUs belonging to the guest STA(s) using the attributes (e.g., in the physical header or in the individual STA portions) of the trigger frame sent by the host STA. These attributes include MCS, number of spatial streams, etc. The AP may, and in some embodiments, does, provide ACK (for the host STA and guest STA(s) after the UL TB frame, e.g. UL OFDMA TB frame.

There may be, and sometimes are, collisions among multiple guest STAs using the same RUs. To reduce the chance of collision, the AP may, and in some embodiments does, restrict using the host STAs' frame to a limited set of STAs, e.g., with low latency traffic, etc. If the AP detects collision among multiple guest STAs, the AP may, and in some embodiments, does indicate such in the following ACK frame in order for the guest STA to perform a back-off. In some embodiments, a separate and new backoff category may be identified such. This is in order to allow a guest STA to keep its original backoff for the respective access category.

To enhance coexistence, in some embodiments, a guest STA may attempt to use the host TB frame only if the detected strength (e.g., Received Signal Strength Indicator (RSSI)) of the host frame passes a threshold, e.g., a threshold configured by the AP or indicated in the Trigger frame sent by the host STA. This reduces the chance of additional hidden nodes.

Figure 14:
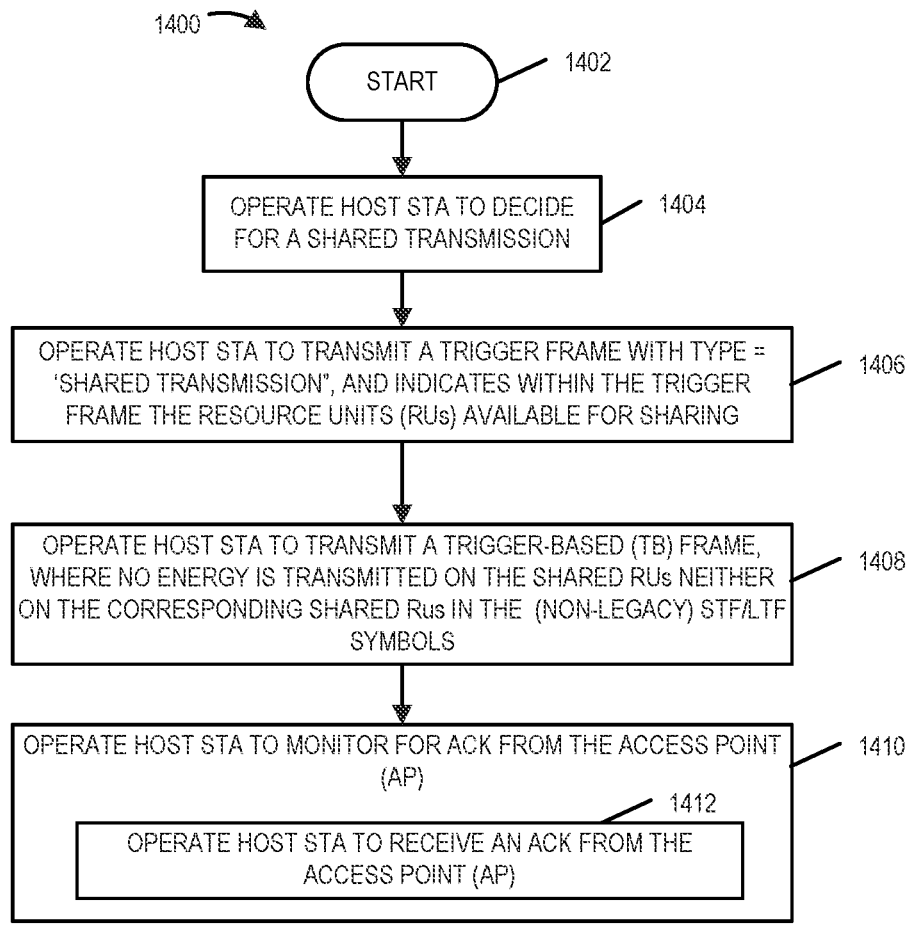
FIG. 14 is a flowchart of an exemplary method of operating a host station (STA) in accordance with an exemplary embodiment.

FIG. 14 is a flowchart 1400 of an exemplary method of operating a host station (STA), e.g., host STA 1 804 of FIG. 8, in accordance with an exemplary embodiment. Operation starts in step 1402 in which the host STA is powered on and initialized. Operation proceeds from step 1402 to step 1404. In step 1404 the host STA decides for a shared transmission. Operation proceeds from step 1404 to step 1406. In step 1406 the host STA transmits a trigger frame with type='shared transmission" and indicates within the trigger frame the resource units (RUs) available for sharing. Operation proceeds from step 1406 to step 1408. In step 1408 the host STA transmits a trigger based (TB) frame, where no energy is transmitted in the shared resource units (RUs) neither on the corresponding shared RUs in the (non-legacy) STF/LTF symbols. Operation proceeds from step 1408 to step 1410.

In step 1410 the host STA monitors for an ACK from the access point (AP). Step 1410 may, and sometimes does, include step 1412 in which the host STA receives and ACK for the access point (AP) in response to the transmitted TB frame.

Figure 15:
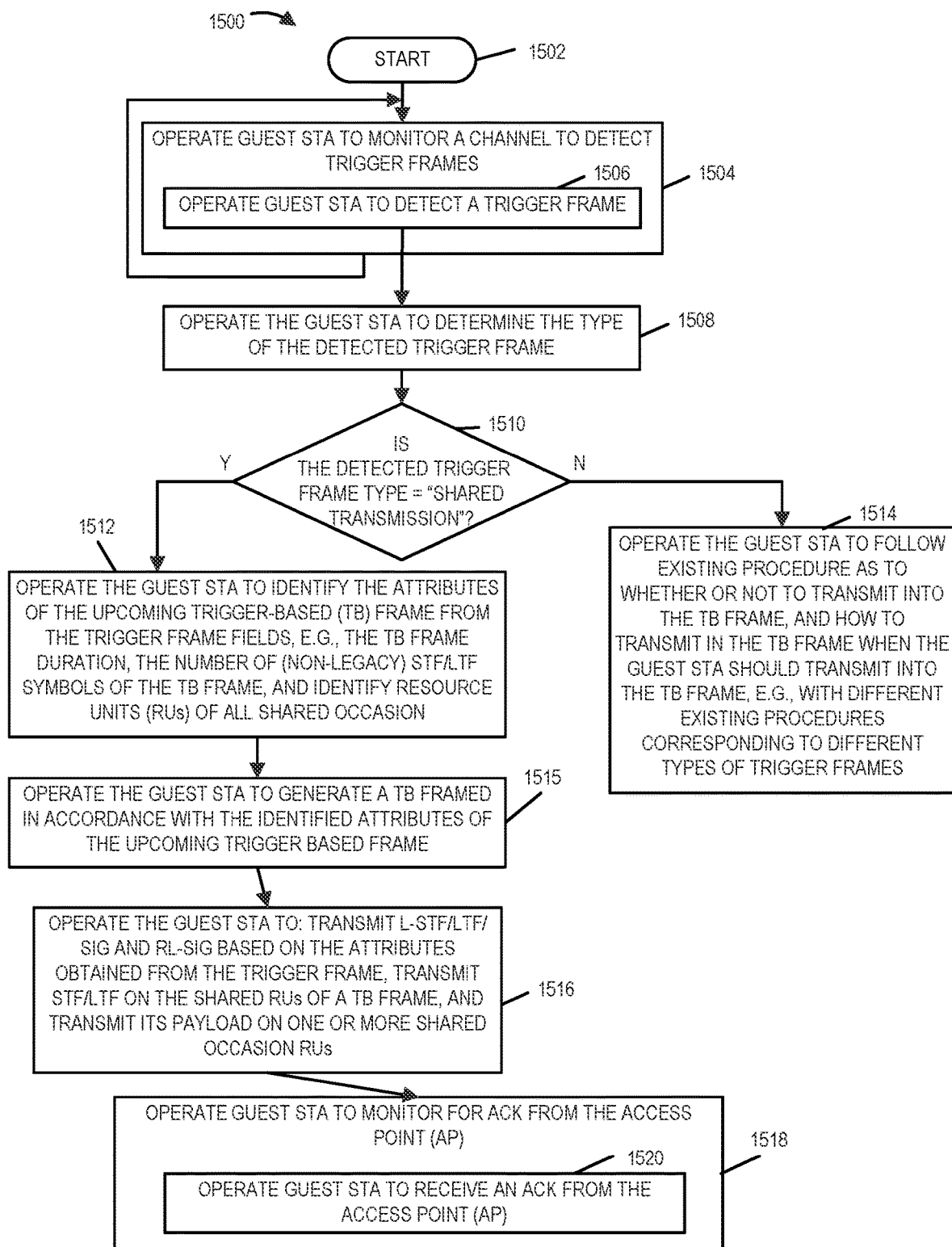
FIG. 15 is a flowchart of an exemplary method of operating a guest station (STA) in accordance with an exemplary embodiment.

FIG. 15 is a flowchart 1500 of an exemplary method of operating a guest station (STA), e.g. guest STA 2 806 of FIG. 8, in accordance with an exemplary embodiment. Operation starts in step 1502 in which the guest STA is powered on and initialized. Operation proceeds from start step 1502 to step 1504. In step 1504 the guest STA monitors a channel to detect trigger frames. Step 1504 may, and sometimes does, include step 1506 in which the guest STA detects a trigger frame. Operation proceeds from step 1506 to step 1508. In step 1508 the guest STA determines the type of detected trigger frame, e.g., one of types of trigger frames listed in table 900 of FIG. 9. Operation proceeds from step 1508 to step 1510.

In step 1510 the guest STA determines if the detected trigger frame type="shared transmission". If the detected trigger frame type is shared transmission, then operation proceeds from step 1510 to step 1512. However, if the detected trigger frame type is not shared transmission, then operation proceeds from step 1510 to step 1514, in which the guest STA is operated to follow existing procedures as to whether or not to transmit into the TB frame, and how the guest STA should transmit into the TB frame when the guest STA should transmit into the TB frame, e.g., with different existing procedures corresponding to different types of trigger frames.

Retuning to step 1512, in step 1512 the guest STA identifies the attributes of the upcoming trigger-based (TB) frame from the trigger frame fields, e.g., the TB frame duration, the number of (non-legacy) STF/LTF symbols of the TB frame, and identifies resource units (RUs) of all shared occasion. With the attributes of the upcoming trigger-based frame having been identified, operation proceeds from step 1512 to step 1515 in which the guest station generates a TB frame based on the identified attributes. In some but not necessarily all embodiments step 1515 includes generating at least one legacy symbol, said at least one legacy symbol being a Legacy STF symbol, LTF symbol or SIG symbol and generating at least one non-legacy STF symbol or non-legacy LTF symbol.

Operation proceeds from step 1512 to step 1516.

In step 1516 the guest STA: transmits L-STF/LTF/SIG and RL-SIG based on the attributes obtained from the trigger frame, transmits STF/LTF on the shared RUs of a TB frame, and transmits its payload on one or more shared occasion RUs. Transmitting the generated trigger based frame includes, in some embodiments transmitting the generated non-legacy symbol on the shared resources of the non-legacy STF or LTF portion of the generated trigger based frame (e.g. only transmits on the shared resources of the non-legacy STF/LTF). Operation proceeds from step 1516 to step 1518.

In step 1518 the guest STA monitors for an acknowledgment (ACK) from the access point (AP). Step 1518 may, and sometimes does, include step 1520 in which the guest STA receives an ACK from the access point.

Figure 16:
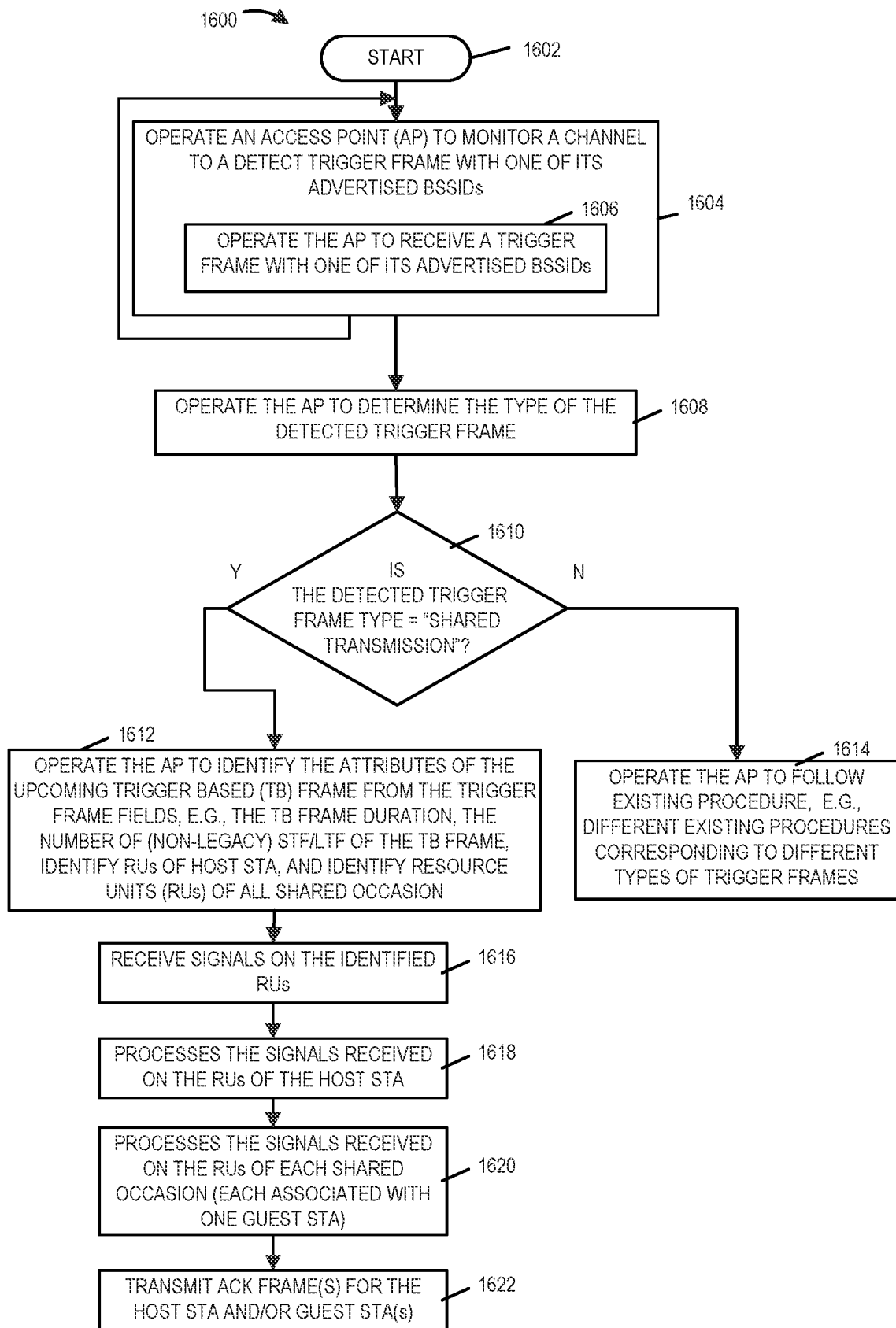
FIG. 16 is a flowchart of an exemplary method of operating an access point (AP) in accordance with an exemplary embodiment.

FIG. 16 is a flowchart 1600 of an exemplary method of operating an access point (AP), e.g., AP 802 of FIG. 8, in accordance with an exemplary embodiment. Operation starts in step 1602 in which the AP is powered on and initialized. Operation proceeds from step 1602 to step 1604.

In step 1604 the AP monitors a channel to detect trigger frame with one of its advertised Basic Service Set Identifiers (BSSIDs). Step 1604 may, and sometimes does, include step 1606 in which the AP receives a trigger frame with one of its advertised BSSIDs. Operation proceeds from step 1604 to step 1606.

In step 1606 the AP determines the type of the detected trigger frame, e.g., one of the various types of trigger frames included in table 900 of FIG. 9. Operation proceeds from step 1608 to step 1610.

In step 1610 the AP determines if the detected trigger frame type="shared transmission". If the detected trigger frame type is shared transmission, then operation proceeds from step 1610 to step 1612. However, if the detected trigger frame type is not shared transmission, then operation proceeds from step 1610 to step 1614, in which the AP is operated to follow existing procedure, e.g., with different existing procedures corresponding to different types of trigger frames.

Retuning to step 1612, in step 1612 the AP identifies the attributes of the upcoming trigger-based (TB) frame from the trigger frame fields, e.g., the TB frame duration, the number of (non-legacy) STF/LTF symbols of the TB frame, identifies RUs of host STA and identifies resource units (RUs) of all shared occasion. Operation proceeds from step 1612 to step 1616.

In step 1616 the AP receives signals on the identified RUS. Operation proceeds from step 1616 to step 1618. In step 1618 the AP processes the signals receives on the RUs of the host STA. Operation proceeds from step 1618 to step 1620. In step 1620 the AP processes the signals received on the RUs of each shared occasion, e.g., each associated with one guest STA. Operation proceeds from step 1620 to step 1622.

In step 1622 the AP transmits ack frame(s) for the host STA ad/or guest STA(s).

Figure 17:
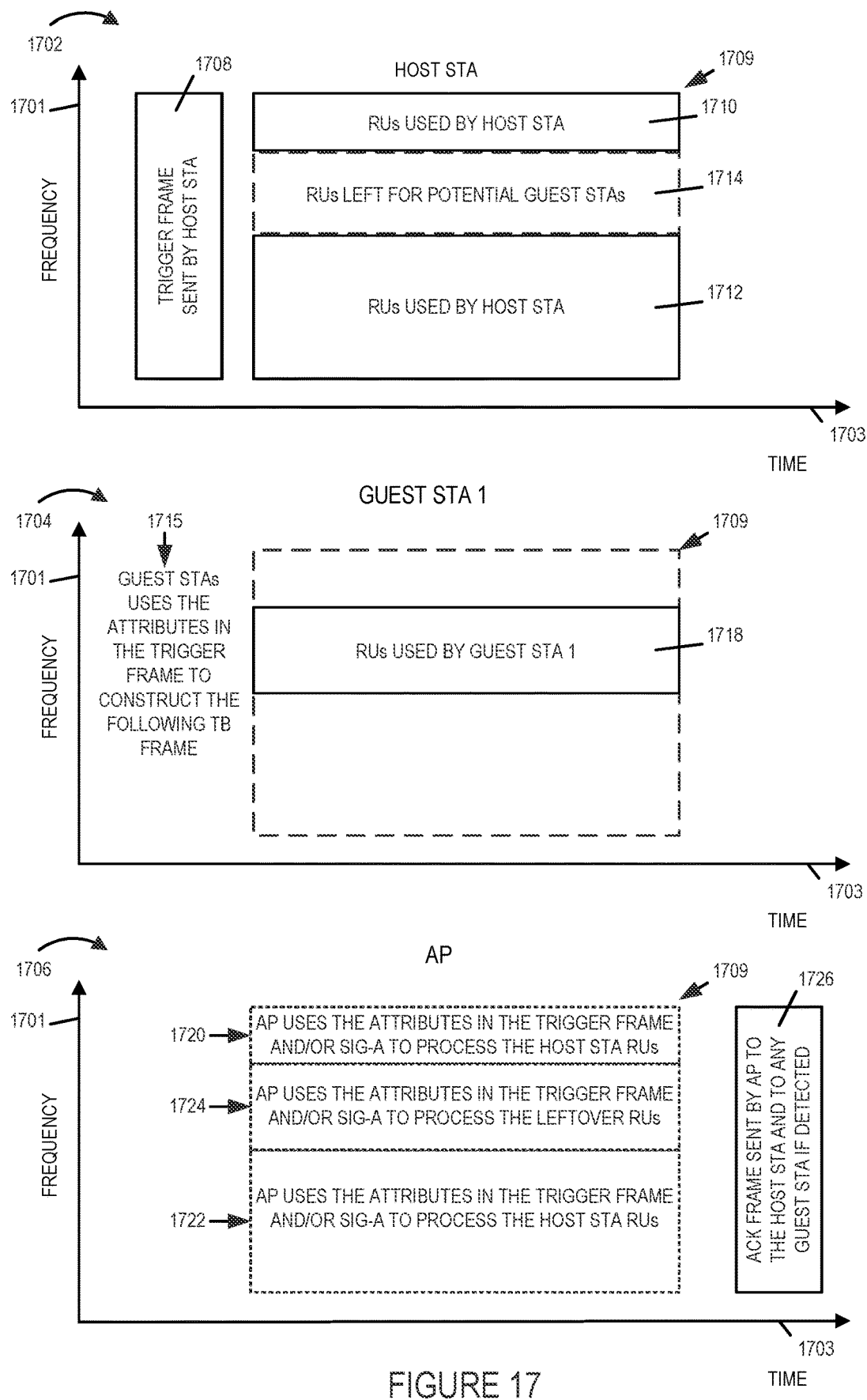
FIG. 17 includes a time frequency plot for each of an exemplary host station, guest station and an access point, for an example of resource sharing in UL transmission in accordance with an exemplary embodiment.

FIG. 17 includes a time frequency plot for each of an exemplary host station, guest station and an access point, for an example of resource sharing in UL transmission in accordance with an exemplary embodiment. Drawing 1702 of FIG. 17 is a time frequency plot for a host STA in accordance with an exemplary embodiment. Drawing 1704 of FIG. 17 is a time frequency plot for a guest STA, e.g., guest STA 1, in accordance with an exemplary embodiment. Drawing 1706 of FIG. 17 is a time frequency plot for an AP in accordance with an exemplary embodiment.

Host STA time frequency plot 1702 includes a vertical axis 1702 representing frequency and a horizontal axis 1703 representing time. Trigger frame 1708 is generated and sent, e.g. transmitted, by the host STA. Block 1709 represents the total resources the TB frame. Resource units 1710 and 1712 of the TB frame 1709 are used by the host STA, which transmits into those resources. RUs 1714 of the TB frame 1709 are left for potential guest STAs.

Guest STA time frequency plot 1704 includes a vertical axis 1702 representing frequency and a horizontal axis 1703 representing time. The guest STA receives and processes the trigger frame 1708. In step 1715 the guest STA(s) use the attributes in the received trigger frame to construct the TB frame (1716). RUs 1718 of the TB frame 1709 are used by the guest station 1 to transmit.

AP time frequency plot 1706 includes a vertical axis 1702 representing frequency and a horizontal axis 1703 representing time. The AP receives the trigger frame transmitted by the host STA and recovers communicated information, and the AP receives the TB frame and recovers the communicated information from the host STA and guest STA 1. In steps 1720 and 1722 the AP uses the attributes in the trigger frame and/or SIG-A to process the Host STA RUs. In steps 1724 the AP uses the attributes in the trigger frame and/or SIG-A to process leftover RUs. The AP generates and sends, e.g., transmits, ACK frame 1726 to the host STA and to any guest STAs if detected.

Figure 18:
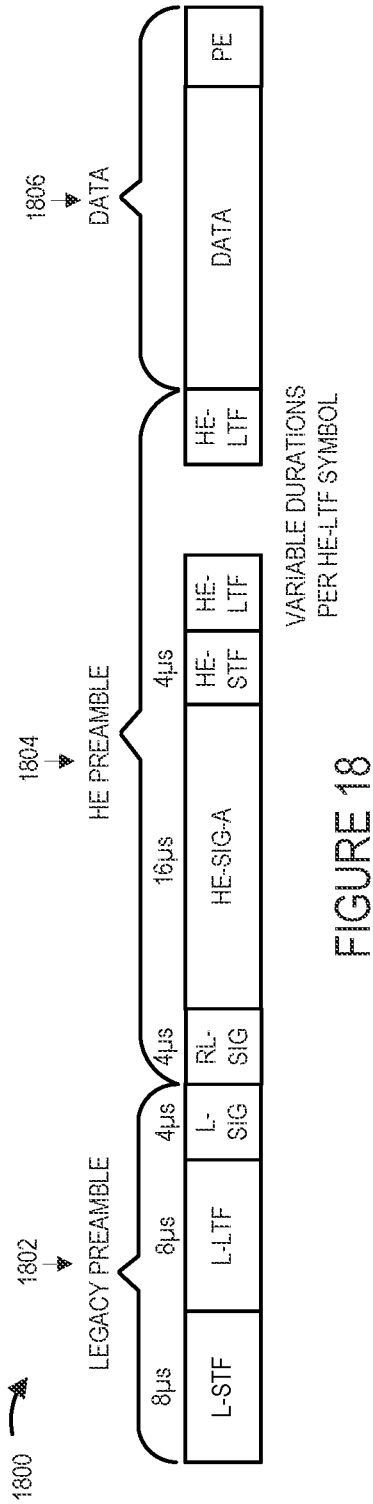
FIG. 18 is a drawing of an exemplary TB frame generated and transmitted by a guest STA in accordance with an exemplary embodiment.

FIG. 18 is a drawing of an exemplary TB frame 1800 generated and transmitted by a guest STA in accordance with an exemplary embodiment. Exemplary TB frame 1800, generated and transmitted by a guest STA, includes a legacy preamble portion 1802, a HE preamble portion 1804 and a data portion 1806. Legacy preamble 1802 includes a 8 micro-second L-STF, a 8 micro-second L-LTF, and a 4 micro-second L-SIG. HE preamble 1804 includes a 4 micro-second RL-SIG, a 16 micro-second HE-SIG-A, a 4 microsecond HE-STF and one or more HE-LTF symbols (variable duration per HE-LTF symbol). Data portion 1806 includes data and PE.

Figure 19:
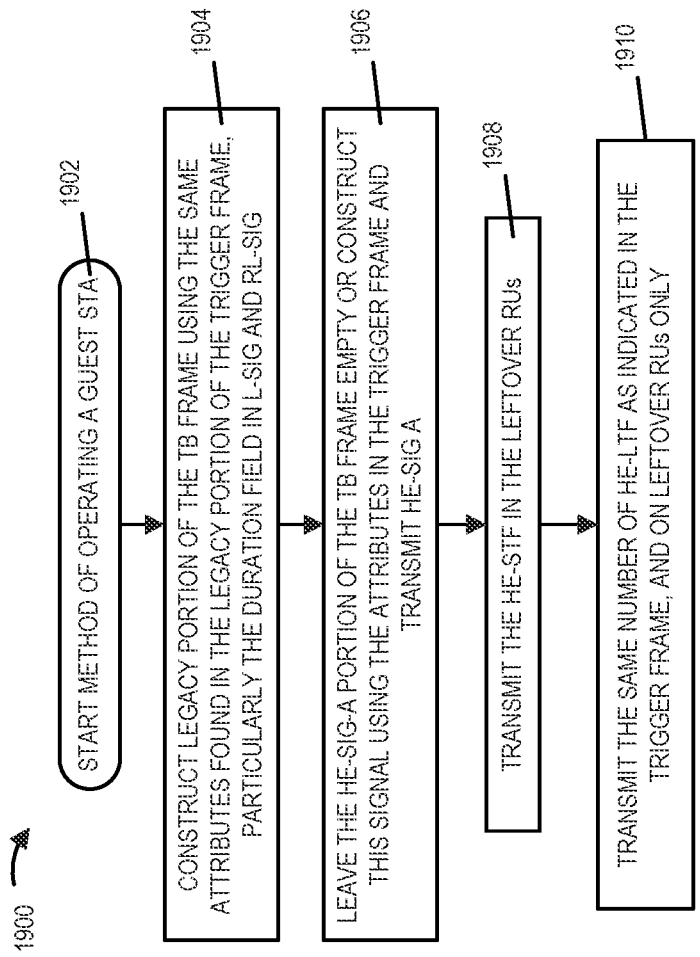
FIG. 19 is a flowchart of an exemplary method of operating a guest STA in accordance with an exemplary embodiment.

FIG. 19 is a flowchart 1900 of an exemplary method of operating a guest STA, e.g., STA 2 806 of FIG. 8, in accordance with an exemplary embodiment. Operation starts in step 1902 in which the guest STA is powered on and initialized. Operation proceeds from 1902 to step 1904. In step 1904 the guest STA construct the legacy portion 1802 of the TB frame 1800 using the same attributes found in the legacy portion of the trigger frame, particularly the duration field in L-SIG and RL-SIG. Operation proceeds from step 1904 to step 1906. In step 1906 the guest STA is controlled to leave the HE-SIG-A portion of the TB frame empty or to construct this signal using the attributes in the trigger frame and transmit the HE-SIG-A. Operation proceeds from step 1906 to step 1908. In step 1908 the guest STA transmits the HE-STF in the leftover RUs. Operation proceeds from step 1908 to step 1910. In step 1910 the guest STA transmits the same number of HE-LTF as indicated in the trigger frame, and on the leftover RUs only.

In another aspect, in some embodiments, the guest STA may, and sometimes does, transmit a wideband (e.g., channel BW>20 MHz) frame, where some of the RUs overlap with unused RUs announced by the host STA. This feature assumes that the guest STA performs LBT on the RUs that do not overlap with the trigger frame resources.

Figure 20:
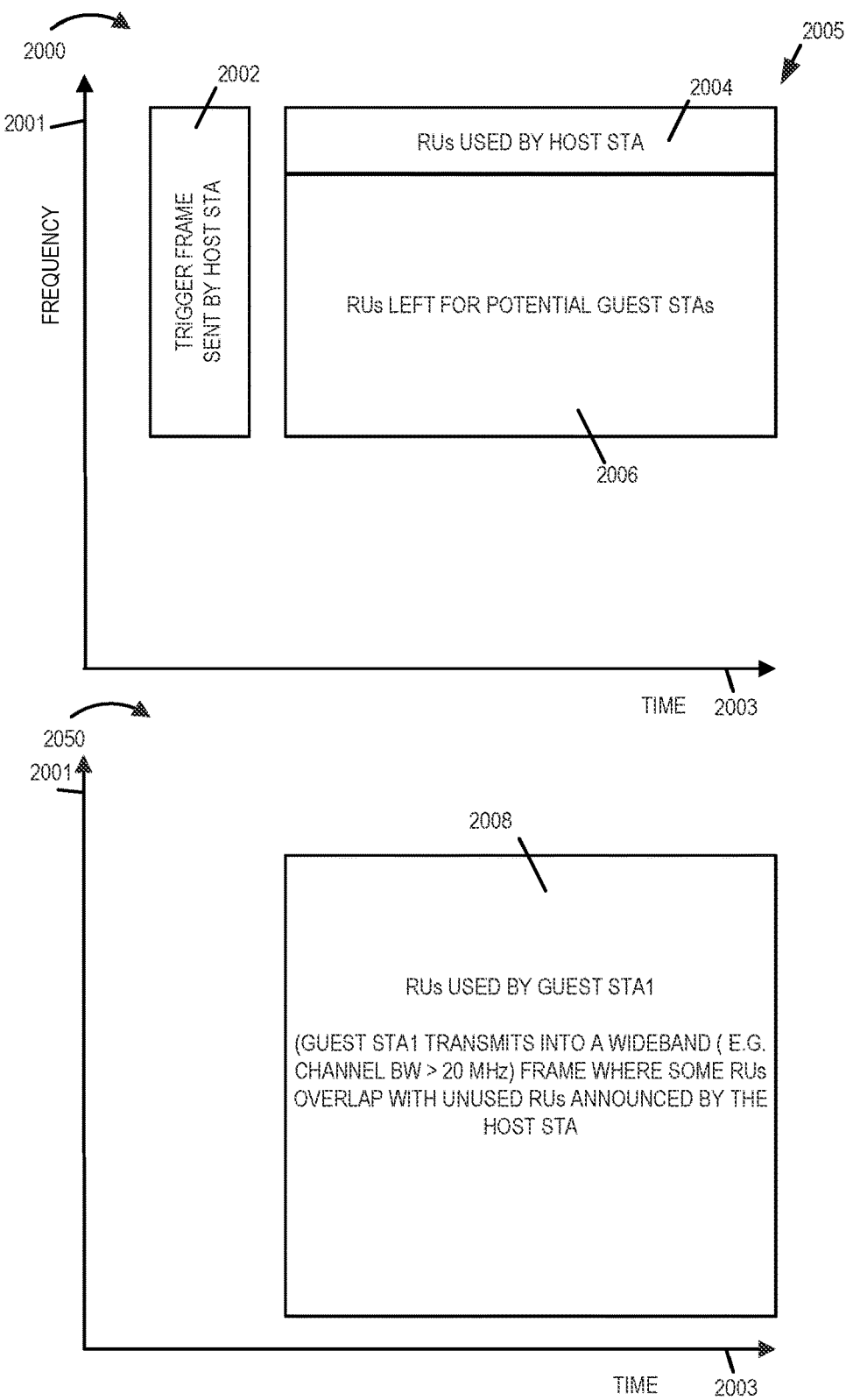
FIG. 20 includes a time frequency plot illustrating an exemplary trigger frame and a corresponding TB frame in accordance with an exemplary embodiment, and a time frequency plot illustrate resource units (RUs) used by exemplary guest STA1 in accordance with an exemplary embodiment.

FIG. 20 includes a time frequency plot 2000 illustrating an exemplary trigger frame and a corresponding TB frame in accordance with an exemplary embodiment, and a time frequency plot 2050 illustrate resource units (RUs) used by exemplary guest STA1 in accordance with an exemplary embodiment.

Time frequency plot 2000 includes vertical axis 2001 representing frequency and horizontal axis 2003 representing time. Block 2002 represents a trigger frame (of type Shared Transmission) which his generated and transmitted by a host STA. Block 2005 represents the resources of the corresponding TB frame 2005. The TB frame 2005 includes RUs used by the host STA 2002 and RUs left for potential guest STAs 2004.

Time frequency plot 2050 includes vertical axis 2001 representing frequency and horizontal axis 2003 representing time. Block 2008 identifies RUs used by a guest STA1 in accordance with an exemplary embodiment. Guest STA 1 transmits into a wideband (e.g., channel>20 MHz) frame where some of the RUs overlap with unused RUs announced by the host STA.

FIG. 21 includes a time frequency plot 2100 illustrating an exemplary trigger frame and a corresponding TB frame in accordance with an exemplary embodiment, and a time frequency plot 2250 illustrating the trigger frame, resource units of the TB frame used by the host STA and resource units (RUs) used by exemplary guest STA1 (including some RUs of the TB frame and some RUs outside the TB frame) in accordance with an exemplary embodiment.

Drawing 2100 is a copy of drawing 2000 of FIG. 20, which is included for comparison to drawing 2150. Time frequency plot 2150 includes vertical axis 2001 representing frequency and horizontal axis 2003 representing time. Block 2002 represents the trigger frame (of type Shared Transmission) which his generated and transmitted by the host STA. Block 2004 represents the resources of the corresponding TB frame 2005 which are used by the host STA. Block 2008 identifies RUs used by the guest STA1 in accordance with an exemplary embodiment. Guest STA 1 transmits into a wideband (e.g., channel>20 MHz) frame where some of the RUs overlap with unused RUs announced by the host STA. The guest STA uses the attributes in the trigger frame 2002 to construct the TB frame. The guest STA performs LBT on the RUs of block 2008 that do not overlap with the trigger frame resources. Block 2009 represents the combined resources of RUs 2004 used by the host STA and the RUs 2008 used by guest STA 1.

An exemplary embodiment of medium sharing using MU transmission will now be described. Medium sharing is possible, and implemented in some embodiments, between a host STA and guest STAs using MY PPDU format.

A host STA may, and sometimes does, initiated a MU PPDU transmission, where the number of spatial streams used by the host STA is less than the maximum spatial streams of the AP. The remaining spatial stream(s) of the AP may be, and sometimes are used for transmission by other guest STAs.

Figure 1:
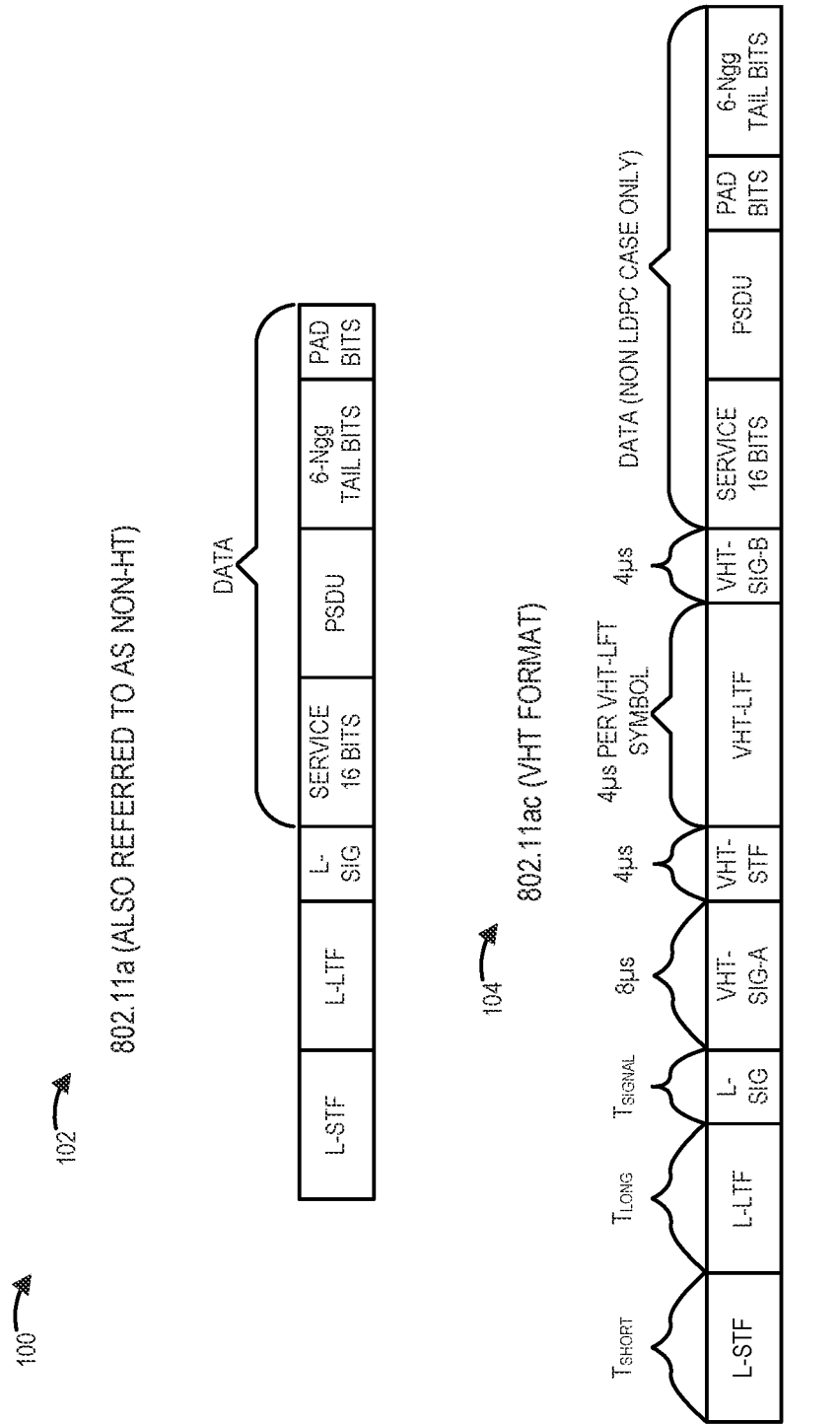
FIG. 1 illustrates 802.11a message format also referred to as non-HT format and 802.11ac message VHT format.
Figure 2:
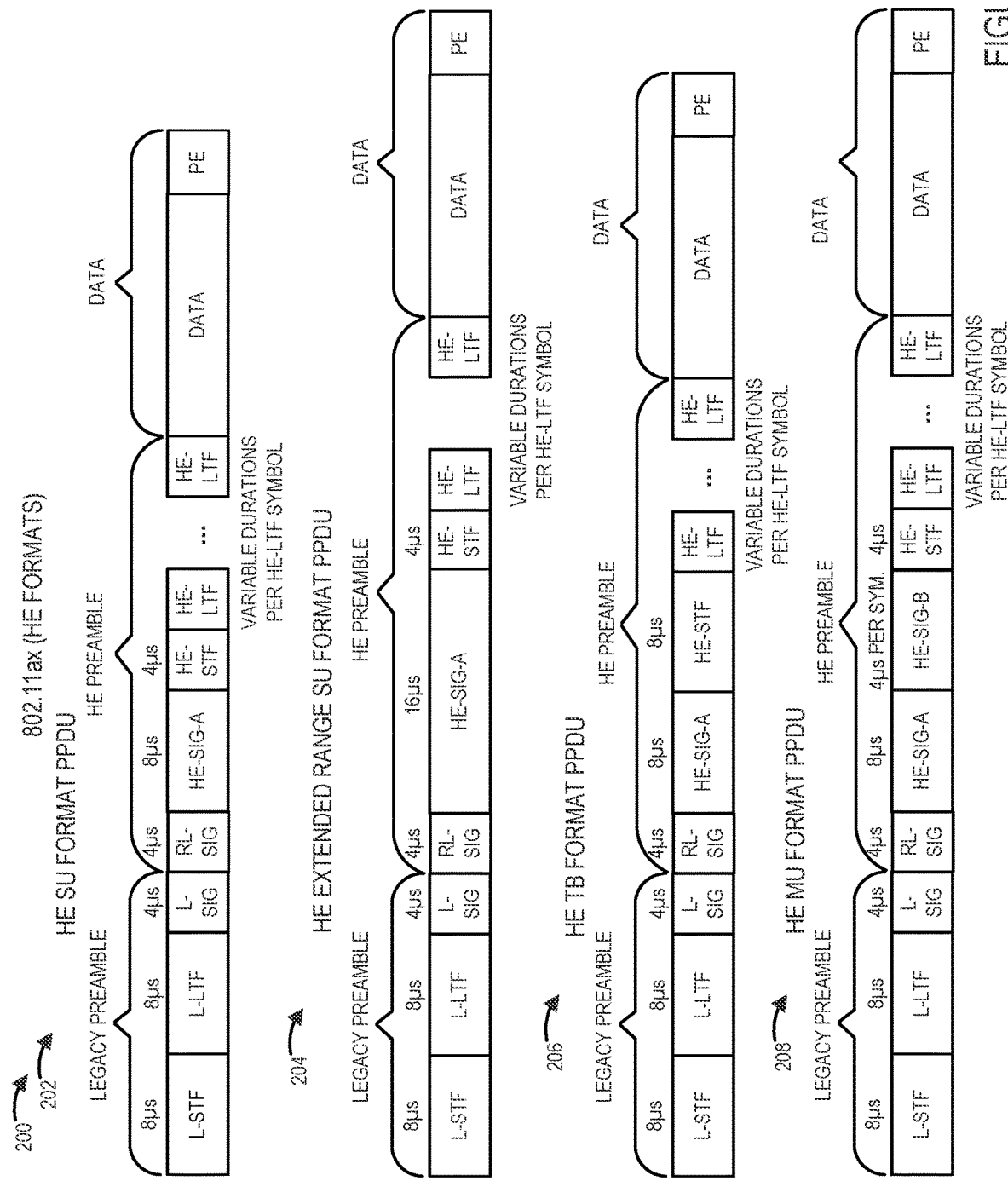
FIG. 2 is a drawing illustrating various 802.11ax (HE FORMATS).
Figure 3:
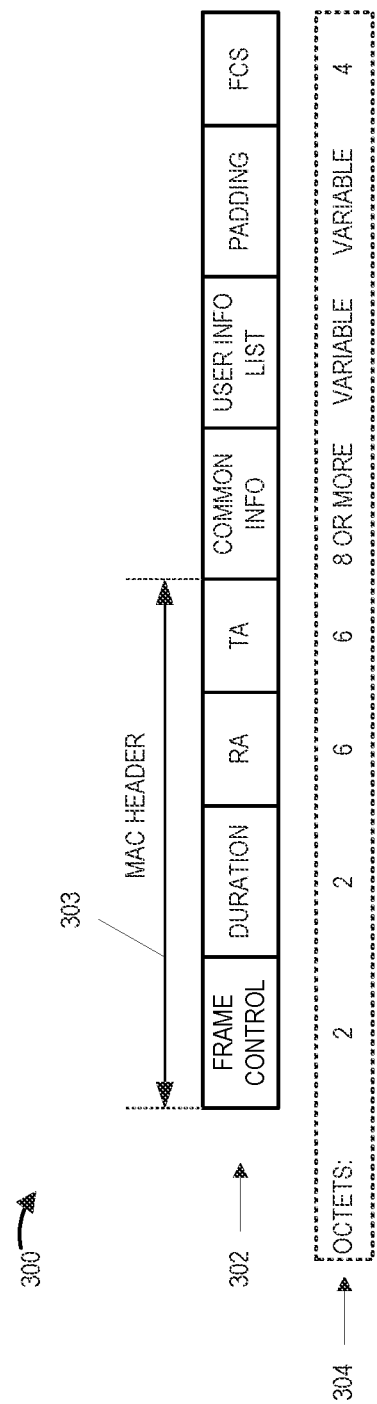
FIG. 3 is a drawing illustrates fields in a Trigger frame format message and the corresponding number of bits for each field.
Figure 4:
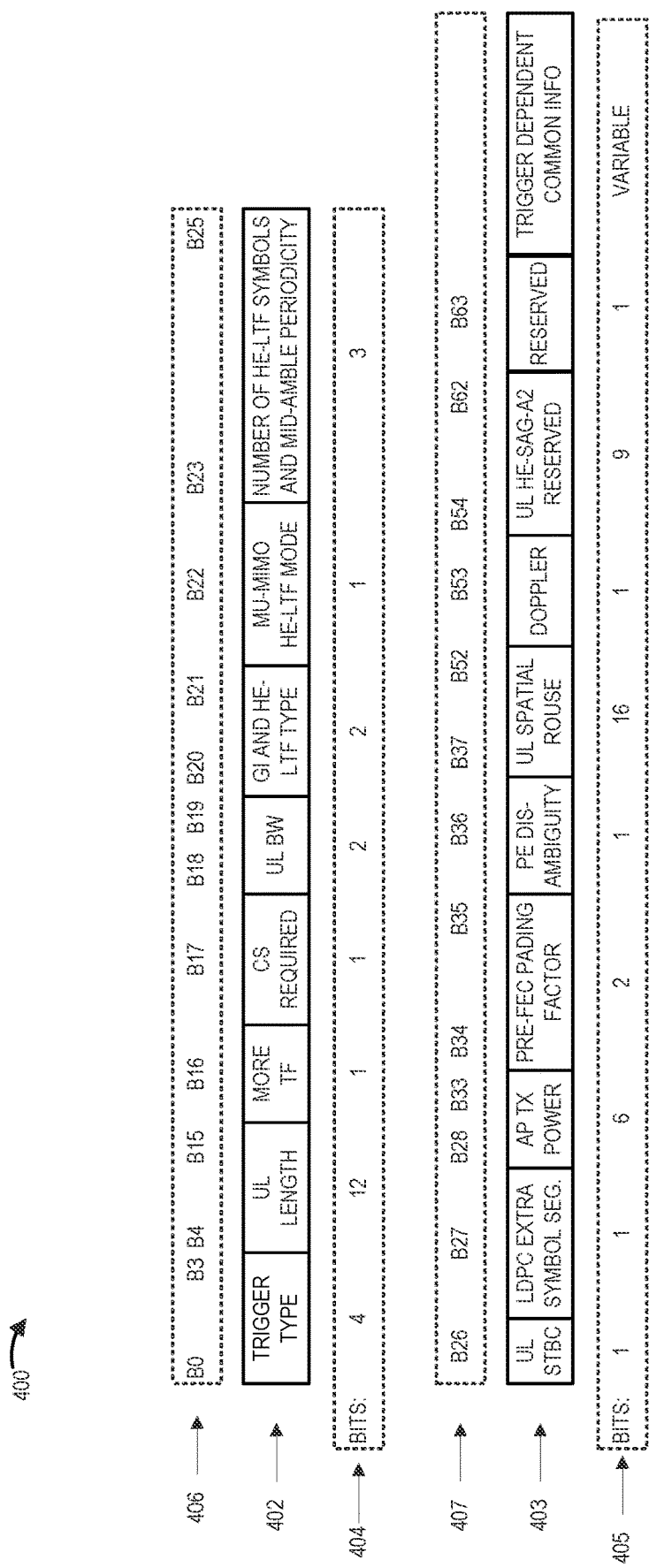
FIG. 4 is a drawing which illustrates fields within Common Field of the Trigger frame format message, the corresponding number of bits for each field within the Common Field, and the corresponding bit designations for the bits of each field within the Common field.
Figure 5:
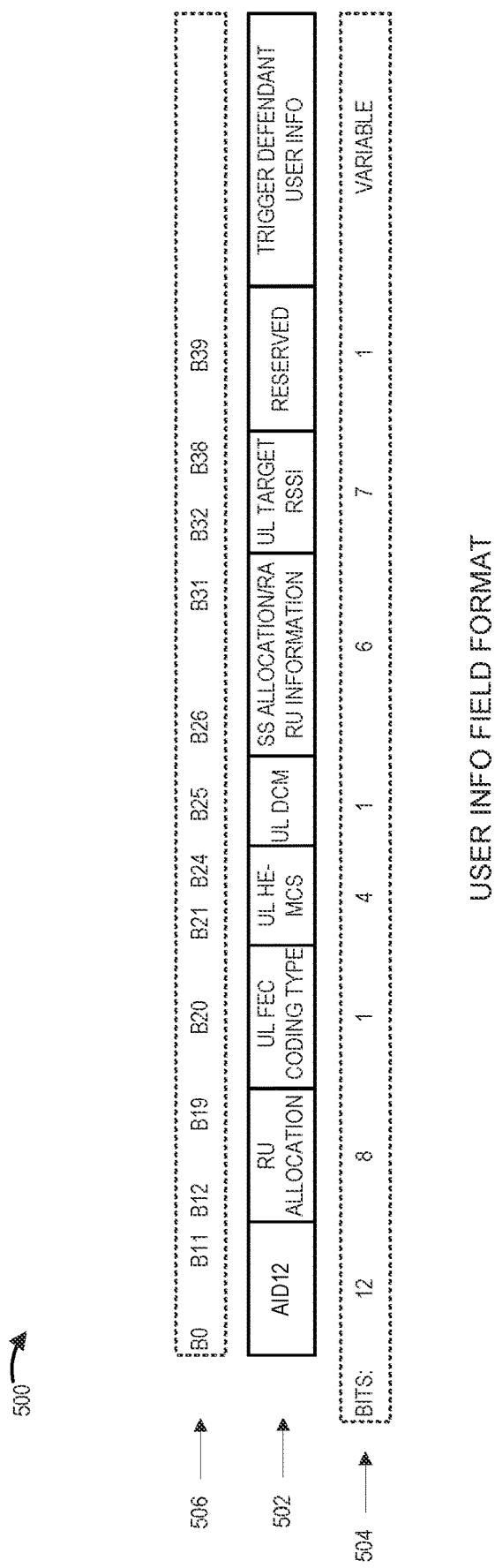
FIG. 5 is a drawing which illustrates fields within User Info Field of the Trigger frame format message, the corresponding number of bits for each field within the User Info Field, and the corresponding bit designations for bits of each field within the User Info field.
Figure 7:
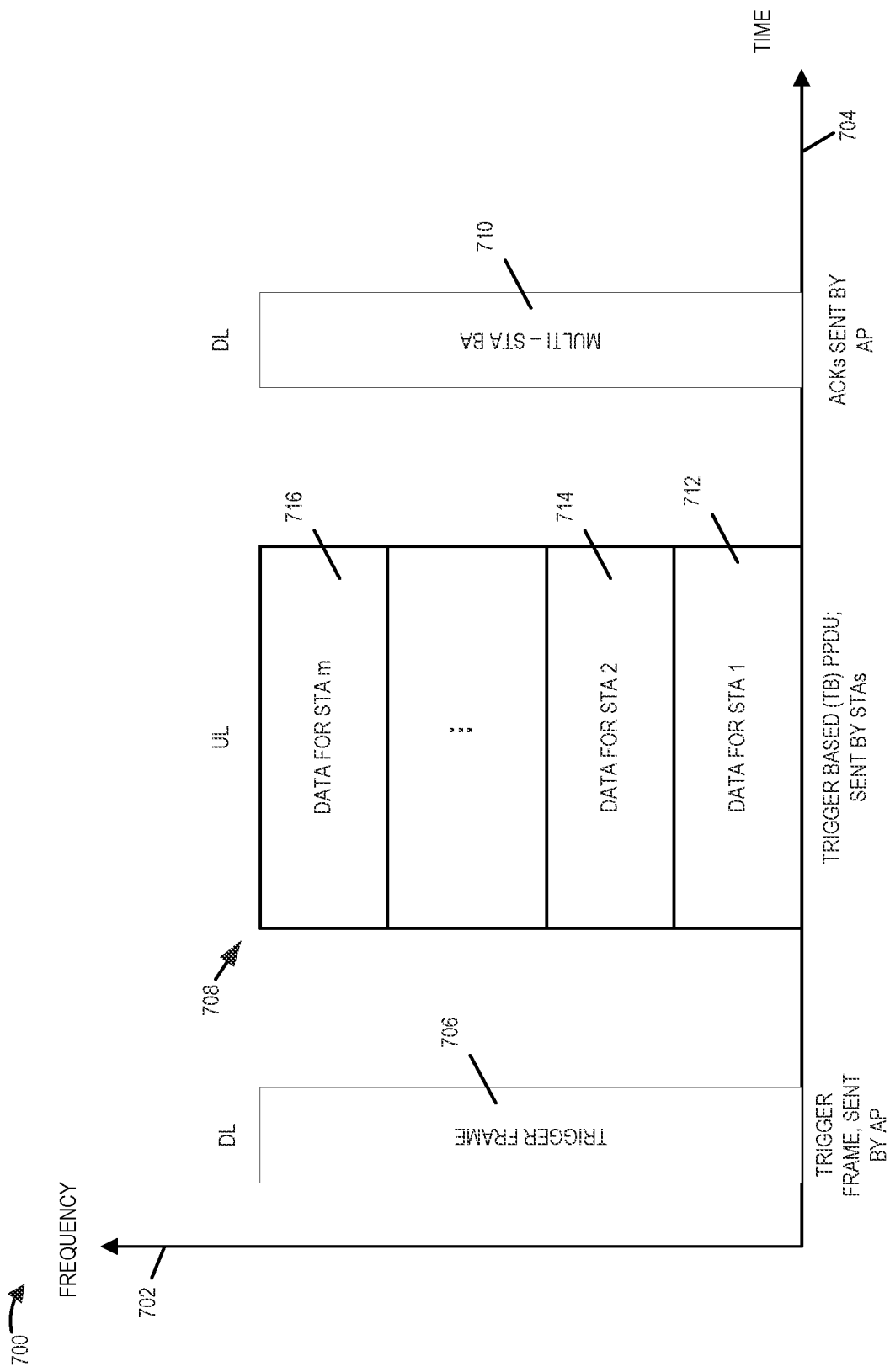
FIG. 7 is a plot of frequency vs time illustrating a trigger frame transmitted in downlink by an access point, trigger-based (TB) frames transmitted by stations (STAs) in the Uplink, and corresponding ACKs transmitted in downlink by the access point.
Figure 22:
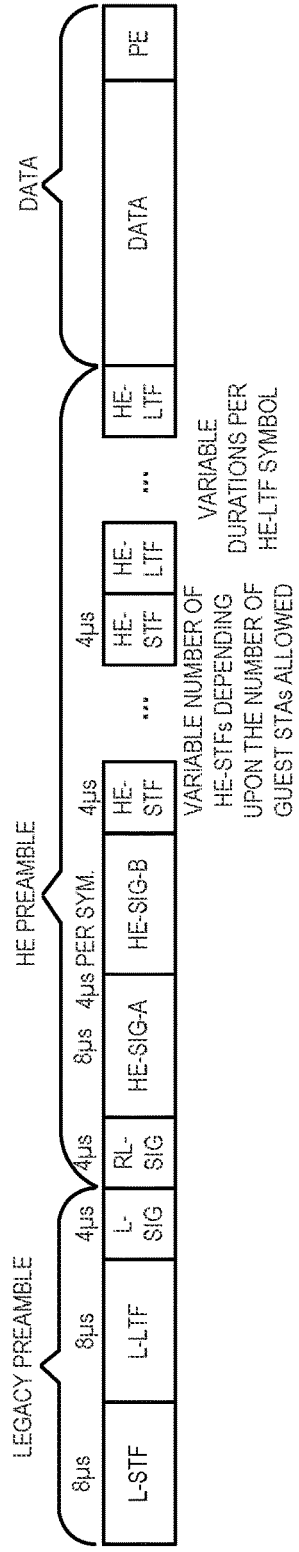
FIG. 22 is drawing illustrating an exemplary first modified HE MU format PPDU in accordance with an exemplary embodiment, which his used in UL medium sharing by a host STA using MU transmission.

In a divergence for the 802.11ax structure of HE MU PPDUs, to enable medium sharing using MU PPDUs, the HE-STF, is repeated once or more (depending upon the number of guest STAs allowed). FIG. 22 shows a novel first modified HE MU format PPDU 2200, e.g., modified from HE MU PPDU 208 of FIG. 2, in accordance with an exemplary embodiment. Exemplary HE MU PPDU 2200 includes a modification to allow sharing medium in UL transmission by a host STA. A variable number of 4 microsecond HE-STFs are included in the novel HE MU format PPDU 2200 of FIG. 22, with the number of HE-STFs depending upon the number of Guest STAs allowed, as indicated by information 2202. This is in contrast to the 802.11ax HE MU format PPDU 208 of FIG. 2 which only includes one 4 micro-second HE-STF.

Figure 23:
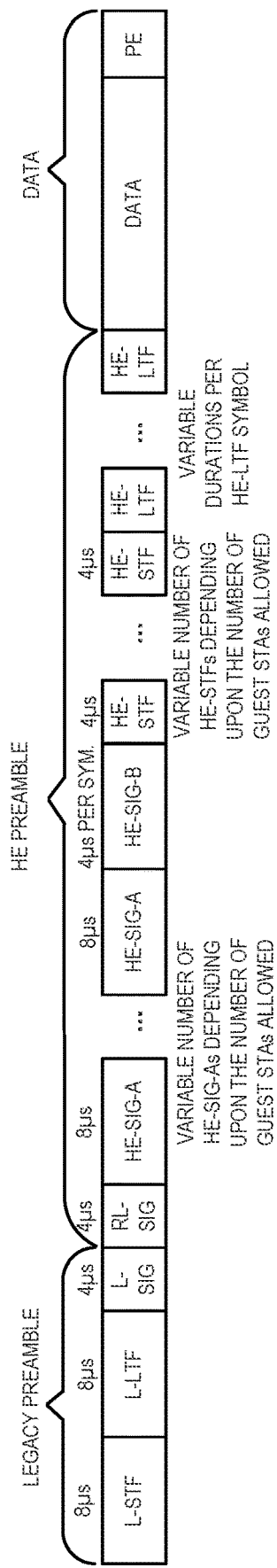
FIG. 23 is drawing illustrating an exemplary first modified HE MU format PPDU in accordance with an exemplary embodiment, which is used, which his used in UL medium sharing by a host STA using MU transmission and enables full use of MCS by guest STAs.

In another modification, included in some embodiments, to enable full use of MCS by guest STAs, HE-SIG-A is repeated as many times as HE-SIG-A, where the first HE-SIG-A is transmitted by the host STA and the remaining HE-SIG-A are transmitted by guest STAs. FIG. 23 is drawing illustrating an exemplary second modified HE MU format PPDU 2300 in accordance with an exemplary embodiment, which is used, which his used in UL medium sharing by a host STA using MU transmission and enables full use of MCS by guest STAs. In second modified HE MU format PPDU 2300, in addition to the modification shown in FIG. 22, there are a variable number of 8 micro-second HE-SIG-As depending upon the number of guest STAs allowed, as indicated by information 2302. This is in contrast to the 802.11ax HE MU format PPDU 208 of FIG. 2 which only includes one 8 micro-second HE-SIG-A.

Note that a MU PPDU may be shared by several guest STAs, where a guest STA chooses an order, e.g., j., within the max allowed guest STAs, and transmits on the jth HE-SIG-A and HE-STF and HE-LTF, etc.

An instance of such sharing as follows: i) the host STA may use several spatial streams and indicates so in the trigger frame, however, ii) each guest STA is allowed to use only on spatial stream, hence transmitting only on the jth HE-LTF, If no collision occurs among the guest STAs, such case allows multiple guest STAs to transmit using the same host MU PPDU.

In a divergence from the 802.11ax transmit/receive processing for the HE MU PPDUs: a trigger frame precedes a MU PPDU, where the host STA identifies within the trigger frame: i) the availability of a host MU PPDU, ii) maximum number of guests allowed, hence max number of STF, iii) maximum number of LTF, and indicating the number of LTFs left for guest STAs, etc.

After the trigger frame, within the MU frame: i) the host STA transmits the first STF and transmits no energy on the remaining STFs, ii) the host STA transmits the LTF needed for processing its own frame and transmits no energy on the remaining LTFS, which are left for the potential guest STAs.

After receiving the trigger frame, a guest STA, as in the first exemplary embodiment (previously described), transmits L-STF/L-LTF/L-SIG and RL-SIG based on the attributes found in the trigger frame. The guest STA transmits the MU frame with no energy on the first STF and transmits STF on the relevant STF. The guest STA transmits no energy on LTFs relevant to the host STA and transmits on the allowed leftover LTFs. Similar to the first exemplary embodiment, a guest STA may use the MCS and frame duration identified in the trigger frame by the host STA or a restricted set of MCSs, e.g., the MCS indicated in the trigger frame +/−1 or 2 steps.

An AP receiving a trigger frame followed by such MU frame performs the following: i) processes the trigger frame and separates the STF/LTFs to decode the individual layers with the following MU frame, ii) processes the portion of layers belonging to the host STA as usual, but using only the relevant STF/LTFs, iii) processes the layers belonging to the guest STA using the attributes found in the physical header of the trigger frame send by the host STA, and using only the relevant leftover STF/LTFs.

Figure 24A:
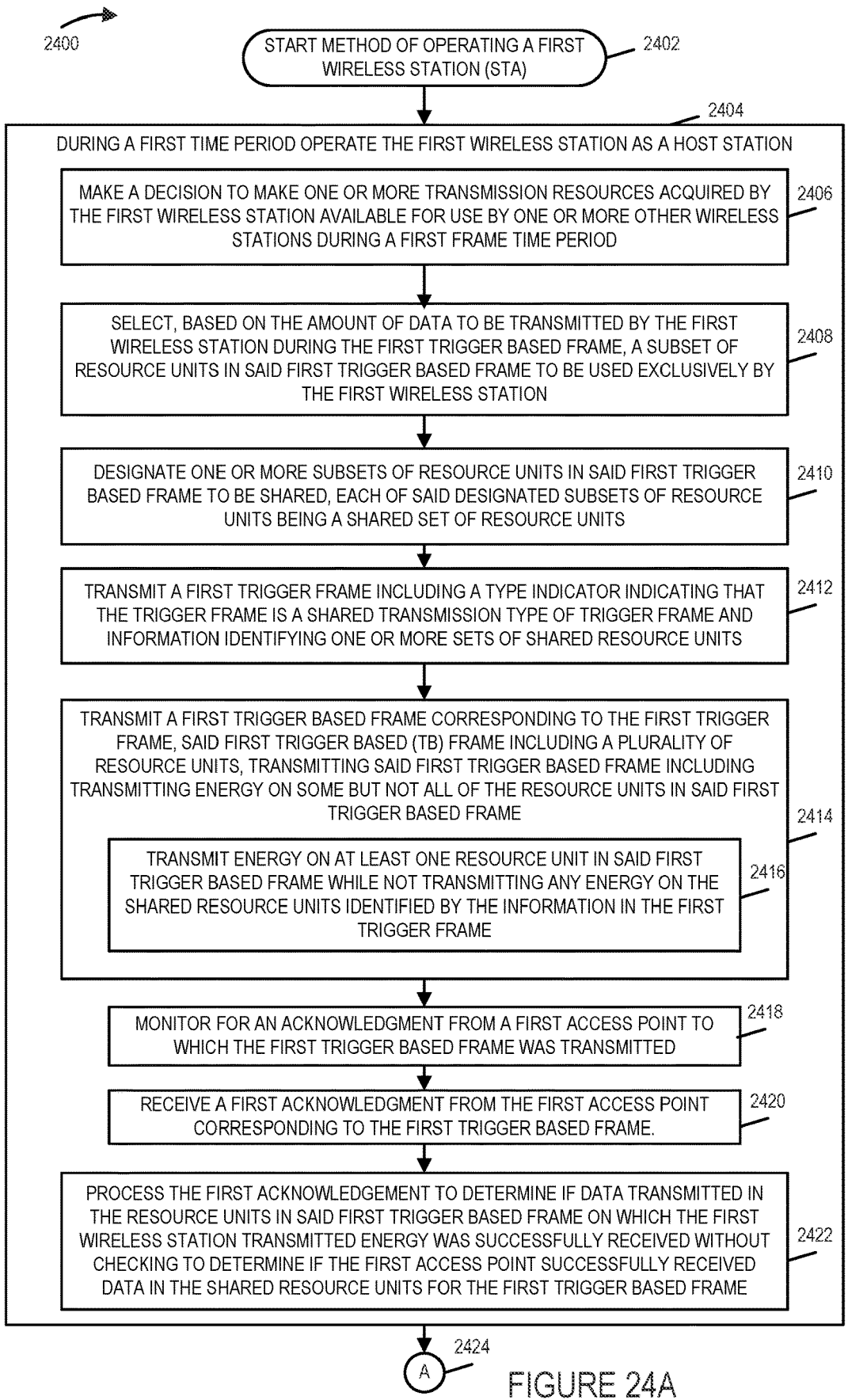
FIG. 24A is a first part of a flowchart of an exemplary method of operating a first wireless station (STA) in accordance with an exemplary embodiment.
Figure 24B:
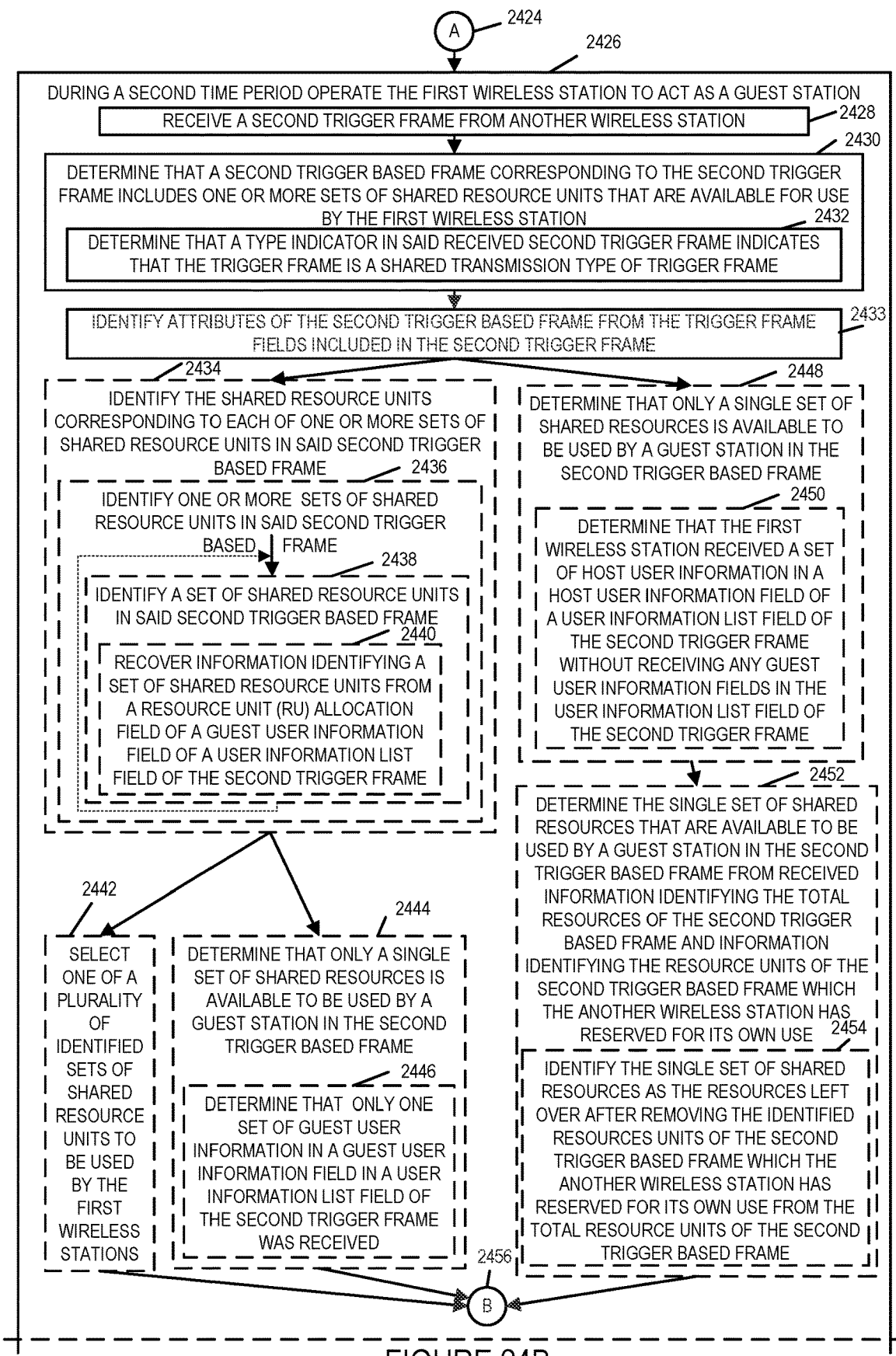
FIG. 24B is a second part of a flowchart of an exemplary method of operating a first wireless station (STA) in accordance with an exemplary embodiment.
Figures 24, 24C:
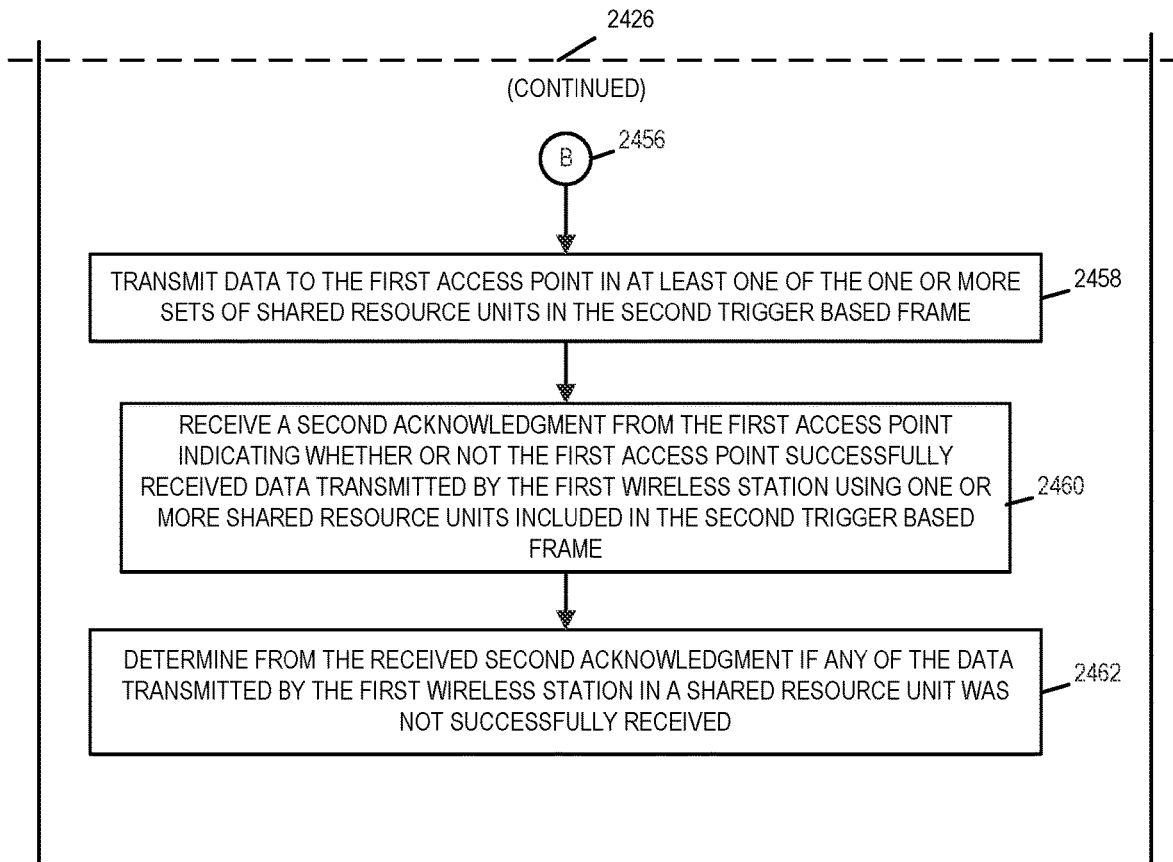
FIG. 24C is a third part of a flowchart of an exemplary method of operating a first wireless station (STA) in accordance with an exemplary embodiment.
FIG. 24 comprises the combination of FIG. 24A, FIG. 24B and FIG. 24C.

FIG. 24, comprising the combination of FIG. 24A, FIG. 24B and FIG. 24C, is a flowchart 2400 of an exemplary method of operating a first wireless station (STA) in accordance with an exemplary embodiment. Operation starts in step 2402 in which the first wireless station is powered on and initialized. Operation proceeds from start step 2402 to step 2404. In step 2404 the first wireless station is operated as a host station during a first time period. Step 2404 includes steps 2406, 2408, 2410, 2412, 2414, 2418, 2430 and 2422.

In step 2406 the first wireless station makes a decision to make one or more transmission units acquired by the first wireless station (e.g., by successfully completing a listen before talk and acquiring the right to transmit or through other means such as by a resource grant to the host station) available for use by one or more of the other wireless stations during a first frame time period. In some embodiments, the first frame time period is a time period corresponding to a first trigger based frame. In some embodiments, said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point. Operation proceeds from step 2406 to step 2408.

In step 2408, the first wireless station selects, based on the amount of data to be transmitted by the first wireless station during the first trigger based frame, a subset of resource units in said first trigger based frame to be used exclusively by the first wireless station. Operation proceeds from step 2408 to step 2410.

In step 2410 the first wireless station designates one or more subsets of resource units in said first trigger based frame to be shared, each of said designated subsets of resource units being a shared set of resource units. Operation proceeds from step 2410 to step 2412.

In step 2412 the first wireless station transmits a first trigger based frame including a type indicator indicating that the trigger frame is a shared transmission type of trigger frame and information identifying one or more sets of shared resource units, e.g., where shared resource units are resource units that are available for sharing and are thus available for use by other wireless stations.

In some embodiments, said information identifying one or more sets of shared resource units explicitly identifies resource units (e.g., by including one or more resource unit identifiers) of a first trigger based frame, corresponding to the first trigger frame, which are to be used as shared resource units.

In some embodiments, said information identifying one or more sets of shared resource units identifies non-shared resource units of a first trigger based frame, corresponding to the first trigger frame, remaining units in the first trigger based frame beyond the non-shared resource units being shared resource units. Thus in this case, the information implicitly identifies the shared resource units by explicitly identifying the non-shared resource units with the understanding that the omitted resource units are to be shared).

In some embodiments, said information identifying one or more sets of shared resources units includes information which explicitly identifies one or more sets of shared resource units which may be used by guest wireless stations. In some such embodiments, said information explicitly identifying one or more sets of shared resource units which may be used by guest wireless stations includes one of more sets of guest information, each set of guest information including a resource unit (RU) allocation field indicating a set of shared resource units, each set of guest information being communicated in a Guest User Info field of a User Info List field of the first trigger frame. In some such embodiments, said User Info List field of the first trigger frame includes a Host User Info field and one or more Guest User Info fields.

In some embodiments, said information which can be used to identify one or more sets of shared resources units includes information identifying the total resources of the trigger based frame and information identifying the resource units of the trigger based frame which the first wireless station (acting as a host station) has reserved for its own use. For example, there is a single set of shared resource units in the first trigger based (TB) frame which may be used by a guest STA, where the single set of shared resource units is implicitly communicated by the host STA, which sends information in the first trigger frame identifying the total resource units of the first TB frame (e.g., in a common information field of the first trigger frame) and resource units of the first TB frame allocated by the host STA to the host STA (e.g., communicated in a host user info field of an user info list field of the first trigger frame), with guest STAs and the access point (AP) determining the single set of available guest STA resource units, e.g., by calculating: single set of guest STA resource units=total resource units for TB frame−resource units allocated by the host STA to the host STA.) In some such embodiments, the information identifying the resource units of the trigger based frame which the first wireless station has reserved for its own use is communicated in a RU allocation field of a Host User Info field of a User Info List field of the first trigger frame. In some such embodiments, the User Info List field of the first trigger frame includes a Host User Info field but does not include any guest User Info fields. In some such embodiments, resource units of the trigger based frame corresponding to the first trigger frame which are not identified in the User Info List field of the first trigger frame are available for use as shared resource units.

Operation proceeds from step 2412 to step 2414. In step 2414 the first wireless station transmits a first trigger based (TB) frame including a plurality of resource units, transmitting said first trigger based frame including transmitting energy on some but not all of the resource units in said first trigger based frame. Step 2414 includes step 2416. In step 2416 the first wireless station transmits energy on at least one resource unit in said first trigger based frame while not transmitting any energy on the shared resource units identified by the information in the first trigger frame. Operation proceeds from step 2414 to step 2418.

In step 2418 the first wireless station monitors for an acknowledgement form a first access point to which the first trigger based frame was transmitted. Operation proceeds from step 2418 to step 2420.

In step 2420 the first wireless station receives a first acknowledgment form the first access point corresponding to the first trigger based frame. In some embodiments, the first acknowledgment includes an indication whether data was successfully received from the host station on one or more resource units on which the host station transmitted energy. Operation proceeds from step 2420 to step 2422.

In step 2422 the first wireless station processes the first acknowledgment to determine if data transmitted in the resource units in said first trigger based frame on which the first wireless station transmitted energy was successfully received without checking to determine if the first access point successfully received data in the shared resource units for the first trigger based frame. Operation proceeds from step 2404, via connecting node A 2424, to step 2426.

In step 2426 the first wireless station is operated to act as a guest station during a second time period. Step 2426 includes steps 2428, 2430, 2433, 2434, 2442, 2444, 2448, 2452, 2458, 2460 and 2462.

In step 2428 the first wireless station receives a second trigger frame from another wireless station. Operation proceeds from step 2428 to step 2430. In step 2430 the first wireless station determines that a second trigger based frame corresponding to the second trigger frame includes one or more sets of shared resource units that are available for use by the first wireless station. Step 2430 includes step 2432, in which the first wireless station determines that a type indicator in said received second trigger frame indicates that the trigger frame is a shared transmission type of trigger frame. Operation proceeds from step 2430 to step 2433.

In step 2433 the first wireless station identifies attributes of the second trigger based frame from the trigger frame fields included in the second trigger frame. Operation proceeds from step 2433 to one of step 2432 and step 2448, e.g., depending upon the particular implemented embodiment and/or depending upon whether or not a only a single set of shared resources is available to be used by a guest station. In some embodiments, information about each set of shared resources, which are being made available to a guest STA is communicated explicitly in the second trigger frame and operation proceeds from step 2433 to step 2434. In some embodiments, when there is only one set of shared resource being made available to a guest STA, the information about the single set of shared resources being made available to a guest STA is communicated implicitly and operation proceeds from step 2433 to step 2448; however, if there is more than one set of shared resource beings made available to guest STAs, then the information about each set of shared resources, which are being made available to a guest STA, is communicated explicitly in the second trigger frame and operation proceeds from step 2433 to step 2434.

In step 2434 the first wireless station identifies the shared resource units corresponding to each of one or more sets of shared resource units in said second trigger based frame. In some embodiments, said second trigger frame includes a User Info List field including a Host User Info field and one or more Guest User Info fields. Step 2434 includes step 2436 in which the first wireless station identifies one or more sets of shared resource units in said second trigger based frame. Step 2436 includes step 2438 in which the first wireless station identifies a set of shared resource units in said second trigger based frame. Step 2438 includes step 2440 in which the first wireless station recovers information identifying a set of shared resource units from information included in the second trigger frame including information from a resource unit (RU) allocation field of a guest user information field of a user information list field of the second trigger frame Step 2438 is performed one or more times, e.g. one iteration of step 2438 for each set of shared resource units to be made available to guest stations. Operation proceeds from step 2434 to step 2442 or step 2444, e.g., depending upon the number of sets of shared resources units to be made available to guest stations. In some embodiments, said second trigger based frame includes two or more sets of shared resource units. If there are two or more sets of sets of shared resources units to be made available to guest wireless stations, then operation proceeds from step 2434 to step 2442, in which the first wireless station selects one of a plurality of identified sets of shared resources units as the shared resource units to be used by the first wireless station. In some embodiments, the first wireless station is allowed to, and sometimes does, select multiple sets of shared resources units in said plurality of identified sets of shared resources units as the shared resource units to be used by the first wireless station.

Returning to step 2444, in step 2444 the first wireless station determines that only a single set of shared resource is available to be used by a guest station in the second trigger based frame. Step 2444 includes step 2446 in which the first wireless station determines that only one set of guest user information in a guest user information field in a user information list field of the second trigger frame was received.

Returning to step 2448, in step 2448 the first wireless station determines that only a single set of shared resources is available to be used by a guest station in the second trigger based frame. Step 2448 includes step 2450, in which the first wireless station determines that the first wireless station received a set of host user information in a host user information field of a user information list field of the second trigger frame without receiving any guest user information fields in the user information list field of the second trigger frame. Operation proceeds from step 2450 to step 2452.

In step 2452 the first wireless station determines the single set of shared resources that are available to be used by a guest station in the second trigger based frame from received information identifying the total resources of the second trigger based frame and information identifying the resource units of the second trigger based frame which the another wireless station has reserved for its own use. Step 2452 includes step 2454 in which the first wireless station identifies the single set of shared resources as the resources left over after removing the identified resource units of the second trigger based frame which the another wireless station (host station) has reserved for its own use from the total resource units of the second trigger based frame.

Operation proceeds from step 2442, step 2444 or step 2452, via connecting node B 2456 to step 2458. In step 2458 the first wireless station transmits data to the first access point in at least one of the one or more sets of shared resource units in the second trigger based frame. Operation proceeds from step 2458 to step 2460. In step 2460 the first wireless station receives a second acknowledgment from the first access point indicating whether or not the first access point successfully received data transmitted by the first wireless station using one or more shared resource units included in the second trigger based frame. Operation proceeds from step 2460 to step 2462. In step 2462 the first wireless station determines from the received second acknowledgment if any of the data transmitted by the first wireless station in a shared resource unit was not successfully received.

Figure 25:
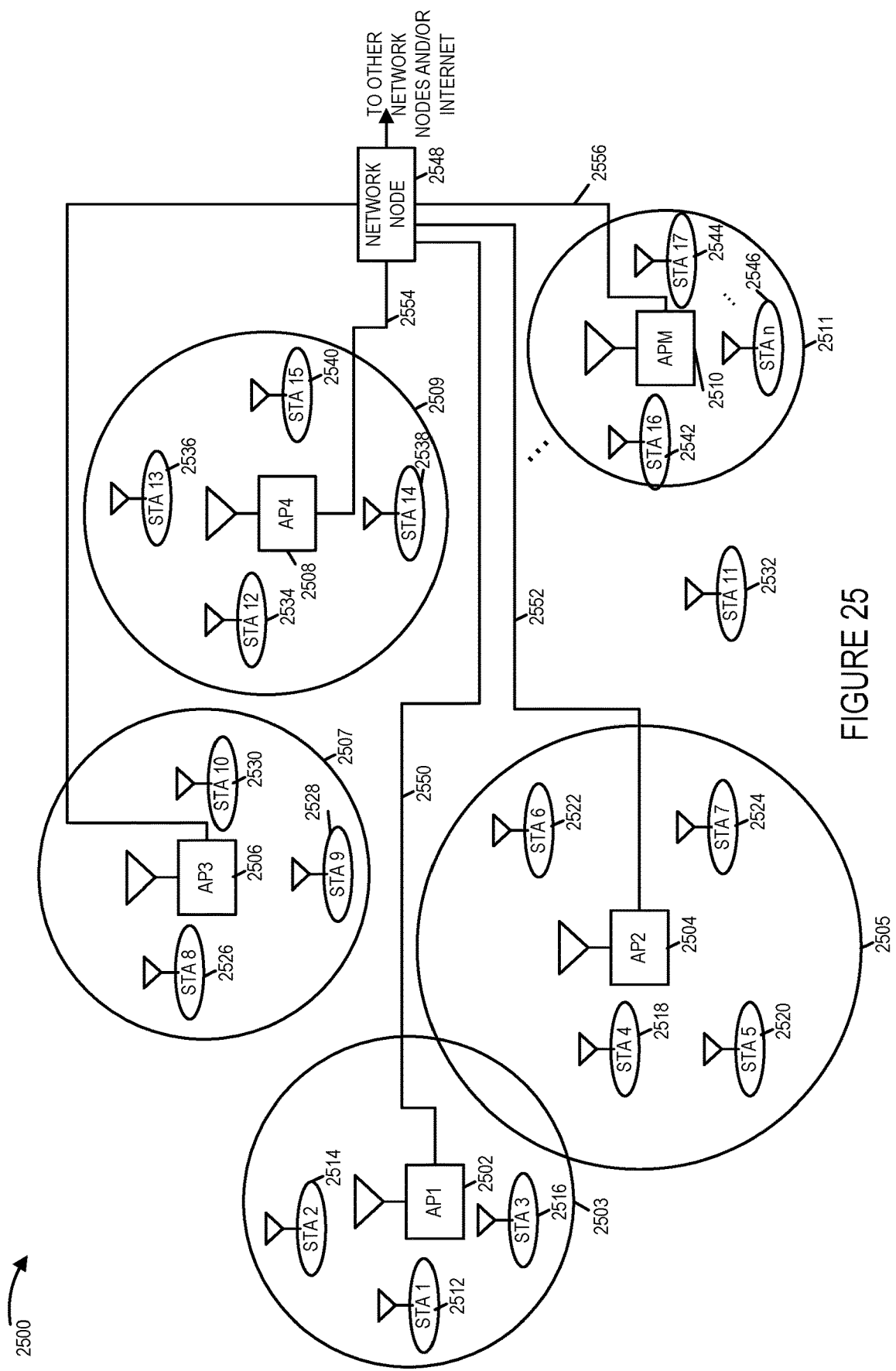
FIG. 25 is a drawing of an exemplary wireless communications system in accordance with an exemplary embodiment.

FIG. 25 is a drawing of an exemplary wireless communications system 2500 in accordance with an exemplary embodiment. Exemplary communications system 2500 includes a plurality of access point (AP 1 2502, AP2 2504, AP3 2506, AP4 2508, . . . , APM 2510), each with a corresponding wireless coverage area (2503, 2505, 2507, 2509, . . . , 25111), respectively, a network node 2448, and a plurality of wireless stations (STAs) (STA 1 2512, STA 2 2514, STA 3 2516, STA 4 2518, STA 5 2520, STA 6 2522, STA 7 2524, STA 8 2526, STA 9 2528, STA 10 2530, STA 11, 2532, STA 12 2534, STA 13 2536, STA 14 2538, STA 15 2540, STA 16 2542, STA 17 2544, . . . , STA n 2546). The access points (2502, 2504, 2506, 2508, 2510) are coupled to the network node 2548 via communications links (2550, 2552, 2554, 2556), respectively. The network node 2548 is coupled to other network nodes and/or the Internet. The wireless coverage area of one access point in system 2500 may be non-overlapping, partially overlapping or fully overlapping with the wireless coverage area of another access point in the system 2500. The wireless stations may be, and some are, mobile devices which may move throughout the system 2500. In FIG. 25, stations (STA 1 2512, STA 2 2514 and STA 3 2516) are shown to be within the wireless coverage area 2503 of access point 1 2502. In FIG. 25, stations (STA 4 2518, STA 5 2520, STA 6 2522 and STA 7 2524) are shown to be within the wireless coverage area 2505 of access point 2 2504. In FIG. 25, stations (STA 8 2526, STA 9 2528 and STA 10 2530) are shown to be within the wireless coverage area 2507 of access point 3 2506. In FIG. 25, stations (STA 12 2534, STA 13 2536, STA 14 2538 and STA 15 2540) are shown to be within the wireless coverage area 2509 of access point 4 2508. In FIG. 25, stations (STA 16 2542, STA 17 2544 and STA n 2546) are shown to be within the wireless coverage area 2511 of access point M 2510. A wireless station, e.g., any of stations (STA 1 2512, STA 2 2514, STA 3 2516, STA 4 2518, STA 5 2520, STA 6 2522, STA 7 2524, STA 8 2526, STA 9 2528, STA 10 2530, STA 11, 2532, STA 12 2534, STA 13 2536, STA 14 2538, STA 15 2540, STA 16 2542, STA 17 2544, . . . , STA n 2546), may act as a host station, e.g., transmitting shared resource type trigger frames and transmitting data using host resource units of a corresponding TB frame, during some time intervals and act as a guest station, e.g., receiving a shared resource type trigger frame and transmitting data using shared guest resource units of a corresponding TB frame during other time intervals.

Figure 26:
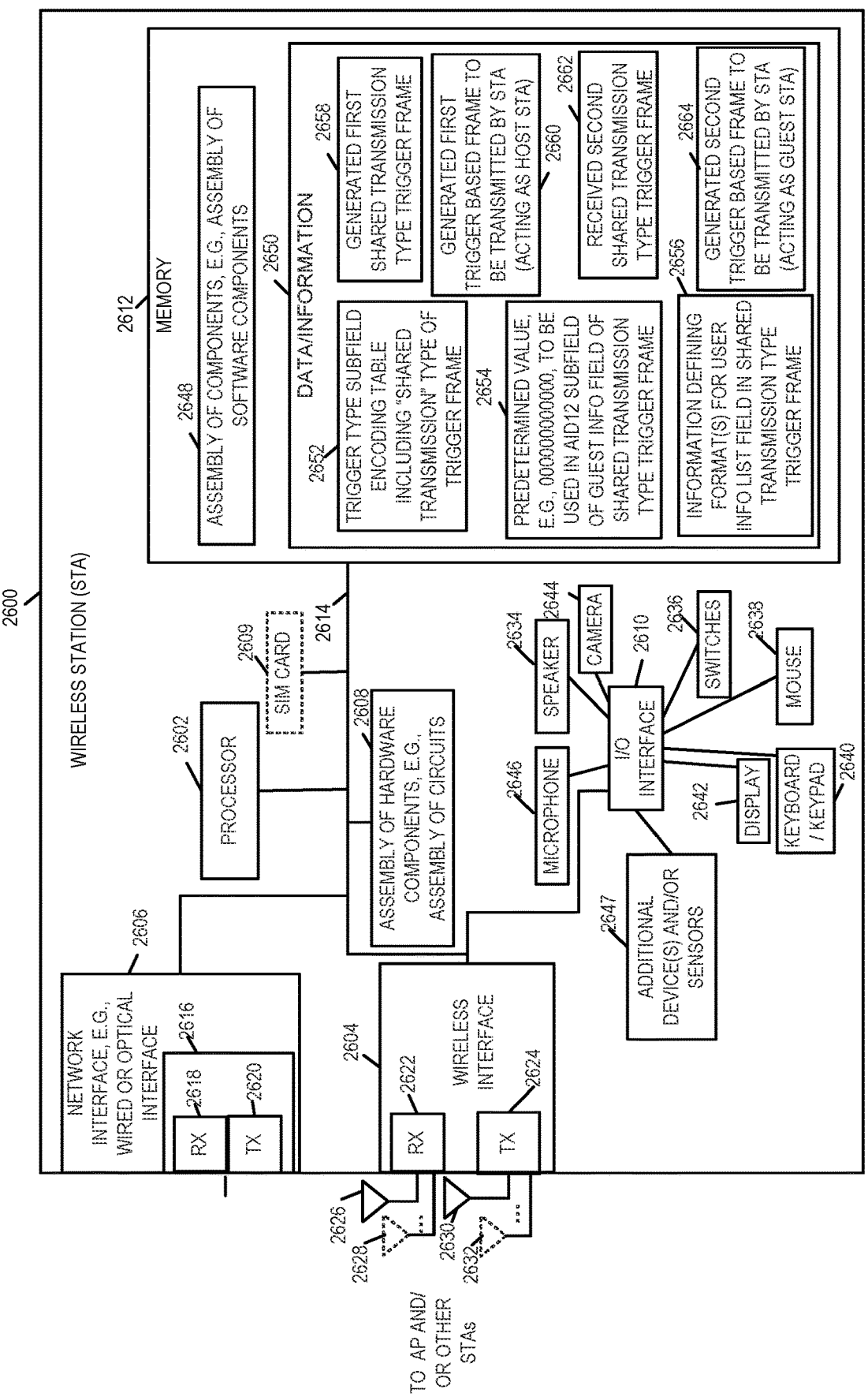
FIG. 26 is a drawing of an exemplary wireless station (STA) in accordance with an exemplary embodiment.

FIG. 26 is a drawing of an exemplary wireless station (STA) 2600 in accordance with an exemplary embodiment. Exemplary wireless station 2600 is, e.g., the first wireless station implementing the method of flowchart 2400 of FIG. 24, any of the wireless stations of system 2500 of FIG. 25, and/or any of the wireless stations described with respect to any FIGS. 8-25 and FIG. 27. Exemplary wireless STA 2600 includes a processor 2602, e.g., a CPU, a wireless interface 2604, a network interface 2606, an assembly of hardware components 2608, e.g., an assembly of circuits, am optional Subscribed Identity Module (SIM) card 2609, an I/O interface 2610 and a memory 2612 coupled together via a bus 2614 over which the various elements may interchange data and information. Exemplary wireless STA 2600 further includes a plurality I/O devices (speaker 2634, camera 2644, switches 2636, mouse 2638, display 2642, e.g., a touch screen display, keyboard/keypad 2640, microphone 2646 and additional devices(s) and/or sensor(s) 2647 coupled to the I/O interface 2610. Network interface 2606, e.g., a wired or optical interface, includes a receiver 2618 and a transmitter 2620. In some embodiments the receiver 2618 and transmitter 2620 are include as part of a transceiver 2616, e.g., a transceiver chip.

Wireless interface 2604 includes a wireless receiver 2622 coupled to one or more receive antennas (2626, . . . , 2628) via which the wireless station 2600 receives wireless signals including, e.g., a grant of uplink resources from an access point, a shared resources type trigger frame from another STA, and an acknowledgment from an access point. Wireless interface 2604 includes a wireless transmitter 2624 coupled to one or more transmit antennas (2630, . . . , 2632) via which the wireless station 2600 transmits wireless signals including, e.g., a shared resources type trigger frame, a trigger based frame including data on resource units self-allocated to the wireless station while acting as a host STA, and a trigger based frame including data on shared resource units allowed to be used by guest STAs while acting as a guest STA. In some embodiments, the wireless interface 2604 includes multiple receivers and multiple transmitters. In some embodiments, one or more of the same antennas are used for both transmit and receive. In some embodiments, the wireless station supports MIMO operations.

Figure 27:
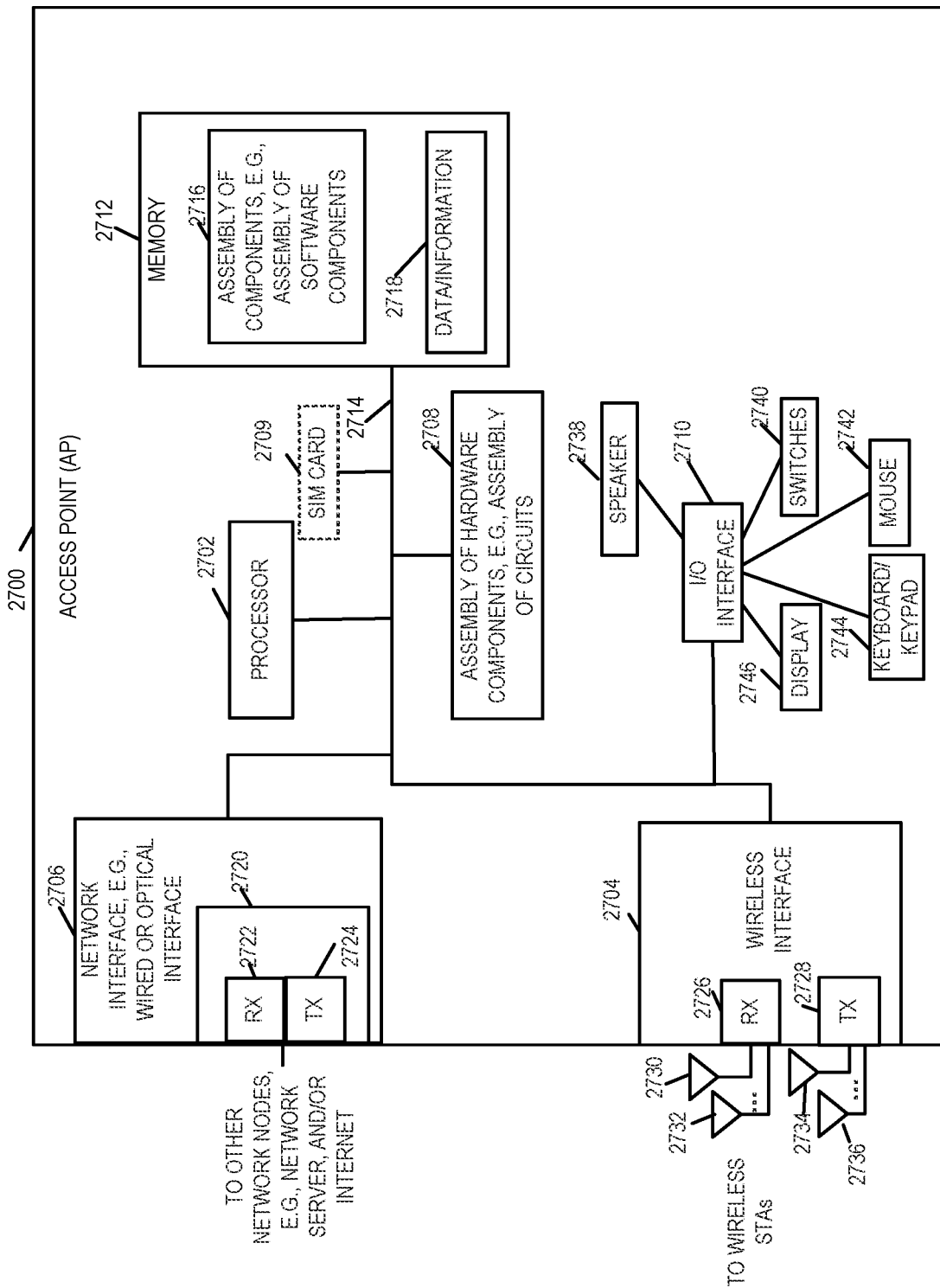
FIG. 27 is a drawing of an exemplary access point (AP) in accordance with an exemplary embodiment.

Memory 2612 includes an assembly of components 2648, e.g., an assembly of software components, e.g., an assembly of software routines and/or software modules, and data/information 2650. Data information 2650 includes a trigger type subfield encoding table including a "shared transmission" type trigger frame, e.g., trigger type subfield encoding table 900 of FIG. 9, a stored predetermined value, e.g., the 12 bit value=000000000000, to be used in an AID12 subfield of a guest information field of a shared transmission type trigger frame 2654, information defining the format(s) for user information field(s) in a user information list field of a shared transmission type trigger frame, a generated first shared transmission type trigger frame 2658, which was generated by the wireless station while acting as a host STA, a generated first TB frame 2660 (corresponding to the first shared transmission trigger frame) to be transmitted by the wireless station while acting as a host STA, a received second shared transmission type trigger frame 2662, which was received by the wireless station while acting as a guest STA, a generated second TB frame 2664 (corresponding to the second shared transmission type trigger frame) to be transmitted by the wireless station while acting as a guest STA, FIG. 27 is a drawing of an exemplary access point (AP) 2700 in accordance with an exemplary embodiment. Exemplary access point 2700 is, e.g., the access point described with respect to flowchart 2400 of FIG. 24, any of the access points (2502, 2504, 2506, 2508, . . . , 2510) of system 2500 of FIG. 25, and/or an access point described with respect to any of FIGS. 8-26.

Exemplary access point 2700 includes a processor 2702, e.g., a CPU, a wireless interface 2704, a network interface 2706, an assembly of hardware components 2708, e.g., an assembly of circuits, an optional SIM card 2709, an I/O interface 2710, and memory 2712 coupled together via a bus 2714 over which the various elements may interchange data and information.

Access point 2700 further includes a plurality of I/O devices (speaker 2738, switches 2740, mouse 2742, keyboard/keypad 2744, and display 2746, e.g., touch screen display, coupled to I/O interface 2710. Network interface 2706, e.g., a wired or optical interface, includes a receiver 2722 and a transmitter 2724. In some embodiments, the receiver 2722 and transmitter 2724 as included as part of a transceiver 2720, e.g., a transceiver chip. The network interface 2706 couples the access point 2700 to other network nodes and/or the Internet. Wireless interface 2704 includes a wireless receiver 2726 and a wireless transmitter 2728. Wireless transmitter 2728 is coupled to a plurality of transmit antennas (2734, . . . , 2736) via which the access point transmits downlink signals to wireless stations including resource allocations, downlink data signals, and acknowledgments, e.g. acknowledgments to TB frames from host STAs and guest STAs. Wireless receiver 2726 is coupled to a plurality of receive antennas (2730, . . . , 2732) via which the access point receive signals from wireless stations including shared resource type trigger frames from host STAs, a TB frame (corresponding to a shared resource type trigger frame) from host STA including data on host user resource units, and a TB frame (corresponding to a shared resource type trigger frame) from a guest STA including data on shared resource units.

Memory 2712 includes an assembly of components 2716, e.g., an assembly of software components, and data/information 2718.

Figure 28A:
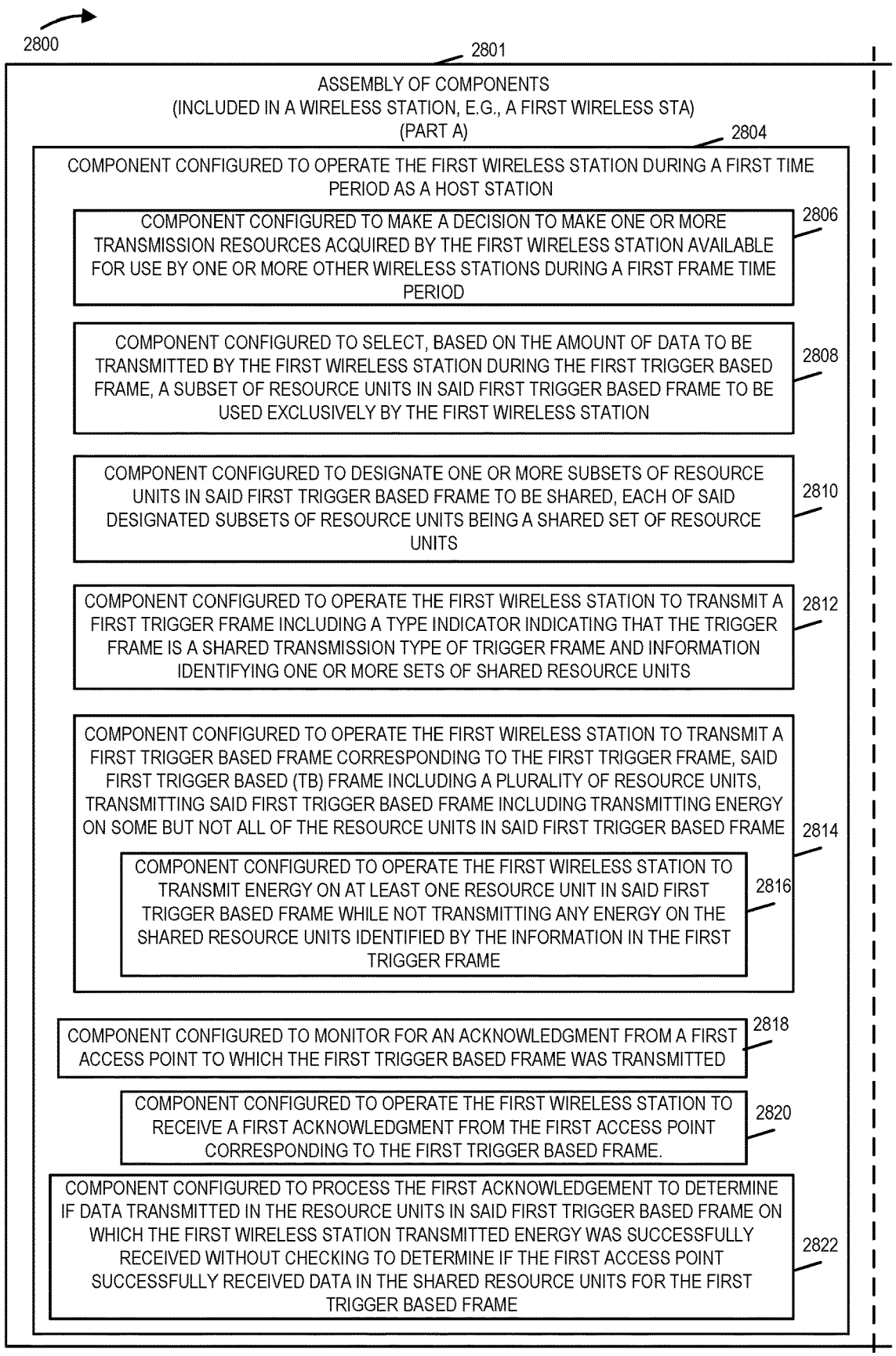
FIG. 28A is a first part of an assembly of components which may be included in an exemplary wireless station in accordance with an exemplary embodiment.
Figure 28B:
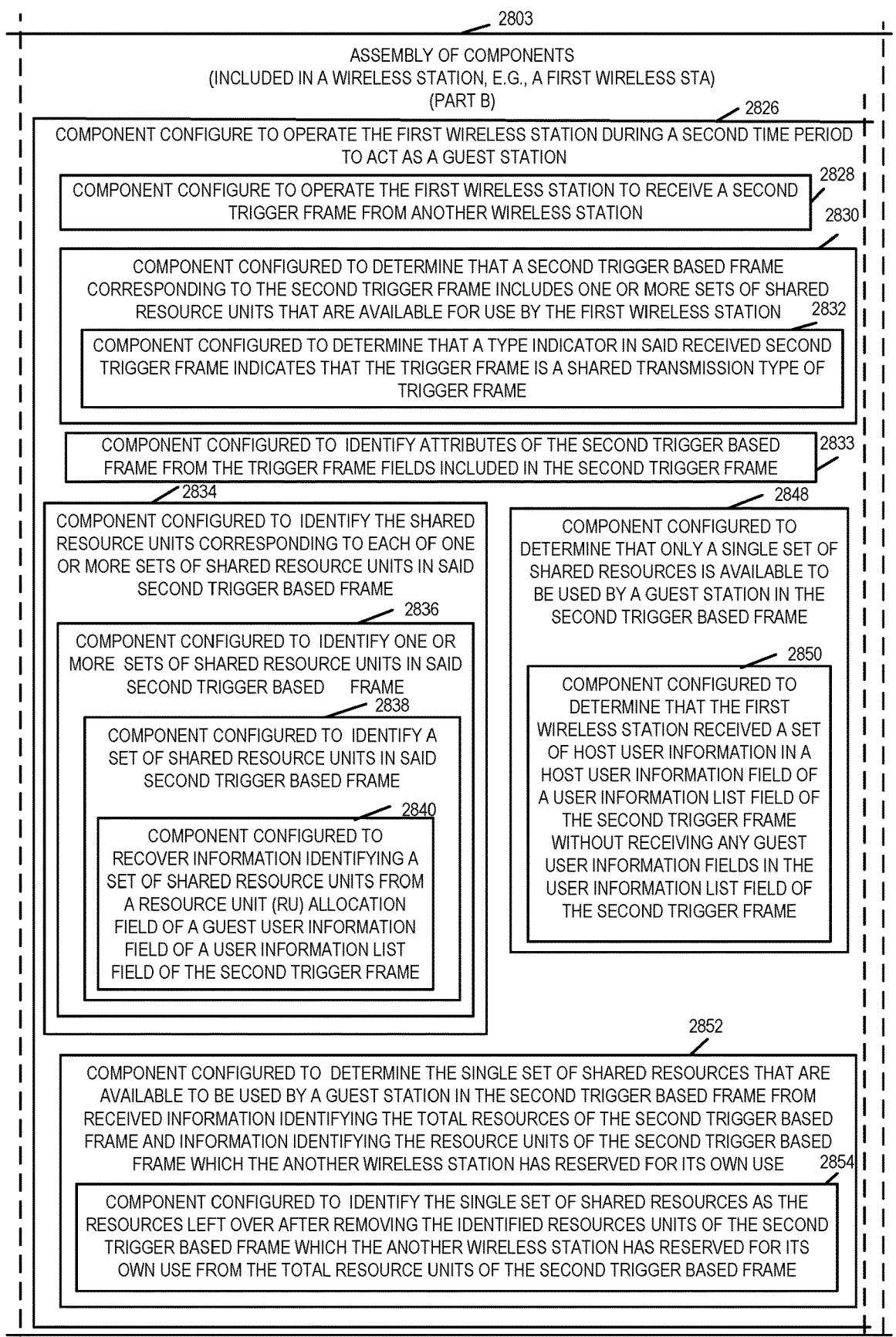
FIG. 28B is a second part of an assembly of components which may be included in an exemplary wireless station in accordance with an exemplary embodiment.
Figures 28, 28C:
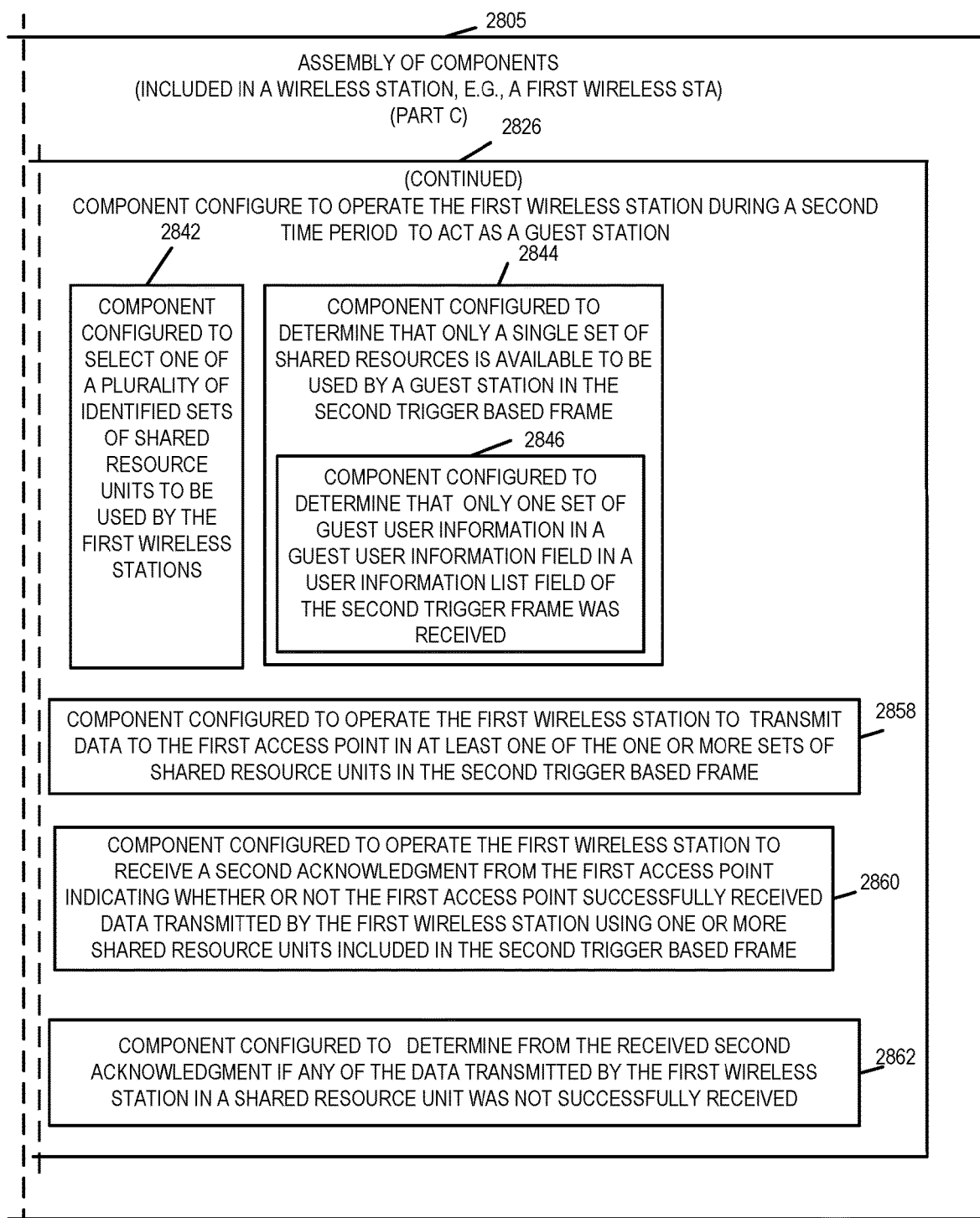
FIG. 28C is a third part of an assembly of components which may be included in an exemplary wireless station in accordance with an exemplary embodiment.
FIG. 28 comprises the combination of FIG. 28A, FIG. 28B and FIG. 28C.

FIG. 28, comprising the combination of FIG. 28A, FIG. 28B and FIG. 28C, is a drawing of an exemplary assembly of components 2800, comprising the combination of Part A 2801, Part B 2803 and Part C 2805, which may be included in a wireless station, e.g. wireless station 2600, e.g., a first wireless station, in accordance with an exemplary embodiment. Exemplary assembly of components 2800 may be, and sometimes is, included in an exemplary wireless station, e.g., exemplary wireless station 2600, e.g., the first wireless station implementing the method of flowchart 2400 of FIG. 24, any of the wireless stations of system 2500 of FIG. 25, and/or any of the wireless stations described with respect to any FIGS. 8-25 and FIG. 27.

The components in the assembly of components 2800 can be, and in some embodiments are, implemented fully in hardware within the processor 2602, e.g., as individual circuits. The components in the assembly of components 2800 can, and in some embodiments are, implemented fully in hardware within the assembly of components 2608, e.g., as individual circuits corresponding to the different components. In other embodiments some of the components are implemented, e.g., as circuits, within the processor 2602 with other components being implemented, e.g., as circuits within assembly of components 2608, external to and coupled to the processor 2602. As should be appreciated the level of integration of components on the processor and/or with some components being external to the processor may be one of design choice. Alternatively, rather than being implemented as circuits, all or some of the components may be implemented in software and stored in the memory 2612 of the wireless station 2600 with the components controlling operation of the wireless station to implement the functions corresponding to the components when the components are executed by a processor, e.g., processor 2602. In some such embodiments, the assembly of components 2800 is included in the memory 2612 as assembly of components 2648. In still other embodiments, various components in assembly of components 2800 are implemented as a combination of hardware and software, e.g., with another circuit external to the processor providing input to the processor 2602 which then under software control operates to perform a portion of a component's function. While processor 2602 is shown in the FIG. 26 embodiment as a single processor, e.g., computer, it should be appreciated that the processor 2602 may be implemented as one or more processors, e.g., computers.

When implemented in software the components include code, which when executed by the processor 2602, configure the processor 2602 to implement the function corresponding to the component. In embodiments where the assembly of components 2800 is stored in the memory 2612, the memory 2612 is a computer program product comprising a computer readable medium comprising code, e.g., individual code for each component, for causing at least one computer, e.g., processor 2602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 28 control and/or configure the wireless station 2600, or elements therein such as the processor 2602, to perform the functions of corresponding steps illustrated and/or described in the method of one or more of the flowcharts, signaling diagrams and/or described with respect to any of the Figures. Thus the assembly of components 2800 includes various components that perform functions of corresponding one or more described and/or illustrated steps of an exemplary method, e.g., steps of the method of flowchart 2400 of FIG. 24 and/or described or shown with respect to any of the other figures.

Assembly of components 2800 includes a component 2804 configured to operate the first wireless station during a first time period as a host station and a component 2826 configured to operate the first wireless station during a second time period to act as a guest station.

Component 2804 includes a component 2806 configured to make a decision to make one or more transmission requires acquired by the first wireless station available for use by one or more other wireless station during a first time period, a component 2808 configured to select, based on the amount of data to be transmitted by the first wireless station during the first trigger based frame, a subset of resource units in said first trigger based frame to be used exclusively by the first wireless station, a component 2810 configured to designate one or more subsets of resource units in said first trigger based frame to be shared, each of said designed subsets of resource units being a shared set of resource units, a component 2812 configured to operate the first wireless station to transmit a first trigger frame including a type indicator indicating that the trigger frame is a shared transmission type of trigger frame and information identifying one or more sets of shared resource units, and a component 2814 configured to operate the first wireless station to transmit a first trigger based frame corresponding to the first trigger frame, said first trigger based (TB) frame including a plurality of resource units, transmitting said first trigger based frame including transmitting energy on some but not all of the resource units in said first trigger based frame.

Component 2814 includes a component 2816 configured to operate the first wireless station to transmit energy on at least one resource unit in said firsts trigger based frame while not transmitting any energy on the shared resource units identified by the information in the first trigger frame.

Component 2804 further includes a component 2818 configured to monitor for an acknowledgement from a first access point to which the first trigger based frame was transmitted, a component 2820 configured to operate the first wireless station to receive a first acknowledgment from the first access point corresponding to the first trigger based frame, and a component 2822 configured to process the first acknowledgment to determine if data transmitted in the resource units in said first trigger based frame on which the first wireless station transmitted energy was successfully received without checking to determine if the first access point successfully received data in the shared resource units for the first trigger based frame.

Component 2826 includes a component 2828 configured to operate the first wireless station to receive a second trigger frame from another wireless station, and a component 2830 configured to determine that a second trigger based frame corresponding to the second trigger frame includes one or more sets of shared resource units that are available for use by the first wireless station. Component 2830 includes a component 2832 configured to determine that a type indicator in said received second trigger frame indicates that the trigger frame is a shared transmission type of trigger frame. Component 2826 further includes a component 2833 configured to identify attributes of the second trigger based frame from the trigger frame fields included in the second trigger frame, and a component 2834 configured to identify the shared resource units corresponding to each of one or more sets of shared resource units in said second trigger based frame. Component 2834 includes a component 2836 configured to identify one or more sets of shared resource units in said second trigger based frame. Component 2836 includes a component 2840 configured to recover information identifying a set of shared resource units form a resource unit (RU) allocation field of a guest user information field of a user information list field of the second trigger frame.

Component 2826 further includes a component 2848 configured to determine that only a single set of shared resource is available to be used by a guest station in the second trigger based frame. Component 2848 includes a component 2850 configured to determine that the first wireless station received a set of host user information in a host user information field of the second trigger frame without receiving any guest user information fields in the user information list field of the second trigger frame.

Component 2826 further includes a component 2852 configured to determine the singe set of shared resource that are available to be used by a guest station in the second trigger based frame from received information identifying the total resources of the second trigger based frame and information identifying the resource units of the second trigger based frame which the another wireless station has reserved for its own use. Component 2852 includes a component 2854 configured to identify the single set of shared resources as the resources left over after removing the identified resource units of the second trigger based frame which the another user has reserved for its own use from the total resource units of the second trigger based frame.

Component 2826 further includes a component 2842 configured to select one of a plurality of identified sets of shared resource unit to be used by the first wireless station, and a component 2844 configured to determine that only a single set of shared resources is available to be used by a guest station in the second trigger based frame. Component 2844 includes a component 2846 configured to determine that only one set of guest user information in a guest user information field in a user information list field of the second trigger frame was received.

Component 2826 further includes a component 2856 configured to operate the first wireless station to transmit data to first access point in at least one of the one or more sets of shared resource units in the second trigger based frame, a component 2860 configured to operate the first wireless station to received a second acknowledgment form the first access point indicating whether or not the first access point successfully received data transmitted by the first wireless station using one or more shared resource units included in the second trigger based frame, and a component 2862 configured to determine from the received second acknowledgement if any of the data transmitted by the first wireless station in a shared resource unit was not successfully received.

Figure 29:
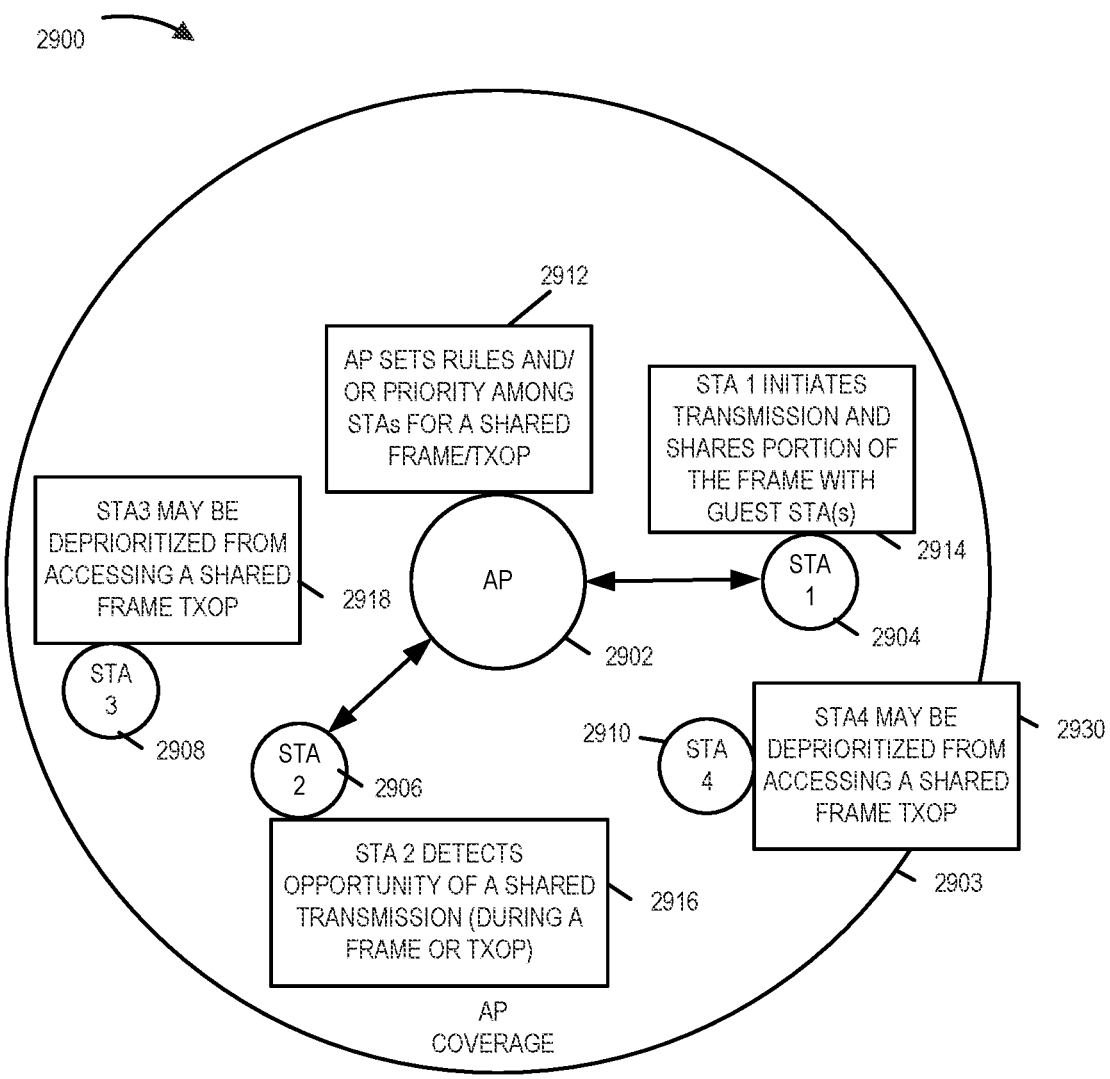
FIG. 29 is a drawing of an exemplary communications system in accordance with an exemplary embodiment.

FIG. 29 is a drawing of an exemplary communications system 2900 in accordance with an exemplary embodiment. Exemplary communications system 2900 includes an access point (AP) 2902, and a plurality of wireless stations (wireless station 1 (STA 1) 2904, wireless station 2 (STA 2) 2906, wireless station 3 (STA 3) 2908, wireless station 4 (STA 4) 2910). Access point 2902 has a corresponding wireless coverage area 2903.

Exemplary communications system 2900 supports medium sharing during UL in transmission opportunities and includes the implementation of a shared transmission type of trigger frame, which may be, and sometimes is, transmitted by a wireless station, which allows the wireless station to share its resources with other wireless stations during a corresponding trigger based (TB) frame. In accordance with a feature of various embodiments, an access point sets rules and/or priority among stations for a shared frame/transmission opportunity (TXOP).

AP 2902 sets rules and/or priority among stations for a shared frame/TXOP, as indicated by block 2912. In various embodiments, the AP 2902 communicates rule information and/or priority information to the STAs, e.g. in a beacon signal. In the example of FIG. 29, the communicated rules and priority information indicate the STA 2 2906 is allowed to use a guest resources from STA 1 2904. However, STA 2 2906 and STA 3 2808 have been deprioritized from accessing a shared frame/TXOP, as indicated by blocks 2918, 2920, respectively.

In the example of FIG. 29, STA 1 2904 has an uplink transmission opportunity, initiates transmission and shares a portion of its frame with guest STA(s) which are currently allowed to access the shared resources, as indicated by block 2914. Thus STA 1 2904, acting as a host STA, generates and transmits a shared transmission type trigger frame, which indicates which resource units it has reserved for its own use in a corresponding TB frame and information indicating which resource units in the TB frame are being shared and made available for allowed guest STAs to use. Subsequently, STA 1 2904, acting as the host STA transmits into the resource units of the TB frame, which it had reserved for its own use, e.g., sending data to the access point 2902.

STA 2 2906 detects the opportunity of a shared transmission (during a frame or TXOP), as indicated by block 2916. Thus STA 2 2906, which is allowed to used shared resources, detects the shared transmission trigger frame from STA 1 2904, identifies the resource units of the corresponding TB frame which are available to allowed guest STA(s), and transmits data to the AP 2902 on at least some of the TB resource units which have been made available to guest STAs.

The AP 2902, which has also received the shared transmission type trigger frame, identifies which resources of the TB frame are designated as host resources and which are designated as guest user(s) resources. The AP 2902 receives signals from STA 1 2904 communicated on the host resource units of the TB frame and receives signals from STA 2 2906 communicated on guest resource units of the TB frame. The AP 2902 processes the received signals communicated on the TB frame, generates an acknowledgment in response to the host STA 1 2902, generates an acknowledgment in response to the guest STA 2 2904, and transmits the acknowledgment. In some embodiments, both acknowledgments are sent in the same acknowledgement signal, which is transmitted from the AP 2902, e.g. a multicast signal.

In some embodiments, medium sharing during UL may be announced by a guest station (STA) at the beginning of a TXOP. A host STA indicates the attributes of the shared TXOP in an initiating (e.g., trigger) frame. A shared TXOP may be used by the AP or other STAs. Restrictions, may be applied to reduce the number of hidden nodes and/or to enhance coexistence. The early announcement of a shared TXOP helps other STAs to either become ready to use the shared TXOP or skip the TXOP duration. However, the sharing may be such that the guest STA does not transmit for a duration of the TXOP, and allow a guest STA or the AP to initiate transmission. For example, the guest STA allows its associated AP to use a portion or remainder of the TXOP. The AP may use the opportunity to transmit DL to the host STA and/or to other STAs. The AP may send a trigger frame followed by the transmission of the by host and/or guest STAs within a TB frame.

In some embodiments, medium sharing may be managed by the AP and announced for an extended period, e.g., across one or more TXOPs by one or more guest stations (STAs). The announcement by the AP may be, and sometimes is, in a management frame, e.g., a beacon frame, or a new frame type which transmits management, e.g., control. information, and would apply to each of the trigger and trigger-based (TB) frames with "shared transmission" attribute until a next announcement.

In some embodiments, the AP announces prioritized STAs (e.g., with low latency (LL) traffic) to use shared/leftover resource units (RUs) if available. In some embodiments, the prioritization may, and sometimes does, include specific mapping of a first (second) STA to a first (second) identified leftover RU in a shared trigger/TB. In some embodiments, the AP may, and sometimes does, also identify some PHY attributes for the leftover RUs used by the guest STAs, particularly modulation and coding scheme (MCS). Other PHY attributes, such as, TB duration and number of LTFs, are identified by the host STA.

Using such AP-administered sharing 802.11be devices may share leftover RUs with 802.11ax devices. However, to enable this the type of trigger frame may be set of one of those identified in FIG. 6. Also an 802.11ax STA should be capable to transmit a TB frame in response to a trigger frame from a non-AP STA of the same BSS. Or, a host STA may be delegated by the AP to use the MAC address of the AP in a shared trigger/TB transmission. Also, during the announcement by the AP, AID of such 802.11ax devices are announced, and a host STA identifies the 802.11ax STA in a "User Info field" in the trigger frame.

Figure 30A:
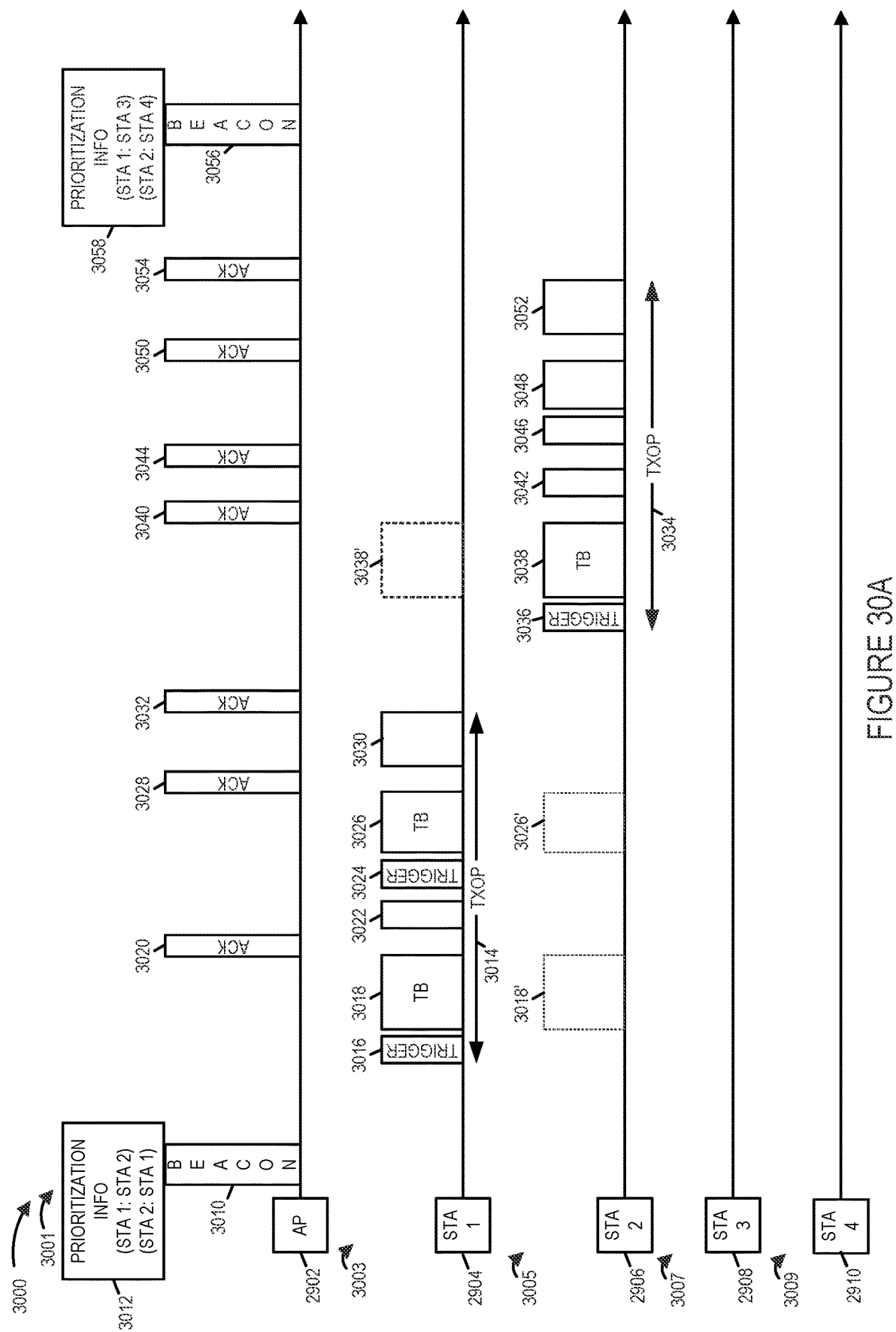
FIG. 30A is first part of a drawing illustrating exemplary signaling/signaling opportunities by an exemplary access point and exemplary STAs (STA 1, STA 2, STA 3, STA 4) in accordance with an exemplary embodiment, said signaling including beacon frames communicating prioritization information, shared transmission type trigger frames and corresponding trigger based (TB) frames.
Figure 30B:
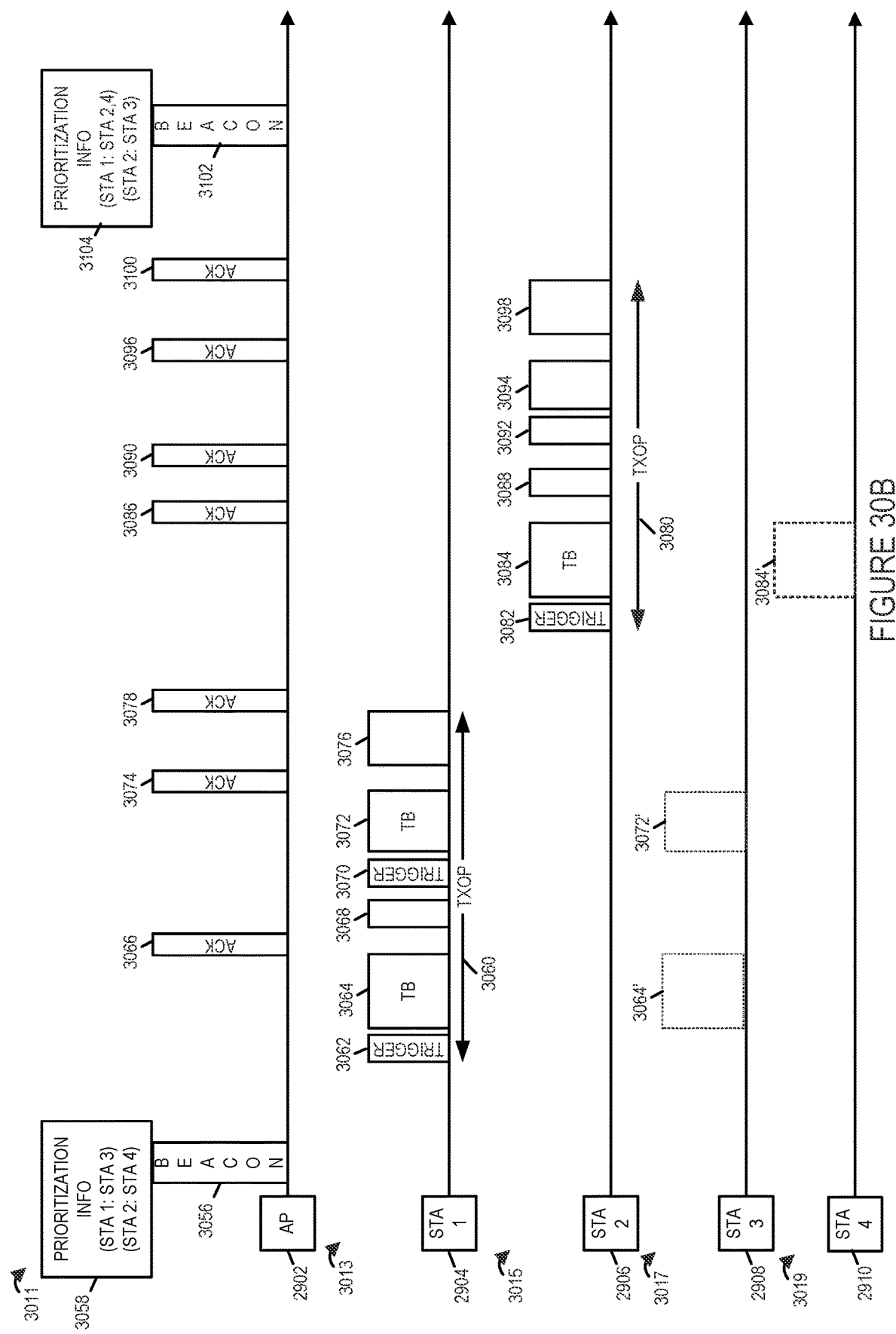
FIG. 30B is first second of a drawing illustrating exemplary signaling/signaling opportunities by an exemplary access point and exemplary STAs (STA 1, STA 2, STA 3, STA 4) in accordance with an exemplary embodiment, said signaling including beacon frames communicating prioritization information, shared transmission type trigger frames and corresponding trigger based (TB) frames.
Figure 30C:
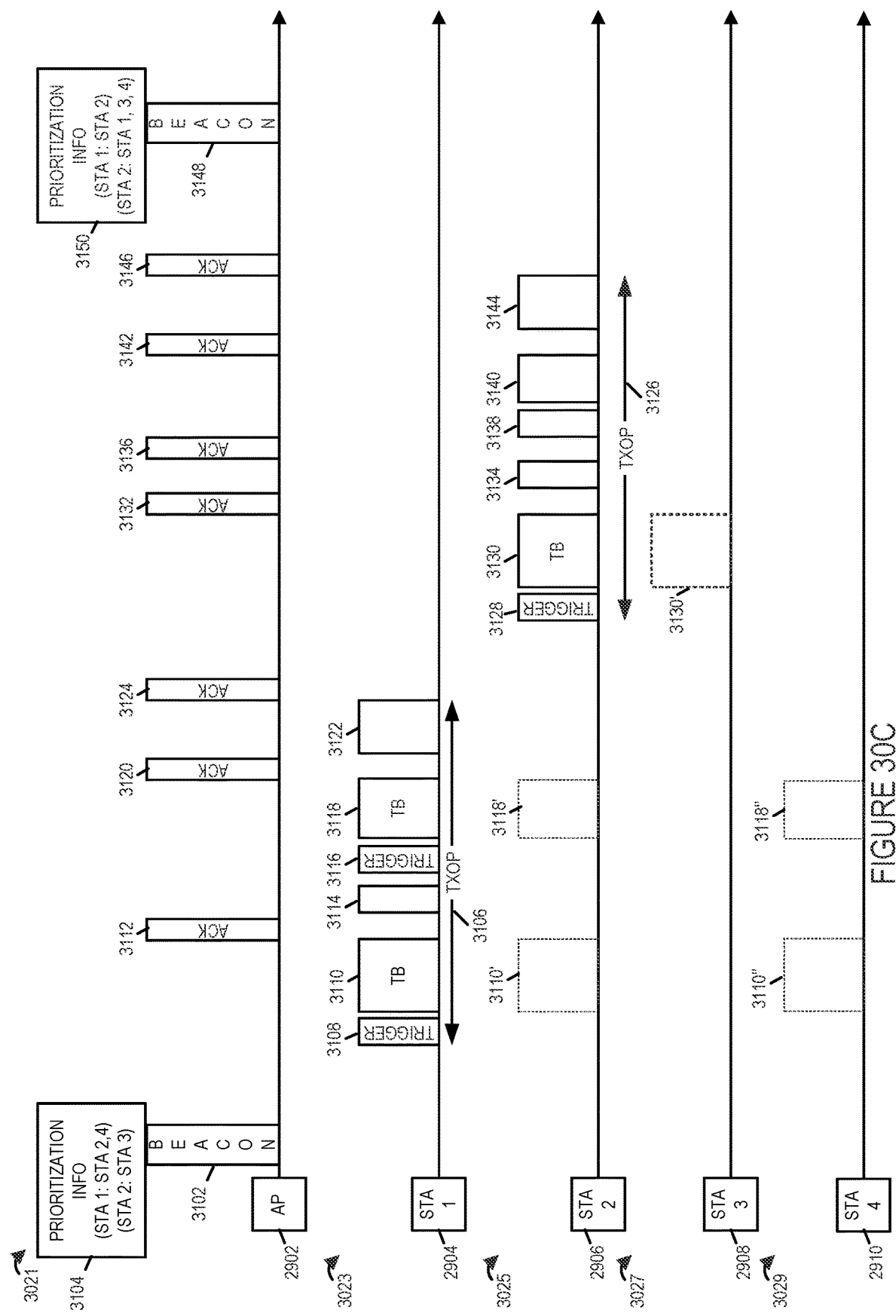
FIG. 30C is third part of a drawing illustrating exemplary signaling/signaling opportunities by an exemplary access point and exemplary STAs (STA 1, STA 2, STA 3, STA 4) in accordance with an exemplary embodiment, said signaling including beacon frames communicating prioritization information, shared transmission type trigger frames and corresponding trigger based (TB) frames.

FIG. 30, which comprises the combination of FIG. 30A, FIG. 30B and FIG. 30C, is a drawing 3000 illustrating exemplary signaling/signaling opportunities by the AP 2902 and STAs (STA 1 2904, STA 2 2906, STA 3 2908, STA 4 2910) in accordance with an exemplary embodiment.

Drawing 30A includes a frequency vs time plot 3001 corresponding to AP 2902 for a time interval including first beacon signal 3010 and second beacon signal 3056. Drawing 30A further includes a frequency vs time plot 3003 corresponding to STA1 2904 for the time interval including first beacon signal 3010 and second beacon signal 3056. Drawing 30A further includes a frequency vs time plot 3005 corresponding to STA2 2906 for the time interval including first beacon signal 3010 and second beacon signal 3056. Drawing 30A further includes a frequency vs time plot 3007 corresponding to STA3 2908 for the time interval including first beacon signal 3010 and second beacon signal 3056. Drawing 30A further includes a frequency vs time plot 3009 corresponding to STA4 2910 for the time interval including first beacon signal 3010 and second beacon signal 3056.

AP 2002 generates and transmits first beacon signal 3010, e.g., a broadcast signal, communicating prioritization information 3012. Prioritization information 3012 indicates i) STA 2 2006 is allowed to use shared resources made available by STA 1 2904; and ii) STA 1 2004 is allowed to use shared resources made available by STA 2 2904. Each of the STAs (2904, 2906, 2908, 2910) receives the beacon signal 3010 and recovers the communicated information 3012.

STA 1 2904 has a transmission opportunity (TXOP) 3014, e.g., in accordance with a predetermined timing structure and/or which has been granted to STA 1 2904 by AP 2902.

STA 1 2904 decides to share some of its resources with other STAs. During STA 1's TXOP 3014, STA 1 2904 generates and transmits shared transmission trigger frame 3016, which includes information identifying host user resource units of a TB frame and resource units of the TB frame which may be used by allowed guest user(s). A Trigger Based (TB) frame (represented by blocks 3018/3018') corresponds to trigger frame 3016. The host STA, which is STA 1 2904 transmits data to the AP 2902 on at least some of the host user resource units of TB frame 3018, while refraining from transmitting on the guest user resource units of TB frame 3018.

STA 2 2906, which is allowed to use guest user resource made available from STA 1 2904 in accordance with the prioritization information 3012, receives the trigger frame 3016, identifies the available guest user resource units in the TB frame, and may, and sometimes does, transmit signals on guest user resource units of TB frame 3018'.

STA 3 2908 and STA 4 2910 are not allowed to use guest user resources, in accordance with the prioritization information 3012, and thus cannot transmit into the TB frame corresponding to trigger frame 3016.

AP 2902, which has detected trigger frame 3016, receives signals including data from STA 1 2904, on host resource units of TB frame 3018 and may, and sometimes does, receives signals including data from STA 2 2906, on guest resource units of TB frame 3018'. The AP 2902 processes the received signals communicated on the TB frame (3018/3018') and generates acknowledgment(s), which are transmitted, in an acknowledgment signal 3020, e.g. a multicast ACK signal.

During TXOP 3014, STA 1 2904, decides to transmit uplink signals to AP 2902 on resources 3022 without sharing any of the resources with guest STAs, generates the uplink signals and transmits the uplink signals on resources 3022 to AP2902. In this example, the signals transmitted on resources 3022 do not require acknowledgment from the AP 2902.

STA 1 2904 again decides to share some of its resources with other STAs. During STA 1's TXOP 3014, STA 1 2904 generates and transmits shared transmission trigger frame 3024, which includes information identifying host user resource units of a TB frame and resource units of the TB frame which may be used by allowed guest user(s). A Trigger Based (TB) frame (represented by blocks 3026/3026') corresponds to trigger frame 3024. The host STA, which is STA 1 2904 transmits data to the AP 2902 on at least some of the host user resource units of TB frame 3026, while refraining from transmitting on the guest user resource units of TB frame 3026.

STA 2 2906, which is allowed to use guest user resources made available from STA 1 2904 in accordance with the prioritization information 3012, receives the trigger frame 3024, identifies the available guest user resource units in the TB frame, and may, and sometimes does, transmit signals on guest user resource units of TB frame 3026'.

STA 3 2908 and STA 4 2910 are not allowed to use guest user resources, in accordance with the prioritization information 3012, and thus cannot transmit into the TB frame corresponding to trigger frame 3024.

AP 2902, which has detected trigger frame 3024, receives signals including data from STA 1 2904, on host resource units of TB frame 3026 and may, and sometimes does, receives signals including data from STA 2 2906, on guest resource units of TB frame 3026'. The AP 2902 processes the received signals communicated on the TB frame (3026/3026') and generates acknowledgment(s), which are transmitted, in an acknowledgment signal 3028, e.g. a multicast ACK signal.

During TXOP 3014, STA 1 2904, decides to transmit uplink signals to AP 2902 on resources 3030 without sharing any of the resources with guest STAs, generates the uplink signals and transmits the uplink signals on resources 3030 to AP2902. The signals transmitted on resources 3022 require an acknowledgment from the AP 2902, and AP 2902 generates and transmits ACK signal 3032 directed to STA 1 2904.

STA 2 2906 has a transmission opportunity (TXOP) 3034, e.g., in accordance with a predetermined timing structure and/or which has been granted to STA 2 2906 by AP 2902.

STA 2 2906 decides to share some of its resources with other STAs. During STA 2's TXOP 3034, STA 2 2906 generates and transmits shared transmission trigger frame 3036, which includes information identifying host user resource units of a TB frame and resource units of the TB frame which may be used by allowed guest user(s). A Trigger Based (TB) frame (represented by blocks 3038/3038') corresponds to trigger frame 3036. The host STA, which is STA 2 2906, transmits data to the AP 2902 on at least some of the host user resource units of TB frame 3038, while refraining from transmitting on the guest user resource units of TB frame 3038.

STA 1 2904, which is allowed to use guest user resources made available from STA 2 2906 in accordance with the prioritization information 3012, receives the trigger frame 3036, identifies the available guest user resource units in the TB frame, and may, and sometimes does, transmit signals on guest user resource units of TB frame 3038'.

STA 3 2908 and STA 4 2910 are not allowed to use guest user resources, in accordance with the prioritization information 3012, and thus cannot transmit into the TB frame corresponding to trigger frame 3036.

AP 2902, which has detected trigger frame 3036, receives signals including data from STA 2 2906, on host resource units of TB frame 3038 and may, and sometimes does, receive signals including data from STA 1 2904, on guest resource units of TB frame 3038'. The AP 2902 processes the received signals communicated on the TB frame (3038/3038') and generates acknowledgment(s), which are transmitted, in an acknowledgment signal 3040, e.g., a multicast ACK signal.

During TXOP 3034, STA 2 2906, decides to transmit uplink signals to AP 2902 on resources 3042 without sharing any of the resources with guest STAs, generates the uplink signals and transmits the uplink signals on resources 3042 to AP 2902. The signals transmitted on resources 3042 require an acknowledgment from the AP 2902, and AP 2902 generates and transmits ACK signal 3044 directed to STA 2 2906.

During TXOP 3034, STA 2 2906, decides to transmit uplink signals to AP 2902 on resources 3046 without sharing any of the resources with guest STAs, generates the uplink signals and transmits the uplink signals on resources 3046 to AP 2902. The signals transmitted on resources 3046 do not require an acknowledgment from the AP 2902.

During TXOP 3034, STA 2 2906, decides to transmit uplink signals to AP 2902 on resources 3048 without sharing any of the resources with guest STAs, generates the uplink signals and transmits the uplink signals on resources 3048 to AP 2902. The signals transmitted on resources 3048 require an acknowledgment from the AP 2902, and AP 2902 generates and transmits ACK signal 3050 directed to STA 2 2906.

During TXOP 3034, STA 2 2906, decides to transmit uplink signals to AP 2902 on resources 3052 without sharing any of the resources with guest STAs, generates the uplink signals and transmits the uplink signals on resources 3052 to AP 2902. The signals transmitted on resources 3052 require an acknowledgment from the AP 2902, and AP 2902 generates and transmits ACK signal 3054 directed to STA 2 2906.

AP 2902 re-evaluates priority information and generates and transmits second beacon signal 3056, e.g., a broadcast signal, communicating prioritization information 3058, which is an update from beacon information 3012 of first beacon signal 3010. Prioritization information 3058 indicates: i) STA 3 2908 is allowed to use shared resources made available by STA 1 2904; and ii) STA 4 2904 is allowed to use shared resources made available by STA 2 2906. Each of the STAs (2904, 2906, 2908, 2910) receives the beacon signal 3056 and recovers the communicated information 3058.

Drawing 30B includes a frequency vs time plot 3011 corresponding to AP 2902 for a time interval including second beacon signal 3056 and third beacon signal 3102. Drawing 30B further includes a frequency vs time plot 3013 corresponding to STA1 2904 for the time interval including second beacon signal 3056 and third beacon signal 3102. Drawing 30B further includes a frequency vs time plot 3015 corresponding to STA2 2906 for the time interval including second beacon signal 3056 and third beacon signal 3102. Drawing 30B further includes a frequency vs time plot 3017 corresponding to STA3 2908 for the time interval including second beacon signal 3056 and third beacon signal 3102. Drawing 30B further includes a frequency vs time plot 3019 corresponding to STA4 2910 for the time interval including second beacon signal 3056 and third beacon signal 3102.

STA 1 2904 has a transmission opportunity (TXOP) 3060, e.g., in accordance with a predetermined timing structure and/or which has been granted to STA 1 2904 by AP 2902.

STA 1 2904 decides to share some of its resources with other STAs. During STA 1's TXOP 3060, STA 1 2904 generates and transmits shared transmission trigger frame 3062, which includes information identifying host user resource units of a TB frame and resource units of the TB frame which may be used by allowed guest user(s). A Trigger Based (TB) frame (represented by blocks 3064/3064') corresponds to trigger frame 3062. The host STA, which is STA 1 2904, transmits data to the AP 2902 on at least some of the host user resource units of TB frame 3064, while refraining from transmitting on the guest user resource units of TB frame 3064.

STA 3 2908, which is allowed to use guest user resources made available from STA 1 2904 in accordance with the prioritization information 3058, receives the trigger frame 3062, identifies the available guest user resource units in the TB frame, and may, and sometimes does, transmit signals on guest user resource units of TB frame 3064'.

STA 2 2906 and STA 4 2910 are not allowed to use guest user resources, in accordance with the prioritization information 3058, and thus cannot transmit into the TB frame corresponding to trigger frame 3062.

AP 2902, which has detected trigger frame 3062, receives signals including data from STA 1 2904, on host resource units of TB frame 3064 and may, and sometimes does, receives signals including data from STA 3 2908, on guest resource units of TB frame 3064'. The AP 2902 processes the received signals communicated on the TB frame (3064/3064') and generates acknowledgment(s), which are transmitted, in an acknowledgment signal 3066, e.g. a multicast ACK signal.

During TXOP 3060, STA 1 2904, decides to transmit uplink signals to AP 2902 on resources 3068 without sharing any of the resources with guest STAs, generates the uplink signals and transmits the uplink signals on resources 3068 to AP 2902. In this example, the signals transmitted on resources 3068 do not require acknowledgment from the AP 2902.

STA 1 2904 again decides to share some of its resources with other STAs. During STA 1's TXOP 3060, STA 1 2904 generates and transmits shared transmission trigger frame 3070, which includes information identifying host user resource units of a TB frame and resource units of the TB frame which may be used by allowed guest user(s). A Trigger Based (TB) frame (represented by blocks 3072/3072') corresponds to trigger frame 3070. The host STA, which is STA 1 2904, transmits data to the AP 2902 on at least some of the host user resource units of TB frame 3072, while refraining from transmitting on the guest user resource units of TB frame 3072.

STA 3 2908, which is allowed to use guest user resource made available from STA 1 2904 in accordance with the prioritization information 3058, receives the trigger frame 3070, identifies the available guest user resource units in the TB frame, and may, and sometimes does, transmit signals on guest user resource units of TB frame 3072'.

STA 2 2906 and STA 4 2910 are not allowed to use guest user resources, in accordance with the prioritization information 3058, and thus cannot transmit into the TB frame corresponding to trigger frame 3070.

AP 2902, which has detected trigger frame 3070, receives signals including data from STA 1 2904, on host resource units of TB frame 3072 and may, and sometimes does, receive signals including data from STA 3 2908, on guest resource units of TB frame 3072'. The AP 2902 processes the received signals communicated on the TB frame (3072/3072') and generates acknowledgment(s), which are transmitted, in an acknowledgment signal 3078, e.g. a multicast ACK signal.

During TXOP 3060, STA 1 2904, decides to transmit uplink signals to AP 2902 on resources 3076 without sharing any of the resources with guest STAs, generates the uplink signals and transmits the uplink signals on resources 3076 to AP 2902. The signals transmitted on resources 3076 require an acknowledgment from the AP 2902, and AP 2902 generates and transmits ACK signal 3078 directed to STA 1 2904.

STA 2 2906 has a transmission opportunity (TXOP) 3080, e.g., in accordance with a predetermined timing structure and/or which has been granted to STA 2 2906 by AP 2902.

STA 2 2906 decides to share some of its resources with other STAs. During STA 2's TXOP 3080, STA 2 2906 generates and transmits shared transmission trigger frame 3082, which includes information identifying host user resource units of a TB frame and resource units of the TB frame which may be used by allowed guest user(s). A Trigger Based (TB) frame (represented by blocks 3084/3084') corresponds to trigger frame 3082. The host STA, which is STA 2 2906, transmits data to the AP 2902 on at least some of the host user resource units of TB frame 3084, while refraining from transmitting on the guest user resource units of TB frame 3084.

STA 4 2910, which is allowed to use guest user resource made available from STA 2 2906 in accordance with the prioritization information 3058, receives the trigger frame 3082, identifies the available guest user resource units in the TB frame, and may, and sometimes does, transmit signals on guest user resource units of TB frame 3084'.

STA 1 2904 and STA 3 2908 are not allowed to use guest user resources, in accordance with the prioritization information 3058, and thus cannot transmit into the TB frame corresponding to trigger frame 3082.

AP 2902, which has detected trigger frame 3082, receives signals including data from STA 2 2906, on host resource units of TB frame 3084 and may, and sometimes does, receive signals including data from STA 4 2910, on guest resource units of TB frame 3084'. The AP 2902 processes the received signals communicated on the TB frame (3084/3084') and generates acknowledgment(s), which are transmitted, in an acknowledgment signal 3086, e.g., a multicast ACK signal.

During TXOP 3080, STA 2 2906, decides to transmit uplink signals to AP 2902 on resources 3088 without sharing any of the resources with guest STAs, generates the uplink signals and transmits the uplink signals on resources 3088 to AP 2902. The signals transmitted on resources 3088 require an acknowledgment from the AP 2902, and AP 2902 generates and transmits ACK signal 3090 directed to STA 2 2906.

During TXOP 3080, STA 2 2906, decides to transmit uplink signals to AP 2902 on resources 3092 without sharing any of the resources with guest STAs, generates the uplink signals and transmits the uplink signals on resources 3092 to AP 2902. The signals transmitted on resources 3092 do not require an acknowledgment from the AP 2902.

During TXOP 3080, STA 2 2906, decides to transmit uplink signals to AP 2902 on resources 3094 without sharing any of the resources with guest STAs, generates the uplink signals and transmits the uplink signals on resources 3094 to AP 2902. The signals transmitted on resources 3094 require an acknowledgment from the AP 2902, and AP 2902 generates and transmits ACK signal 3096 directed to STA 2 2906.

During TXOP 3080, STA 2 2906, decides to transmit uplink signals to AP 2902 on resources 3098 without sharing any of the resources with guest STAs, generates the uplink signals and transmits the uplink signals on resources 3098 to AP 2902. The signals transmitted on resources 3098 require an acknowledgment from the AP 2902, and AP 2902 generates and transmits ACK signal 3100 directed to STA 2 2906.

AP 2902 re-evaluates priority information and generates and transmits third beacon signal 3102, e.g., a broadcast signal, communicating prioritization information 3104, which is an update from beacon information 3058 of second beacon signal 3056. Prioritization information 3104 indicates: i) STA 2 2906 and STA 4 2910 are allowed to use shared resources made available by STA 1 2904; and ii) STA 3 2908 is allowed to use shared resources made available by STA 2 2906. Each of the STAs (2904, 2906, 2908, 2910) receives the beacon signal 3102 and recovers the communicated information 3104.

Drawing 30C includes a frequency vs time plot 3021 corresponding to AP 2902 for a time interval including third beacon signal 3102 and fourth beacon signal 3148. Drawing 30C further includes a frequency vs time plot 3023 corresponding to STA1 2904 for the time interval including third beacon signal 3056 and fourth beacon signal 3148. Drawing 30C further includes a frequency vs time plot 3025 corresponding to STA2 2906 for the time interval including third beacon signal 3102 and fourth beacon signal 3148. Drawing 30C further includes a frequency vs time plot 3027 corresponding to STA3 2908 for the time interval including third beacon signal 3102 and fourth beacon signal 3148. Drawing 30C further includes a frequency vs time plot 3029 corresponding to STA4 2910 for the time interval including third beacon signal 3102 and fourth beacon signal 3148.

STA 1 2904 has a transmission opportunity (TXOP) 3106, e.g., in accordance with a predetermined timing structure and/or which has been granted to STA 1 2904 by AP 2902.

STA 1 2904 decides to share some of its resources with other STAs. During STA 1's TXOP 3106, STA 1 2904 generates and transmits shared transmission trigger frame 3108, which includes information identifying host user resource units of a TB frame and resource units of the TB frame which may be used by allowed guest user(s). A Trigger Based (TB) frame (represented by blocks 3110/3110'/3110") corresponds to trigger frame 3108. The host STA, which is STA 1 2904 transmits data to the AP 2902 on at least some of the host user resource units of TB frame 3110, while refraining from transmitting on the guest user resource units of TB frame 3110.

STA 2 2906, which is allowed to use guest user resources made available from STA 1 2904 in accordance with the prioritization information 3104, receives the trigger frame 3108, identifies the available guest user resource units in the TB frame, and may, and sometimes does, transmit signals on guest user resource units of TB frame 3110'.

STA 4 2910, which is allowed to use guest user resources made available from STA 1 2904 in accordance with the prioritization information 3104, receives the trigger frame 3108, identifies the available guest user resource units in the TB frame, and may, and sometimes does, transmit signals on guest user resource units of TB frame 3110".

STA 2 2906 is not allowed to use guest user resources, in accordance with the prioritization information 3104, and thus cannot transmit into the TB frame corresponding to trigger frame 3108.

AP 2902, which has detected trigger frame 3108, receives signals including data from STA 1 2904, on host resource units of TB frame 3110 and may, and sometimes does, receive signals including data from STA 2 2906, on guest resource units of TB frame 3110' and/or receive signals including data from STA 4 2910, on guest resource units of TB frame 3110". The AP 2902 processes the received signals communicated on the TB frame (3110/3110'/3110") and generates acknowledgment(s), which are transmitted, in an acknowledgment signal 3112, e.g. a multicast ACK signal.

During TXOP 3106, STA 1 2904, decides to transmit uplink signals to AP 2902 on resources 3114 without sharing any of the resources with guest STAs, generates the uplink signals and transmits the uplink signals on resources 3114 to AP 2902. In this example, the signals transmitted on resources 3114 do not require acknowledgment from the AP 2902.

STA 1 2904 again decides to share some of its resources with other STAs. During STA 1's TXOP 3106, STA 1 2904 generates and transmits shared transmission trigger frame 3116, which includes information identifying host user resource units of a TB frame and resource units of the TB frame which may be used by allowed guest user(s). A Trigger Based (TB) frame (represented by blocks 3118/3118'/3118") corresponds to trigger frame 3116. The host STA, which is STA 1 2904 transmits data to the AP 2902 on at least some of the host user resource units of TB frame 3118, while refraining from transmitting on the guest user resource units of TB frame 3118.

STA 2 2906, which is allowed to use guest user resource made available from STA 1 2904 in accordance with the prioritization information 3104, receives the trigger frame 3116, identifies the available guest user resource units in the TB frame, and may, and sometimes does, transmit signals on guest user resource units of TB frame 3118'. STA 4 2910, which is allowed to use guest user resource made available from STA 1 2904 in accordance with the prioritization information 3104, receives the trigger frame 3116, identifies the available guest user resource units in the TB frame, and may, and sometimes does, transmit signals on guest user resource units of TB frame 3118".

STA 3 2908 is not allowed to use guest user resources, in accordance with the prioritization information 3104, and thus cannot transmit into the TB frame corresponding to trigger frame 3116.

AP 2902, which has detected trigger frame 3116, receives signals including data from STA 1 2904, on host resource units of TB frame 3118 and may, and sometimes does, receive signals including data from STA 2 2906, on guest resource units of TB frame 3118' and/or receive signals including data from STA 4 2910, on guest resource units of TB frame 3118". The AP 2902 processes the received signals communicated on the TB frame (3118/3118'/3118") and generates acknowledgment(s), which are transmitted, in an acknowledgment signal 3120, e.g. a multicast ACK signal.

During TXOP 3060, STA 1 2904, decides to transmit uplink signals to AP 2902 on resources 3122 without sharing any of the resources with guest STAs, generates the uplink signals and transmits the uplink signals on resources 3122 to AP 2902. The signals transmitted on resources 3122 require an acknowledgment from the AP 2902, and AP 2902 generates and transmits ACK signal 3124 directed to STA 1 2904.

STA 2 2906 has a transmission opportunity (TXOP) 3126, e.g., in accordance with a predetermined timing structure and/or which has been granted to STA 2 2906 by AP 2902.

STA 2 2906 decides to share some of its resources with other STAs. During STA 2's TXOP 3126, STA 2 2906 generates and transmits shared transmission trigger frame 3128, which includes information identifying host user resource units of a TB frame and resource units of the TB frame which may be used by allowed guest user(s). A Trigger Based (TB) frame (represented by blocks 3130/3130') corresponds to trigger frame 3128. The host STA, which is STA 2 2906, transmits data to the AP 2902 on at least some of the host user resource units of TB frame 3130, while refraining from transmitting on the guest user resource units of TB frame 3130.

STA 3 2902, which is allowed to use guest user resource made available from STA 2 2906 in accordance with the prioritization information 3104, receives the trigger frame 3128, identifies the available guest user resource units in the TB frame, and may, and sometimes does, transmit signals on guest user resource units of TB frame 3130'.

STA 1 2904 and STA 4 2910 are not allowed to use guest user resources, in accordance with the prioritization information 3104, and thus cannot transmit into the TB frame corresponding to trigger frame 3128.

AP 2902, which has detected trigger frame 3128, receives signals including data from STA 2 2906, on host resource units of TB frame 3130 and may, and sometimes does, receive signals including data from STA 3 2908, on guest resource units of TB frame 3130'. The AP 2902 processes the received signals communicated on the TB frame (3130/3130') and generates acknowledgment(s), which are transmitted, in an acknowledgment signal 3132, e.g., a multicast ACK signal.

During TXOP 3126, STA 2 2906, decides to transmit uplink signals to AP 2902 on resources 3134 without sharing any of the resources with guest STAs, generates the uplink signals and transmits the uplink signals on resources 3134 to AP 2902. The signals transmitted on resources 3134 require an acknowledgment from the AP 2902, and AP 2902 generates and transmits ACK signal 3136 directed to STA 2 2906.

During TXOP 3126, STA 2 2906, decides to transmit uplink signals to AP 2902 on resources 3138 without sharing any of the resources with guest STAs, generates the uplink signals and transmits the uplink signals on resources 3138 to AP 2902. The signals transmitted on resources 3138 do not require an acknowledgment from the AP 2902.

During TXOP 3126, STA 2 2906, decides to transmit uplink signals to AP 2902 on resources 3140 without sharing any of the resources with guest STAs, generates the uplink signals and transmits the uplink signals on resources 3140 to AP 2902. The signals transmitted on resources 3140 require an acknowledgment from the AP 2902, and AP 2902 generates and transmits ACK signal 3142 directed to STA 2 2906.

During TXOP 3126, STA 2 2906, decides to transmit uplink signals to AP 2902 on resources 3144 without sharing any of the resources with guest STAs, generates the uplink signals and transmits the uplink signals on resources 3'44 to AP 2902. The signals transmitted on resources 3144 require an acknowledgment from the AP 2902, and AP 2902 generates and transmits ACK signal 3146 directed to STA 2 2906.

AP 2902 re-evaluates priority information and generates and transmits fourth beacon signal 3148, e.g., a broadcast signal, communicating prioritization information 3150, which is an update from beacon information 3104 of third beacon signal 3102. Prioritization information 3150 indicates: i) STA 2 2906 is allowed to use shared resources made available by STA 1 2904; and ii) STA 1 2904, STA 3 2908, and STA 4 2910 are allowed to use shared resources made available by STA 2 2906. Each of the STAs (2904, 2906, 2908, 2910) receives the beacon signal 3148 and recovers the communicated information 3148.

Figure 31:
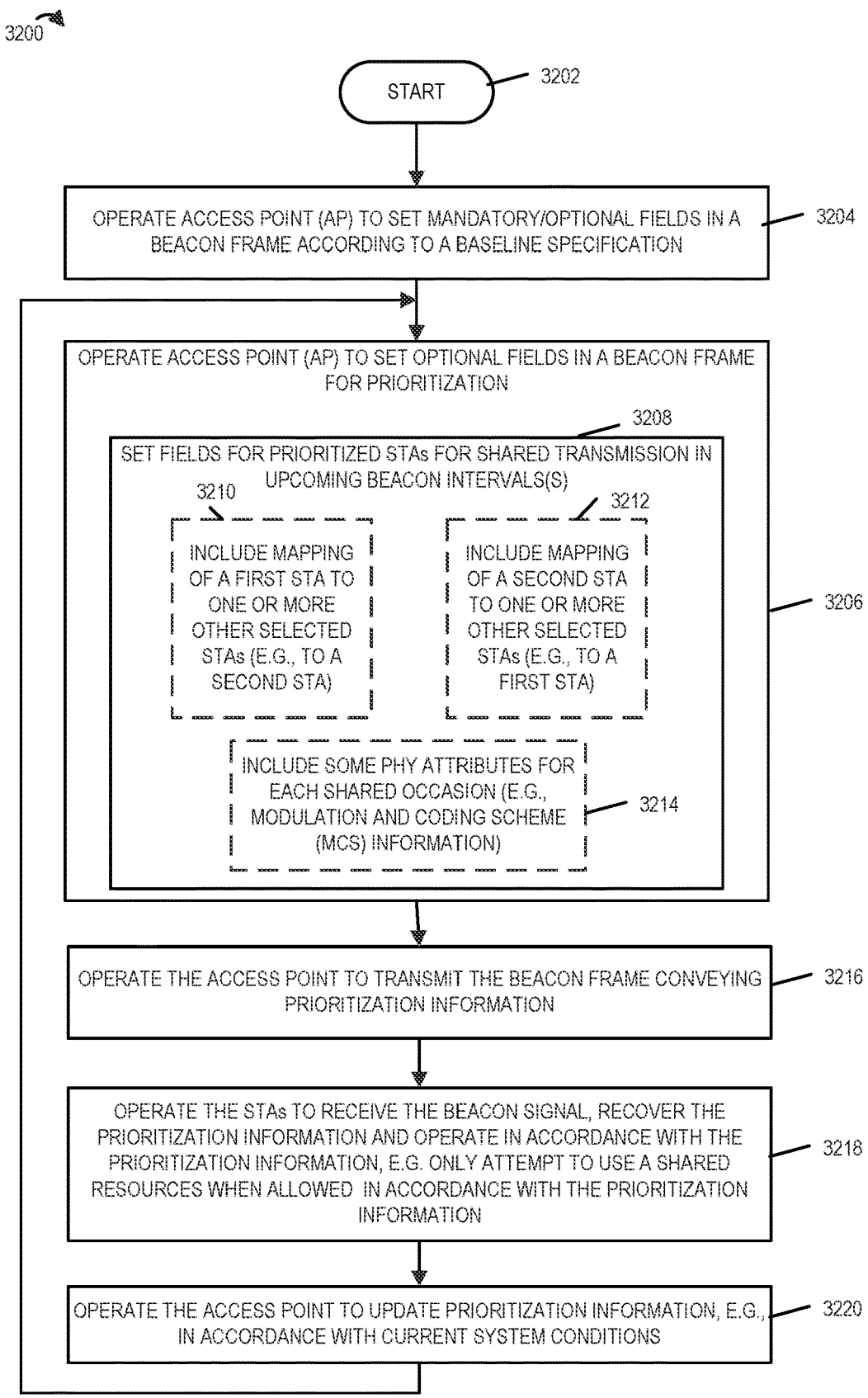
FIG. 31 is a flowchart of an exemplary method of operating a communications system including at least one access point (AP) and a plurality of wireless stations (STAs), in which wireless STAs can, and sometimes do, transmit shared transmission trigger frames and in which the access point can, and sometimes does, transmit, e.g., in beacon frames, prioritization information regarding shared resources of trigger based frames corresponding to shared transmission trigger frames, in accordance with an exemplary embodiment.

FIG. 31 is a flowchart 3200 of an exemplary method of operating a communications system including at least one access point (AP) and a plurality of wireless stations (STAs), in which wireless STAs can, and sometimes do, transmit shared transmission trigger frames and in which the access point can, and sometimes does, transmit, e.g., in beacon frames, prioritization information regarding shared resources of trigger based frames corresponding to shared transmission trigger frames, in accordance with an exemplary embodiment. Operation starts in step 3202 in which the access point is powered on and initialized. Operation proceeds from start step 3202 to step 3204. In step 3204 the access point (AP) sets mandatory/optional fields in a beacon frame to a baseline specification. Operation proceeds from step 3204 to step 3206.

In step 3206 the access point (AP) sets optional fields in a beacon frame for prioritization. Step 3206 includes step 3208 in which the access point sets fields for prioritized STAs for shared transmission in upcoming beacon interval(s). In some embodiments, step 3206 includes one or more or all of steps 3208, 3210 and 3212. In step 3208 the access point includes mapping of a first STA to one or more other selected STAs, e.g. to a second STA. In step 3210 the access point includes mapping of a second STA to one or more other selected STAs, e.g. to a first STA. In step 3212 the access point includes some PHY attributes for each shared occasion, e.g. modulation and coding scheme (MCS) information. Operation proceeds from step 3206 to step 3216.

In step 3216 the access point transmits the beacon frame conveying the prioritization information. Operation proceeds from step 3216 to step 3218. In step 3218 the STAs are operated to receive the beacon frame signal, recover the communicated prioritization information, and operate in accordance with the prioritization information, e.g., only attempt to use shared resources when allowed in accordance with the prioritization information. Operation proceeds from step 3216 to step 3218.

In step 3218 the access point updates prioritization information, e.g., in accordance with current conditions. Operation proceeds from step 3218 to the input of step 3204.

Figure 32A:
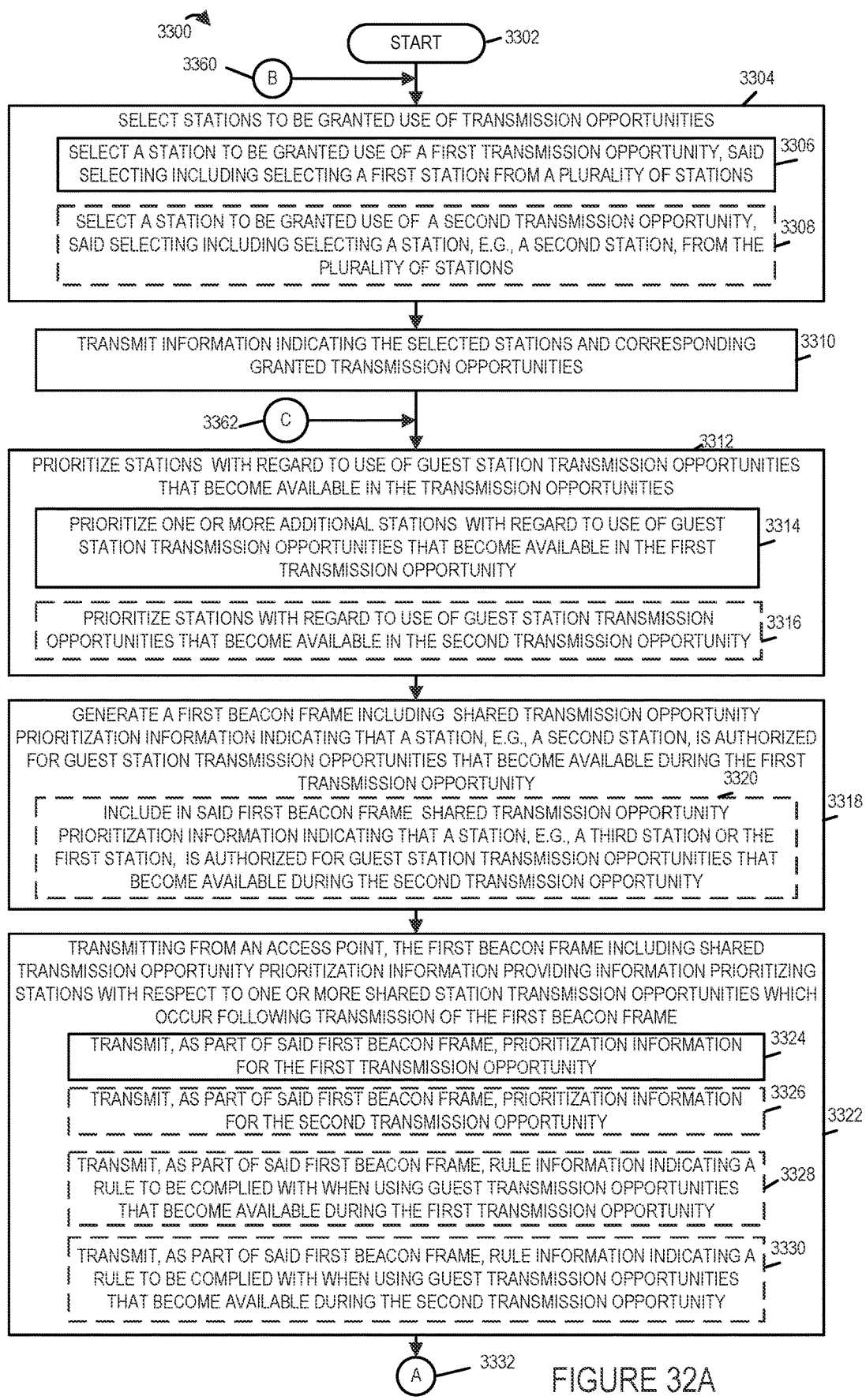
FIG. 32A is a first part of a flowchart of an exemplary method of operating an access point (AP), in which the access point transmits shared transmission opportunity prioritization information providing information prioritizing stations with respect to one or more share transmission opportunities, in accordance with an exemplary embodiment.

FIG. 32, comprising the combination of FIG. 32A and FIG. 32B, is a flowchart 3300 of an exemplary method of operating an access point (AP) in accordance with an exemplary embodiment. Operation starts in step 3302 in which the access point is powered on and initialized. Operation proceeds from step 3202 to step 3204. In step 3204 the access points selection stations to be granted use of transmission opportunities. Step 3304 includes step 3306, and optionally includes step 3308. In step 3306 the access point selects a station to be granted use of first transmission opportunity, said selecting including selecting a first station, e.g., STA 1, from a plurality of stations. In step 3308 the access point selects a station to be granted use of second transmission opportunity, said selecting including selecting a station, e.g., a second station, e.g., STA 2, from the plurality of stations. Operation proceeds from step 3304 to step 3312.

In step 3312 the access point prioritizes stations with regard to use of guest station transmission opportunities.

Step 3312 includes step 3314 and optionally includes step 3316. In step 3314 the access point priorities one or more additional stations with regard to use of guest station transmission opportunities that become available during the first transmission opportunity. In some embodiments, said one or more additional stations are prioritized based on latency requirements of data to be transmitted by stations being prioritized, the priority of data to be transmitted and/or the amount of data stations transmitted in one or more preceding transmission opportunities.

In step 3316 the access point priorities stations with regard to use of guest station transmission opportunities that become available during the second transmission opportunity. Operation proceeds from step 3312 to step 3318.

In step 3318 the access point generates a first beacon frame including shared transmission opportunity prioritization information including information indicating that a station, e.g., a second station, is authorized for guest transmission opportunities that become available during the first transmission opportunity. In some embodiments, step 3318 includes step 3320 in which the access point includes in the first beacon frame shared transmission opportunity prioritization information including information indicating that a station, e.g., a third station or the first station, is authorized for guest transmission opportunities that become available during the second transmission opportunity. Operation proceeds from step 3318 to step 3322.

In step 3322, the access point transmits, from the access point, the first beacon frame including shared transmission opportunity prioritization information proving information prioritizing stations with respect to one or more shared transmission opportunities which occur following transmission of the first beacon frame. Step 3322 includes step 3324, and may and sometimes does, include one or more or all of optional steps 3326, 3328, and 3330.

In step 3324 the access point transmits, as part of said first beacon frame, prioritization information for the first transmission opportunity. In step 3326 the access point transmits, as part of said first beacon frame, prioritization information for the second transmission opportunity. In some embodiments, the second station is authorized to use the second transmission opportunity, said second station being a second host station which is a host with regard to the second transmission opportunity, and the second transmission opportunity prioritization information includes second guest station prioritization information, the second guest station prioritization information setting priorities with regard to one or more stations with regard to guest transmission opportunities that become available in the second transmission opportunity.

In step 3328 the access point transmits, as part of the first beacon frame, rule information to be complied with when using guest transmission opportunities that become available during the first transmission opportunity. In some embodiments, said rule information indicates coding schemes and/or modulation rates that can be used by the guest stations during the guest transmission opportunities. In some such embodiments, the rule information indicates that guest stations are to use modulation rates within an indicated range of modulation rates corresponding to the modulation rate used by the host station during the first transmission opportunity (e.g., guest station can use the same modulation rate as the host station, a modulation rate one level above the modulation rate used by the host station or a modulation rate one level below the modulation rate used by the host station.) In some embodiments, the rule information indicates transmission power levels that can be used by guest stations during guest transmission opportunities.

In step 3330 the access point transmits, as part of the first beacon frame, rule information to be complied with when using guest transmission opportunities that become available during the second transmission opportunity. Operation proceeds from step 3322, via connecting node A 3332, to step 3334.

In step 3334, the access point receives from the first station, acting as a first host station, a first trigger frame. Operation proceeds from step 3334 to step 3336. In step 3336 the access point determines from first guest transmission opportunity information included in the first trigger frame at least one guest transmission opportunity in the first transmission opportunity, that is authorized by the first host station, that is available as a shared transmission opportunity which can be used by a guest station. Operation proceeds from step 3336 to step 3338. In step 3338 the access point receives on unshared transmission resource of the first transmission opportunity a first trigger based frame transmitted by the first station, which is a host station with respect to the first station transmission opportunity. Operation proceeds from step 3338 to step 3340. In step 3340 the access point receives on shared transmission resource units of the first station transmission opportunity signals from one or more authorized guest stations. Step 3340 includes step 3342 in which the access point receives on one or more shared transmission resource units of the first station transmission opportunity a signal from a first guest station. Operation proceeds from step 3340 to step 3344. In step 3344 the access point transmits acknowledgments to the first host station and one or more guest stations. Operation proceeds from step 3344 to step 3358, or to optional step 3346, e.g., for embodiments in which optional steps 3346, 3348, 3350, 3352, 3354 and 3356 are performed.

In step 3346, the access point receives from a first station, e.g., the second station, acting as a second host station, a second trigger frame. Operation proceeds from step 3346 to step 3348. In step 3348 the access point determines from guest transmission opportunity information included in the second trigger frame at least one guest transmission opportunity in the second transmission opportunity, that is authorized by the second host station, that is available as a shared transmission opportunity which can be used by a guest station. Operation proceeds from step 3348 to step 3350. In step 3350 the access point receives on unshared transmission resource of the second station transmission opportunity a second trigger based frame transmitted by the second station, which is a host station with respect to the second station transmission opportunity. Operation proceeds from step 3350 to step 3352. In step 3352 the access point receives on shared transmission resource units of the second station transmission opportunity signals from one or more authorized guest stations. Step 3352 includes step 3354 in which the access point receives on one or more shared transmission resource units of the second station transmission opportunity a signal from a guest station, e.g., the first station or a third station. Operation proceeds from step 3352 to step 3354. In step 3354 the access point transmits acknowledgments to the second host station and one or more guest stations. Operation proceeds from step 3356 to step 3358.

In step 3358, the access point determines if the access point is to change assignments for transmission opportunities, e.g. in accordance with a predetermined schedule. If the access point determines that it is to change assignments for transmission opportunities, then operation proceeds from step 3358, via connecting node B 3360 to step 3304, in which the access points again selects stations to be granted use of transmission opportunities. If the access point determines, in step 3358, that it is not to change assignments for transmission opportunities, then operation proceeds from step 3358, via connecting node C 3362 to step 3312, in which the access point again prioritizes station with regard to used of guest station transmission opportunities the become available in the first transmission opportunity.

In some embodiments, said first station transmission opportunity is owned by said first station, said first station having a right to use the transmission resources of the first station transmission opportunity to the exclusion of other stations. In some such embodiments, the first station also has the right to invite one or more other stations to share transmission resources included in the first station transmission opportunity and wherein the first station indicates transmission resources in the first station transmission opportunity which are made available for sharing.

In some embodiments, the shared transmission opportunity prioritization information indicates guest station priorities which depend on which of a plurality of stations operates as a host station during a transmission opportunity. In some such embodiments, the shared transmission opportunity prioritization information identifies a second station which has transmission priority with regard to shared transmission opportunities when said first station operates as a host station. In some such embodiments, the shared transmission opportunity prioritization information identifies a third station which is authorized to use guest transmission opportunities when the second station acts as a host station, said first, second and third stations being different stations. In some such embodiments, said first station acts as a first host station during said first transmission opportunity and said second station acts as a host station in a subsequent transmission opportunity, said second station having transmission priority with regard to shared resources during said first transmission opportunity, said third station having transmission priority with regard to shared resources during said second transmission opportunity.

In some embodiments, the guest STAs, may belong to a different BSS compared to the host STA. The trigger frame transmitted by the host STA includes BSS Color (in the PHY header, SIG-A) that identifies the originating BSS. An additional flag bit is carried in the PHY header or in the Common Info field of the Trigger frame to indicate if guest STAs of other BSSs can utilize the guest or leftover resources.

In some embodiments, during a shared transmission (i.e. a Trigger/TB frame exchange with shared transmission Trigger Type), upon reception of frames with BSS Color that is not recognized as own, an AP forwards the frames to the AP of the corresponding BSS.

Note: BSS Color is a shortened identifier, carried in 11ax SIG-A field, that identifies one of the Basic Service Set) that an AP provides to its associated stations. Alternatively, multiple APs may likely be in the coverage of the trigger and TB frames and capable of receiving the two frames and processing them. In such a case, and AP processes a Trigger/TB frame even if it indicates a different BSS Color. The AP attempts to process the leftover RUs to find out if one of its STAs has transmitted in the leftover RUs. The AP processes the trigger frames (those with a different BSS Color than its own) only of it indicates of a shared transmission in the Trigger Type and if the above-mentioned flag is set (indicates that shared transmission from other BSS is allowed.)

Figure 33:
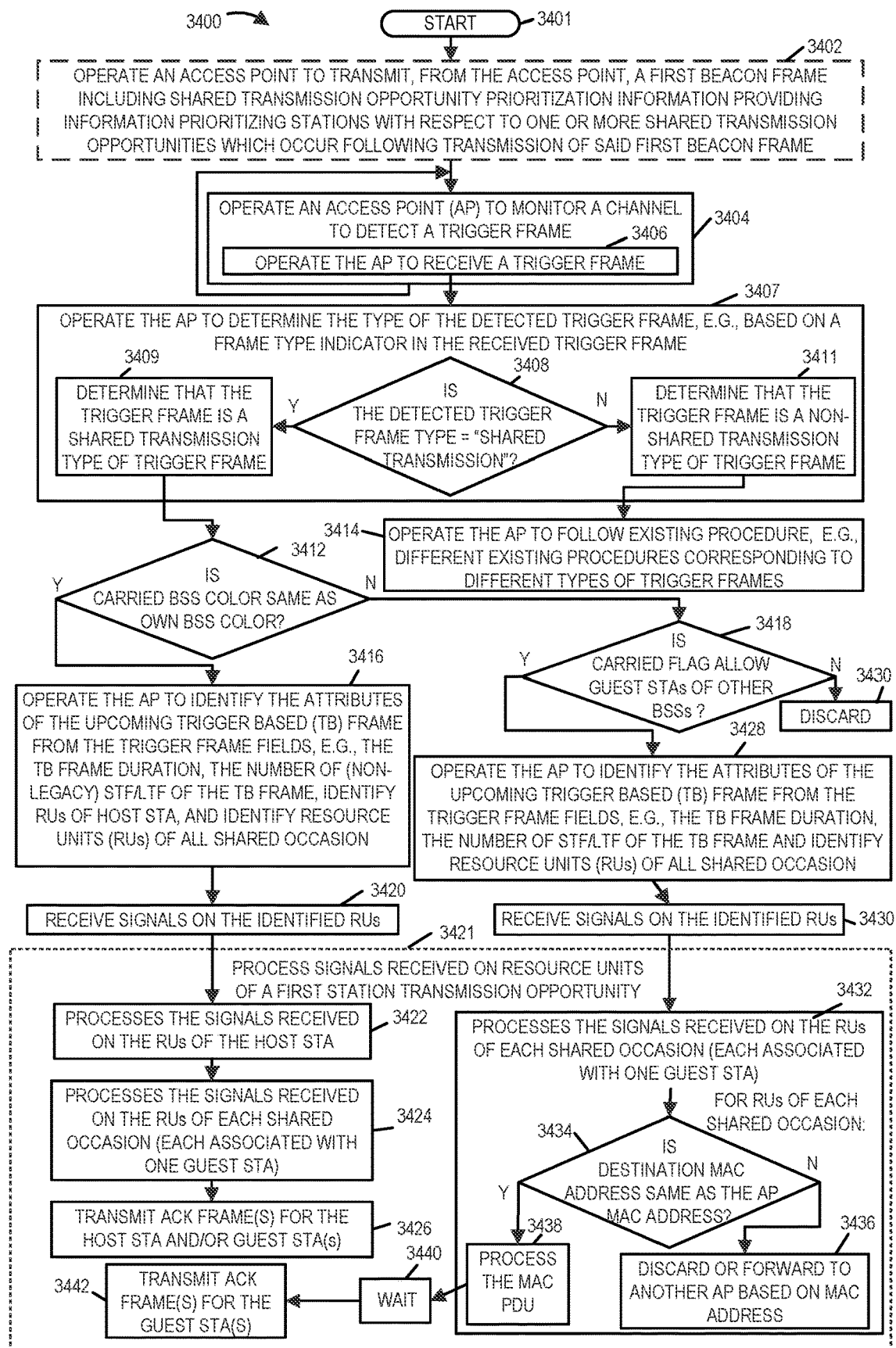
FIG. 33 is a flowchart of an exemplary method of operating an access point (AP), e.g., an access point in a communications system including a plurality of access point (APs) and a plurality of wireless stations (STAs), in which wireless STAs can, and sometimes do, transmit shared transmission trigger frames in accordance with an exemplary embodiment, accordance with an exemplary embodiment.

FIG. 33 is a flowchart 3400 of an exemplary method of operating an access point (AP), e.g., an access point in a communications system including a plurality of access point (APs) and a plurality of wireless stations (STAs), in which wireless STAs can, and sometimes do, transmit shared transmission trigger frames in accordance with an exemplary embodiment, accordance with an exemplary embodiment. Operation starts in step 3401 in which the access point is powered on and initialized. In some embodiments, operation proceeds from step 3301 to step 3302. In other embodiments, optional step 3402 is bypassed, and operation proceeds from step 3401 to step 3404. In step 3402 the access point transmits, from the access point, a first beacon frame included shared transmission opportunity prioritization information providing information prioritizing stations with respect to one or more shared transmission opportunities which occur following transmission of said beacon frame. In some embodiments, the access point, transmits a beacon frame included updated shared transmission opportunity prioritization information on an ongoing basis, e.g., a periodic basis in accordance with a predetermined schedule. Operation proceeds from step 3402 to step 3404.

In step 3404 the access point (AP) monitors a channel to detect a trigger frame. Step 3404 is performed on an ongoing basis. Step 3404 may, and sometimes does, include step 3406 in which the AP receives a trigger frame, e.g., a first trigger frame from a first station acting as the host station with regard to a first transmission opportunity, said first trigger frame being received prior to receipt of a corresponding first trigger based frame. Operation proceeds from step 3406 to step 3407.

In step 3407 the AP determines the type of detected trigger frame, e.g., based on a frame type indicator in the received trigger frame. For example, in step 3407 the access point checks if a frame type indicator in the received trigger frame indicates that the first trigger frame is shared transmission type trigger frame. FIG. 9 illustrates an exemplary table, which may be stored in the access point, of different trigger frame types and exemplary corresponding encoding values for each trigger frame type, where value "8" indicates "shared transmission" type trigger frame. Step 3407 includes steps 3408, 3409 and 3411.

In step 3408, if the detected trigger frame type="shared transmission", then operation proceeds from step 3408 to step 3409 in which the access point determines that the trigger frame type is a shared transmission type of trigger frame; otherwise, operation proceeds from step 3408 to step 3411, in which the access point determines that the trigger frame is a non-shared transmission type of trigger frame. Operation proceeds from step 3411 to step 3414 in which the AP is operated to follow the existing procedure, e.g., different existing procedures corresponding to different types of trigger frames.

Returning to step 3409, operation proceeds from step 3409 to step 3412, in which the AP determines if the carried BSS color (indicated in the detected shared transmission trigger frame) is the same as its own BSS color. Thus step 3412 determines if a BSS color indicated in the received trigger frame matches a BSS color of the access point. If the carried BSS color is the same as its own BSS color then operation proceeds from step 3412 to step 3416; otherwise, operation proceeds from step 3412 to step 3418.

In step 3416 the AP identifies the attributes of the upcoming trigger based frame (TB) frame from the trigger frame fields, e.g., the TB frame duration, the number of (non-legacy) STF.LTF of the TB frame, etc. In step 3416 the AP further identifies the resource units (RUs) of the host STA, and identifies the resource units (RUs) of all shared occasion. Operation proceeds from step 3416 to step 3420.

In step 3420 the access point receives signals on the identified RUs. This includes receives signals from the host STA on unshared resource units and receiving signals from one or more guest STAs on shared resources. Operation proceeds from step 3420 to step 3422. In step 3422 the AP processes the signals received on the RUs of the host STA. For example, in step 3422 the access point processes signals received on resource units of the first transmission opportunity used by the host STA. Operation proceeds from step 3422 to step 3424. In step 3424, the access point processes the signals received in the RUs of each shared occasion (each associated with one guest STA). For example, in step 3424 the access point processes signals received on resource units of the first transmission opportunity used by a guest STA. Operation proceeds from step 3424 to step 3426. In step 3426 the access point transmits ACK frame(s) for the host STA and/or guest STA(s). For example, in step 3426 the access point transmits one or more acknowledgments acknowledging receipt of the signals received from the host station and signals received from the guest station.

Returning to step 3418, in step 3418, the access point determines if the carried flag in the detected shared transmission type trigger frame indicates that guest STAs of other BSSs are allowed. Thus in step 3418 the access point checks to determine if the flag in the received trigger frame indicates that a guest station, using a trigger based frame corresponding to the received trigger frame, is permitted to have a different BSS color (e.g., corresponds to a different service set) than the host station which transmitted the received trigger frame.

If the carried flag indicates that guest STAs of other BSSs are not allowed, then operation proceeds from step 3418 to step 3430 in which the access point discards the detected shared transmission type trigger frame (since the access point cannot be the intended recipient of signals on shared RUs of the TB frame corresponding to the detected trigger frame). However, if the carried flag indicates that guest STAs of other BSSs are allowed, then operation proceeds from step 3418 to step 3428, in which the access point (AP) identifies the attributes of the upcoming trigger based frame (TB) frame from the trigger frame fields, e.g., the TB frame duration, the number of (non-legacy) STF/LTF of the TB frame, etc., and the AP further identifies the resource units (RUs) of all shared occasion (since the AP may be the intended recipient of signals communicated on one or more of the shared occasion(s) of the TB frame corresponding to the detected trigger frame). Operation proceeds from step 3428 to step 3430.

In step 3430 the access point receives signals on the identified RUs. Step 3430 includes receiving signals on one or more sets of shared resource units, e.g., each set of shared resource units associated with a guest STA. Operation proceeds from step 3330 to step 3332. In step 3332, the access point processes the signals received in the RUs of each shared occasion (each associated with one guest STA). Step 3432 includes steps 3434, 3436 and 3430. One iteration of step 3434 and one of: steps 3436 and 3438 is performed, as part of the processing for RUs of each shared occasion.

In step 3334 the access point determines (e.g., for a set shared RUs corresponding to an occasion which are being processed) if the destination media access control (MAC) address is the same as the AP MAC address (which would indicate that the AP is the intended recipient of the signals on the set of shared RUs). If the destination MAC address is not the same as the AP MAC address then, operation proceeds from step 3334 to step 3346, in which the AP discards the MAC PDU or forwards the MAC PDU to another AP based on the MAC address, since the payload is intended for a different AP. However, if the destination MAC address is the same as the AP MAC address then, operation proceeds from step 3334 to step 3338, in which the AP processes the MAC PDU and recovers the information communicated in the payload. Operation proceeds from step 3338 to wait step 3340, and then to step 3342 in which the AP transmits ACK frame(s) for the guest STA(s), e.g. at the appropriate time for ACK in response to the received TB frame in from which the MAC PDU of step 3338 was recovered.

In some embodiments, steps 3422, 3424, 2426, 3442 including steps 3434, 3436 and 3438, step 3440 and step 3442 are part of step 3421, in which the access point processes signals received on resource units of a first station transmission opportunity.

Figures 34, 34A:
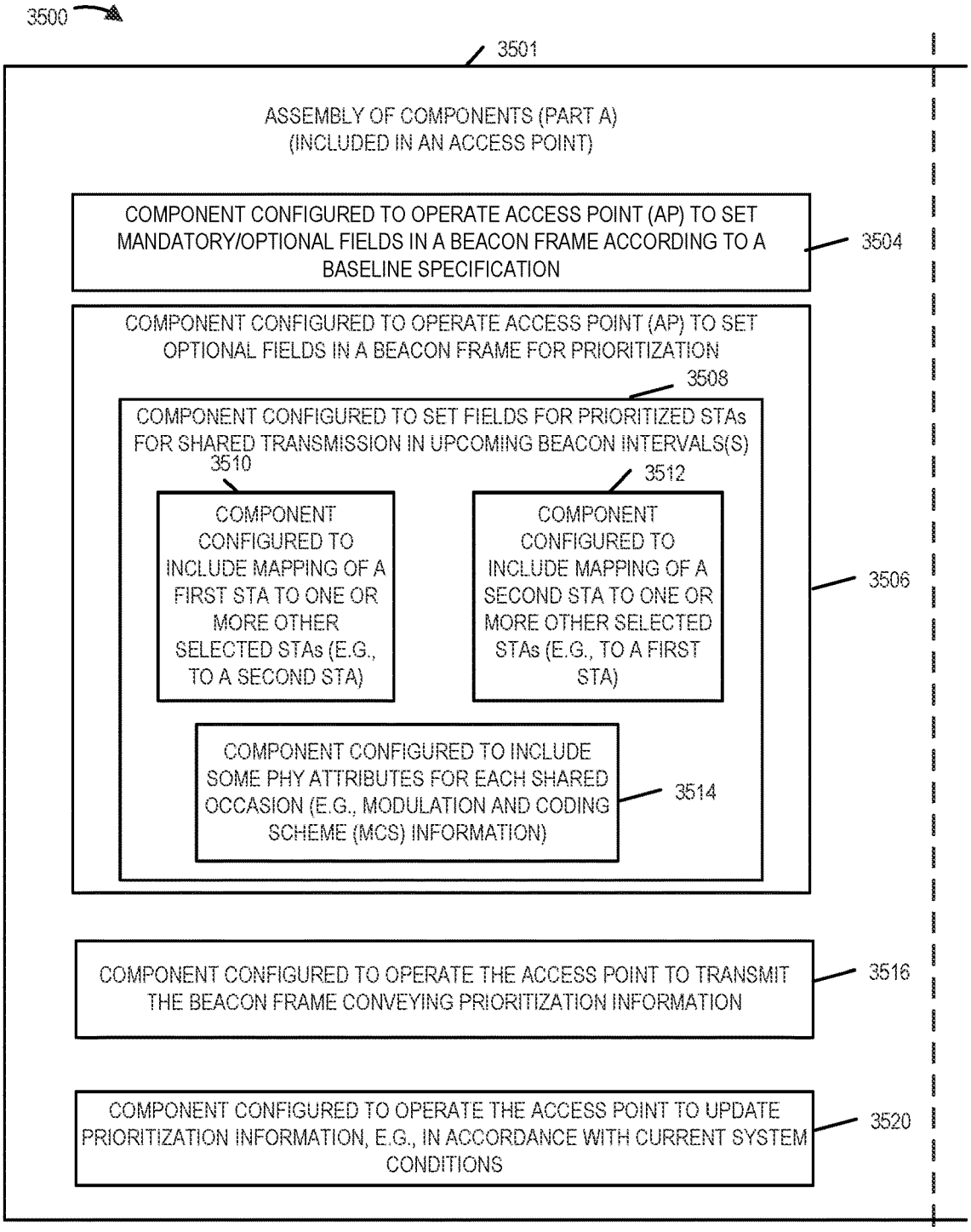
FIG. 34A is a first part of an assembly of components which may be included in an exemplary access point in accordance with an exemplary embodiment.
FIG. 34 comprises the combination of FIG. 34A, FIG. 34B, FIG. 34C and FIG. 34D.
Figure 34B:
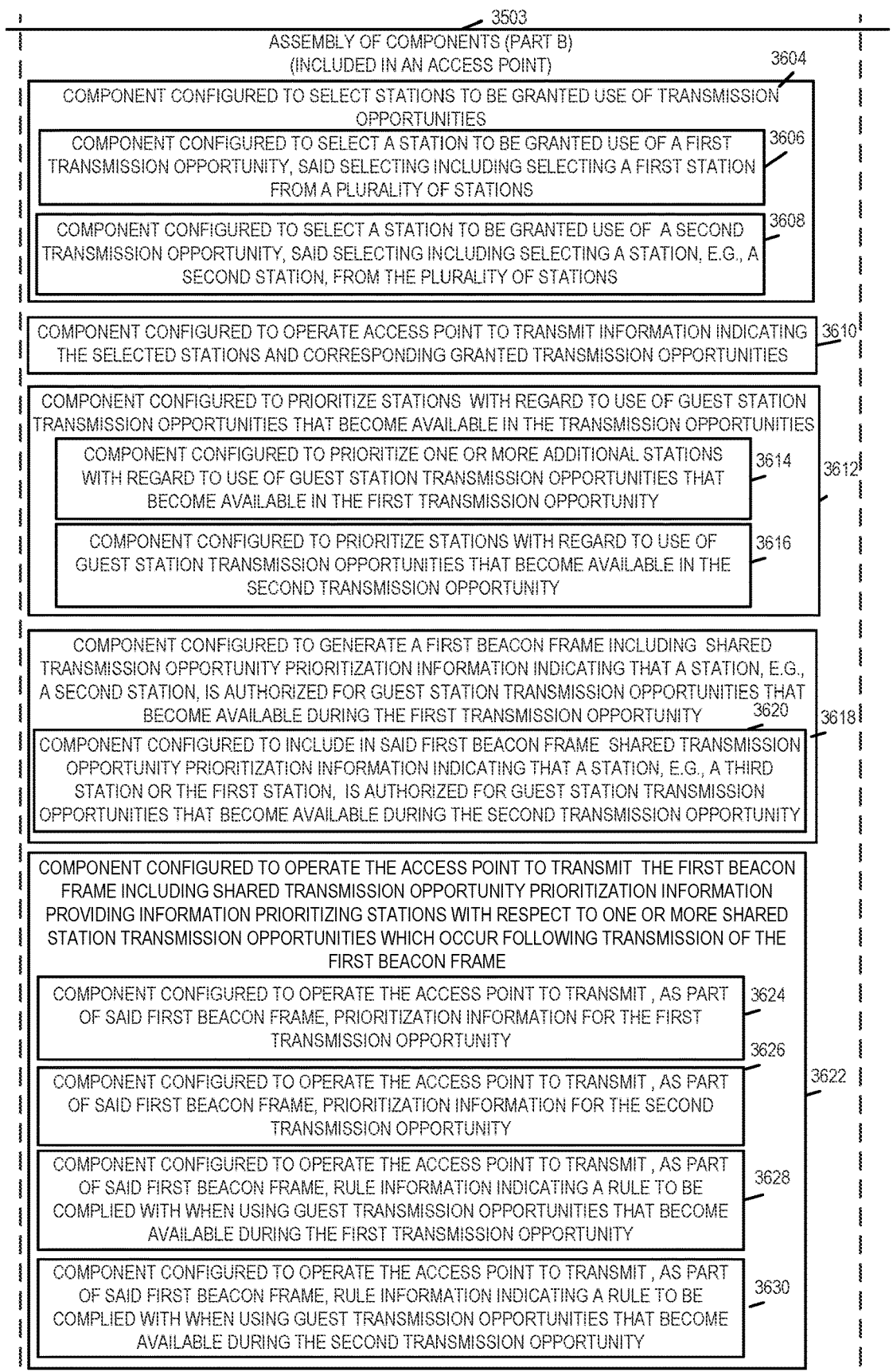
FIG. 34B is a second part of an assembly of components which may be included in an exemplary access point in accordance with an exemplary embodiment.
Figure 34C:
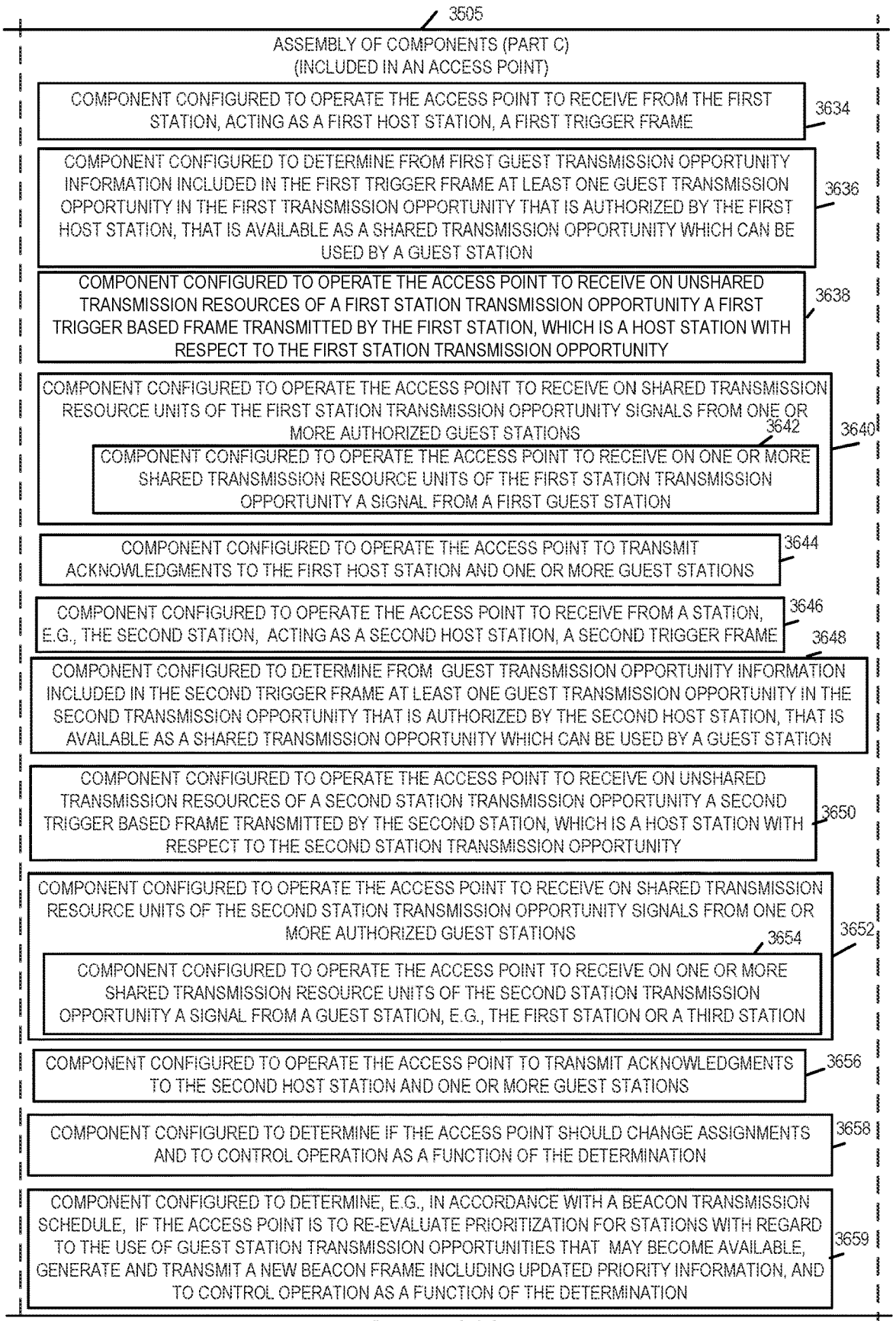
FIG. 34C is a third part of an assembly of components which may be included in an exemplary access point in accordance with an exemplary embodiment.
Figure 34D:
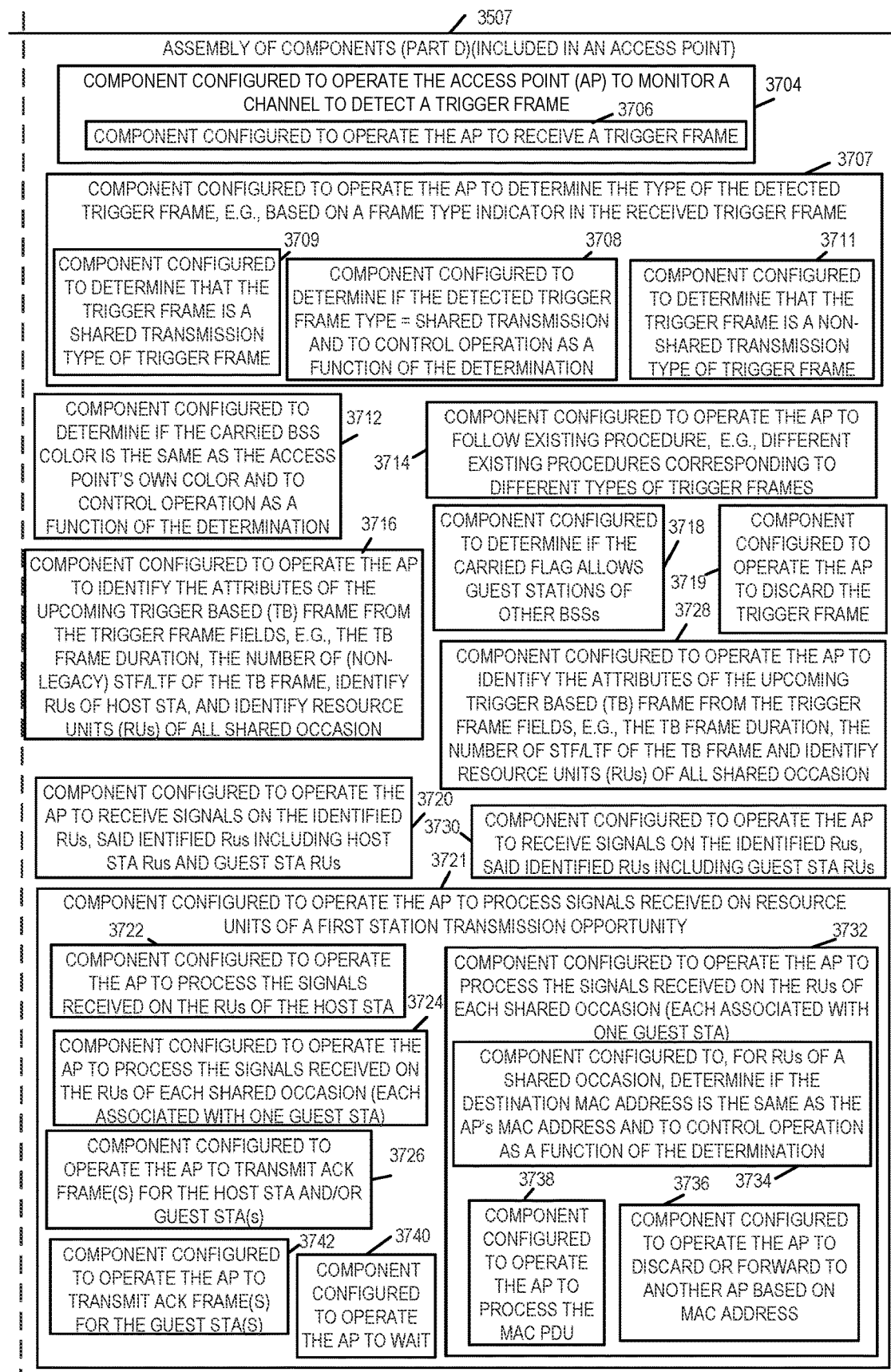
FIG. 34D is a fourth part of an assembly of components which may be included in an exemplary access point in accordance with an exemplary embodiment.

FIG. 34, comprising the combination of FIG. 34A, FIG. 34B, FIG. 34C and FIG. 34D, is a drawing of an assembly of components 3500, comprising the combination of Part A 3501, Part B 3503, Part C 3505 and Part D 3507, in accordance with an exemplary embodiment.

Assembly of components 3500 which may be included in an access point (AP), e.g. access point 2700, in accordance with an exemplary embodiment. Exemplary assembly of components 3500 may be, and sometimes is, included in an exemplary access point, e.g., exemplary access point 2700, e.g., an access point implementing the method of flowchart 1600 of FIG. 16, an access point implementing steps of the method of flowchart 3200 of FIG. 31, an access point implementing the method of flowchart 3300 of FIG. 32, an access point implementing the method of flowchart 3400 of FIG. 33, any of the access points (2502, 2504, 2506, 2508, 2510) of system 2500 of FIG. 25, the access point 2902 of FIG. 30-31 and/or any of the access points described with respect to any FIGS. 8-33.

The components in the assembly of components 3500 can be, and in some embodiments are, implemented fully in hardware within the processor 2702, e.g., as individual circuits. The components in the assembly of components 3500 can, and in some embodiments are, implemented fully in hardware within the assembly of components 2708, e.g., as individual circuits corresponding to the different components. In other embodiments some of the components are implemented, e.g., as circuits, within the processor 2702 with other components being implemented, e.g., as circuits within assembly of components 2708, external to and coupled to the processor 2702. As should be appreciated the level of integration of components on the processor and/or with some components being external to the processor may be one of design choice. Alternatively, rather than being implemented as circuits, all or some of the components may be implemented in software and stored in the memory 2712 of the access point 2700 with the components controlling operation of the access point to implement the functions corresponding to the components when the components are executed by a processor, e.g., processor 2702. In some such embodiments, the assembly of components 3500 is included in the memory 2712 as assembly of components 2716. In still other embodiments, various components in assembly of components 3500 are implemented as a combination of hardware and software, e.g., with another circuit external to the processor providing input to the processor 2702 which then under software control operates to perform a portion of a component's function. While processor 2702 is shown in the FIG. 27 embodiment as a single processor, e.g., computer, it should be appreciated that the processor 2702 may be implemented as one or more processors, e.g., computers.

When implemented in software the components include code, which when executed by the processor 2702, configure the processor 2702 to implement the function corresponding to the component. In embodiments where the assembly of components 3500 is stored in the memory 2712, the memory 2712 is a computer program product comprising a computer readable medium comprising code, e.g., individual code for each component, for causing at least one computer, e.g., processor 2702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 34 control and/or configure the access point 2700, or elements therein such as the processor 2702, to perform the functions of corresponding steps illustrated and/or described in the method of one or more of the flowcharts, signaling diagrams and/or described with respect to any of the Figures. Thus the assembly of components 3500 includes various components that perform functions of corresponding one or more described and/or illustrated steps of an exemplary method, e.g., steps of the method of flowchart 3200 of FIG. 31, steps of the method of flowchart 3300 of FIG. 32, steps of the method of flowchart 3400 of FIG. 33 and/or described or shown with respect to any of the other figures.

Assembly of components 3500 includes a component 3504 configured to operate the access point to set mandatory/optional fields in a beacon frame according to a baseline specification, a component 3506 configured to set optional fields in a beacon frame for prioritization, a component 3516 configured to operate the access point to transmit the beacon frame conveying prioritization information and a component 3520 configured to operate the access point to update prioritization information, e.g., in accordance with current system conditions.

Component 3506 includes a component 3508 configured to set fields for prioritized stations (STAs) for shared transmission in upcoming beacon interval(s). Component 3508 includes a component 3510 configured to include a mapping of a first station (first station transmission opportunity) to one or more selected stations (e.g., a second station which is prioritized (by the AP) to be allowed to use guest station shared resource units of a TB frame corresponding to a shared transmission trigger frame transmitted by the first station during its first station transmission opportunity). Component 3508 further includes a component 3512 configured to include a mapping of a second station (second station transmission opportunity) to one or more selected stations (e.g., a first station which is prioritized (by the AP) to be allowed to use guest station shared resource units of a TB frame corresponding to a shared transmission trigger frame transmitted by the second station during its second station transmission opportunity). Component 3508 further includes a component configured to include some PHY (physical) attributes for each shared occasion, e.g., modulation and coding scheme (MCS), transmission power level control information, etc. For example, in one embodiment, component 3508 includes information indicating that a guest station for a shared occasion should use the same MCS as being used by the host STA. In another embodiment, component 3508 includes information indicating the guest STA is to use MCS within a specified range of levels including the level being used by the host STA, e.g., +/−2 levels with respect to the host STA.

Assembly of components 3500 further includes a component 3604 configured to select stations to be granted use of transmission opportunities. Component 3604 includes a component 3606 configured to select a station to be granted use of a first transmission opportunity, said selecting including selecting a first station from a plurality of stations and a component 3608 configured to select a station to be granted use of a second transmission opportunity, said selecting including selecting a second station from a plurality of stations. Assembly of components 3500 further includes a component 3610 configured to operate the access point to transmit information indicating the selected stations and corresponding granted transmission opportunities, e.g. information indicating sets of granted frequency/time resources.

Assembly of components 3500 further includes a component 3612 configured to prioritize stations with regard to use of guest station transmission opportunities that become available in the transmission opportunities. Component 3612 includes a component 3614 configured to prioritize one or more additional stations with regard to use of guest station transmission opportunities that become available in the first transmission opportunity, and a component 3616 configured to prioritize stations with regard to use of guest station transmission opportunities that become available in the second transmission opportunity.

Assembly of components 3500 further includes a component 3618 configured to generate a first beacon frame including shared transmission opportunity prioritization information indicating that a station, e.g., a second station is authorized for guest station transmission opportunities that become available during the first transmission opportunity. Component 3618 includes a component 3620 configured to include in said first beacon frame shared transmission prioritization information indicating that a station, e.g., a third station or the first station, is authorized for guest station transmission opportunities that become available during the second transmission opportunity.

Assembly of components 3500 further includes a component 3622 configured to operate the access point to transmit the first beacon frame include shared transmission opportunity prioritization information providing information prioritizing stations with respect to one or more shared station transmission opportunities which occur following transmission of the beacon frame. Component 3622 includes a component 3624 configured to operate the access point to transmit, as part of said first beacon frame, prioritization information for the first transmission opportunity, a component 3626 configured to operate the access point to transmit, as part of said first beacon frame, prioritization information for the second transmission opportunity, a component 3628 configured to operate the access point to transmit, as part of said first beacon frame, rule information indicating a rule to be complied with when using guest transmission opportunities that become available during the first transmission opportunities, e.g. a rule regarding PHY attributes such as modulation and coding scheme to be used, a rule regarding transmission power level to be used, etc., and a component 3630 configured to operate the access point to transmit, as part of said first beacon frame, rule information indicating a rule to be complied with when using guest transmission opportunities that become available during the second transmission opportunities.

Assembly of components 3500 further includes a component 3634 configured to operate the access point to receive from the first station, acting as a host station, a first trigger frame, a component 3636 configured to determine from first guest transmission opportunity information included in the first trigger frame at least one guest transmission opportunity that is authorized by the first hose station, that is available as a shared resource which can be used by a guest station, e.g., an authorized guest station in accordance with the prioritization information of the previously transmitted beacon frame, a component 3638 configured to operate the access point to receive on unshared transmission resources of a first station transmission opportunity a first trigger based frame transmitted by the first station, which is a host station with regard to the first station transmission opportunity, and a component 3640 configured to operate the access point to receive on shared transmission resource units of the first station transmission opportunity signals from one or more authorized stations. Component 3640 includes a component 3642 configured to operate the access point to receive on one or more shared transmission resource units for the first station transmission opportunity a signal from a first guest station. Assembly of components 3500 further includes a component 3644 configured to operate the access point to transmit acknowledgements to the first host station and to one or more guest stations.

Assembly of components 3500 further includes a component 3646 configured to operate the access point to receive from a station, e.g., a second station, acting as a second host station, a second trigger frame, a component 3648 configured to determine from guest transmission opportunity information included in the second trigger frame at least one guest transmission opportunity that is authorized by the second host station, that is available as a shared resource which can be used by a guest station, e.g., an authorized guest station in accordance with the prioritization information of the previously transmitted beacon frame, a component 3650 configured to operate the access point to receive on unshared transmission resources of a second station transmission opportunity a second trigger based frame transmitted by the second station, which is a host station with regard to the second station transmission opportunity, and a component 3652 configured to operate the access point to receive on shared transmission resource units of the second station transmission opportunity signals from one or more authorized stations. Component 3652 includes a component 3654 configured to operate the access point to receive on one or more shared transmission resource units for the second station transmission opportunity a signal from a guest station, e.g., the first station or the third station. Assembly of components 3500 further includes a component 3656 configured to operate the access point to transmit acknowledgements to the second host station and to one or more guest stations. Assembly of components 3500 further includes a component 3658 configured to determine if the access point should change assignments of transmission opportunities, e.g., re-assign pre-defined transmission opportunities in a timing and frequency structure to a different set of stations, and to control operation as a function of the determination. Component 3500 further includes a component 3659 configured to determine, e.g. in accordance with a beacon frame transmission schedule, if the access point is to re-evaluate prioritization for stations with regard to the used of guest station transmission opportunities that may become available, generate and transmit a new beacon frame included updated priority information, and to control operation as a function of the determination.

Assembly of components 3500 further includes a component 3704 configured to operate the access point to monitor to detected a trigger frame. Component 3704 includes a component 3706 configured to operate the access point to receive a trigger frame. Component 3500 further includes a component 3707 configured to operate the access point to determine the type of the detected trigger frame, e.g., based on a frame type indicator in the received trigger frame. Component 3707 includes a component 3708 configured to determine if the detected trigger frame type="shared transmission" and to control operation as a function of the determination, a component 3709 configured to determine that the trigger frame is a shared transmission type of trigger frame, and a component 3711 configured to determine that the trigger frame is a non-shared transmission type of trigger frame.

Assembly of components 3500 further includes a component 3714 configured to operate the AP to follow exiting procedure, e.g., different existing procedures corresponding to different types of trigger frames, e.g., in response to a determination that the detected trigger frame is a non-shared transmission type of trigger frame.

Assembly of components 3500 further includes a component 3712 configured to determine is the carried BSS color (included in the received trigger frame) is the same as the access point's own color and to control operation as a function of the determination, e.g., in response to a determination that the detected trigger frame is a shared transmission type of trigger frame, a component 3716 configured to operate the AP to identify the attributes of the upcoming trigger based (TB) frame, from trigger frame fields, e.g., the TB frame duration, the number of (no-legacy) STF/LTF of the TB frame, identify of resource units (RUs) of host STA, and identify of RUs of all shared occasion, e.g., in response to a determination that the carried BSS color (included in the received trigger frame) is the same as the access point own color, and a component 3718 configured to determined if the carried flag (flag in the received trigger frame) allows guest stations of other BSSs, e.g., in response to a determination that the carried BSS color (included in the received trigger frame) is not the same as the access point's own color.

Assembly of components 3500 further includes a component 3719 configured to operate the AP to discard the trigger frame, e.g., in response to a determination the carried flag indicates that guest STAs of other BSSs are not allowed, and a component 3728 configured to operate the AP to identify the attributes of the upcoming trigger based (TB) frame, from trigger frame fields, e.g., the TB frame duration, the number of (no-legacy) STF/LTF of the TB frame, and identify of RUs of all shared occasion, e.g., in response to a determination the carried flag indicates the guest stations of other BSSs are allowed. Assembly of components 3500 further includes a component 3720 configured to operate the access point to receive signals on the identified resource units, e.g., identified by component 3716, e.g., the identified RUs including host STA RUs and guest STA(s) RUs, a component 3730 configured to operate the access point to receive signals on the identified resource units, e.g., identified by component 3728, e.g., the identified RUs including guest STA(s) RUs.

Assembly of components 3500 further includes a components 3721 configured to operate the access point to process signals received on resource units of a transmission opportunity, e.g., a first transmission opportunity. Component 3721 includes a component 3722 configured to operate the AP to process the signals received on the RUs of the host STA, a component 3724 configured to operate the AP to process the signal received on the RUs of each shared occasion (e.g., each shared occasion associated with one guest station), and a component 3726 configured to operate the AP to transmit and ACK frame(s) for the host STA and/or for guest STAs, e.g. in response to processing of components 3722 and/or 3724.

Component 3721 further includes a component 3732 configured to operate the AP to process signal received on the RUs of each started occasion (e.g., each shared occasion associated with one guest STA). Component 3732 includes a component configured to, for RUs of a shared occasion, determine if the destination MAC address is the same as the AP's MAC address and to control operation as a function of the determination, a component 3736 configured to operate the AP to discard the MAC PDU or forward the MAC PDU to another AP based on the MAC address, in response to a determination that the destination MAC address is different than the AP's MAC address, and a component 3738 configured to operate the AP to process the MAC PDU in response to a determination that the destination MAC address is the same as the APs MAC address. Component 3721 further includes a component 3740 configured to operate the AP to wait, and a component 3742 configured to operate the AP to transmit ACK frame(s) for the guest STA(s), e.g., following the wait time, e.g., there is a predetermined timing relationship between the TB frame and the corresponding ACK frame.

Some methods and apparatus are for supporting prioritized transmission opportunity (TXOP) sharing in wireless communications systems, e.g., various 802.11 wireless communications systems and/or other wireless systems. In some but not necessarily all embodiments an access point transmits priority information, e.g., in management frames, to control the sharing of shared resources in trigger based (TB) frames corresponding to shared transmission type trigger frames which may occur in a transmission opportunity allocated to or acquired by a wireless station. The management frames in some embodiments are beacon frames. For purposes of explaining the invention, the invention will be explained in the exemplary context were management frames are beacon frames. Thus the access point, via communicating priority information in management, e.g., beacon, frames, controls access to which station(s) are allowed to be a guest station and use shared resource units made available by a host station corresponding to one more particular upcoming transmission opportunities following the transmitted beacon frame. The access point may, and sometimes does change, e.g., update, priority information, on a beacon time interval basis, in response to changing needs and/or conditions in the system, e.g., latency requirements, data requirements, etc. of the various stations being prioritized. By prioritizing particular stations and de-prioritizing others corresponding to particular transmissions opportunities where the prioritization may and sometimes does depend on which station acts as a host station during a particular transmission opportunity, or a particular beacon time interval, the likelihood that a wireless station in need of guest resource units will be able to successfully use guest resource units is increased, the likelihood of collision by multiple stations concurrently attempting to use a set of guest resource units is decreased or eliminated. In addition, a wireless station need not search all trigger based shared transmission frames, but can go to sleep and conserve power during time intervals when it has been de-prioritized by the access point.

In some embodiments the prioritization information transmitted by an AP includes mapping of a second station to a first sharing opportunity. The first sharing opportunity may be and sometimes is an opportunity where a first station, different from the first station, acts as a host station. The AP can and sometimes does indicate different priorities with regard to different transmission opportunities, e.g., with some stations being indicated as having guest station transmission opportunity priority after a number of guest station transmission opportunities have passed.

In various embodiments stations use a listen before talk (LBT) operation to determine if the station performing the LBT operation is authorized to use a transmission opportunity and thus obtain the right to act as a host station with regard to an individual transmission opportunity. In such cases, guest station priority for a given transmission opportunity may and sometimes does depend on which station acts as a host station. For this reason, in some embodiments, an AP in communicating priority information for guest stations provides priority information which depends on which station is acting as a host with regard to a given transmission opportunity. Different stations prioritized for acting as guest stations may be and sometimes are indicated for different host stations. Thus in such cases which station is authorized to act as a guest station can be determined based on which station is acting as the host station for a given transmission opportunity which will be known based on which station transmits a trigger based frame for a given transmission opportunity and the guest station priority information associated with the host station in the AP transmitted priority information.

In other embodiments an AP allocates transmission opportunities to stations, in such cases the guest station priority may be determined based on the host station associated with a transmission opportunity and guest station priority information associated with the host that was transmitted by the AP. However, in such embodiments where the AP allocates transmission opportunities to stations it may also specify guest station priorities with regard to specific transmission opportunities.

From the above it should be appreciated that guest station prioritization need not depend on the AP allocating transmission opportunities and that the AP prioritization information can be provided in a way, e.g., based on which station acts as a host, that stations can determine whether or not they are allowed to use a transmission opportunity based on a LBT operation and also which guest stations have priority once the host for a given transaction is known based on a LBT result and/or which device transmits a trigger frame indicating that guest station use of one or more transmission resources in a transmission opportunity is permitted.

In the following numbered lists of embodiments, the number when a reference is made to a preceding embodiment refers to a preceding embodiment in the same list as the embodiment which refers to the preceding numbered embodiment. In the numbered embodiments beacon frames will be used to described the exemplary embodiment but it is to be understood that the invention relates more generally to management frames and thus the reference to a beacon frame in the exemplary numbered embodiments is also intended to support embodiments where management frames that transmit control information are used rather than the specific exemplary beacon frame.

First Numbered List of Exemplary Method Embodiments:

Method Embodiment 1 A method of operating an access point (e.g., first access point), the method comprising: transmitting (3322 or 3402), from the access point, a first management, e.g., beacon, frame including shared transmission opportunity prioritization information providing information prioritizing stations with respect to one or more shared station transmission opportunities which occur following transmission of said first beacon frame; and receiving (3342 or 3420 or 3430) on one or more shared transmission resource units of a first station transmission opportunity a signal from a first guest station (e.g., STA2).

Method Embodiment 2 The method of Method Embodiment 1, further comprising: receiving (3338) on unshared transmission resources of the first station transmission opportunity a first trigger based frame transmitted by a first station (e.g., STA1) which is a host station with respect to the first station transmission opportunity.

Method Embodiment 3 The method of Method Embodiment 2, wherein said first station transmission opportunity is owned by said first station, said first station having a right to use the transmission resources of the first station transmission opportunity to the exclusion of other stations.

Method Embodiment 4 The method of Method Embodiment 3, wherein the first station also has the right to invite one or more other stations to share transmission resources included in the first station transmission opportunity and wherein the first station indicates transmission resources in the first station transmission opportunity which are made available for sharing.

Method Embodiment 5 The method of Method Embodiment 2, wherein the shared transmission opportunity prioritization information indicates guest station priorities which depend on which of a plurality of stations operates as a host station during a transmission opportunity.

Method Embodiment 6 The method of Method Embodiment 5, wherein the shared transmission opportunity prioritization information identifies a second station which has transmission priority with regard to shared transmission opportunities when said first station operates as a host station.

Method Embodiment 7 The method of Method Embodiment 6, wherein the shared transmission opportunity prioritization information identifies a third station which is authorized to use guest transmission opportunities when the second station acts as a host station, said first, second and third stations being different stations.

Method Embodiment 8 The method of Method Embodiment 7, wherein said first station acts as a first host station during said first transmission opportunity and wherein said second station acts as a host station in a subsequent transmission opportunity, said second station having transmission priority with regard to shared resources during said first transmission opportunity, said third station having transmission priority with regard to shared resources during said second transmission opportunity.

Method Embodiment 9 The method of Method Embodiment 2, further comprising, prior to transmitting (3322) the first beacon frame performing the steps of: prioritizing (3314) one or more additional stations with regard use of guest station transmission opportunities that become available in the first transmission opportunity; and generating (3318) said first beacon frame including the shared transmission opportunity prioritization information indicating that said second station is authorized for guest station transmission opportunities that become available during the first transmission opportunity.

Method Embodiment 9A The method of Method Embodiment 9, further comprising: selecting (3306) a station to be granted use of the first transmission opportunity, said selecting including selecting the first station from a plurality of stations Method Embodiment 10 The method of Method Embodiment 9, wherein said one or more additional stations are prioritized based on latency requirements of data to be transmitted by stations being prioritized, the priority of data to be transmitted and/or the amount of data stations transmitted in one or more preceding transmission opportunities.

Method Embodiment 11 The method of Method Embodiment 2, wherein transmitting (3322) the first beacon frame includes transmitting, as part of said first beacon frame, rule information (3328) indicating a rule to be complied with when using guest transmission opportunities that become available during the first transmission opportunity.

Method Embodiment 12 The method of Method Embodiment 11, wherein said rule information indicates coding schemes and/or modulation rates that can be used by the guest stations during the guest transmission opportunities.

Method Embodiment 13 The method of Method Embodiment 12 wherein said rule information indicates that guest stations are to use modulation rates within an indicated range of modulation rates corresponding to the modulation rate used by the host station during the first transmission opportunity (e.g., guest station can use the same modulation rate as the host station, a modulation rate one level above the modulation rate used by the host station or a modulation rate one level below the modulation rate used by the host station.)

Method Embodiment 14 The method of Method Embodiment 2, wherein transmitting (3322) the first beacon frame includes transmitting (3326), as part of said first beacon frame, prioritization information for a second transmission opportunity, (a second station is authorized to use the second transmission opportunity, said second station being a second host station which is a host with regard to the second transmission opportunity), the second transmission opportunity prioritization information further including second guest station prioritization information, the second guest station prioritization information setting priorities with regard to one or more stations with regard to guest transmission opportunities that become available in the second transmission opportunity.

Method Embodiment 15 The method of Method Embodiment 2, further comprising: receiving (3334) from said first station, acting as a first host station, a first trigger frame; and determining (3336) from first guest transmission opportunity information included in the first trigger frame at least one guest transmission opportunity in the first transmission opportunity that is authorized by the first host station that is available as a shared transmission opportunity and which can be used by a guest station.

Method Embodiment 16 The method of Method Embodiment 1, further comprising: receiving a trigger frame (3406) (e.g., a first trigger frame from a first station operating as the host station with respect to the first transmission opportunity, said trigger frame being received prior to receipt of the first trigger based frame); determining (3407) the type of trigger frame that was received from frame type information included in the trigger frame (e.g., check if a frame type indicator in the received trigger frame indicates that the first trigger frame is a shared trigger frame), said step of determining (3407) the type of trigger frame including determining (3309) that the trigger frame is a shared transmission type trigger frame; determining (3412) if a BSS color indicated in the received trigger frame matches a BSS color of the first access point; and processing (3421) signals received on resource units of the first station transmission opportunity based on the BSS color indicated in the received trigger frame.

Method Embodiment 17 The method of Method Embodiment 16, wherein the BSS color indicated in the received trigger frame matches a BSS color of the first access point, the method further comprising: processing (3422) signals received on resource units of the first transmission opportunity used by the host station; processing (3424) signals received on resource units of the first transmission opportunity used by a guest station; and transmitting (3426) one or more acknowledgments acknowledging receipt of the signals received from the host station and signals received from the guest station.

Method Embodiment 18 The method of Method Embodiment 16, wherein the BSS color in the received trigger frame is does not match the BSS color of the access point (e.g., first access point), the method further comprising: checking (3418) to determine if a flag in the trigger frame indicates that a guest station using a trigger based frame corresponding to the trigger frame is permitted to have a different BSS color (e.g., correspond to a different service set) than the host station which transmitted the received trigger frame; discarding (3430) said received trigger frame when the flag in the trigger frame indicates that a guest station using the trigger based frame corresponding to the trigger frame is not permitted to have a different BSS color than the host station which transmitted the received trigger frame; and processing (3432) signals received on shared resource units of the transmission opportunity corresponding to the received trigger frame when the flag in the trigger frame indicates that a guest station using the trigger based frame corresponding to the trigger frame is permitted to have a different BSS color than the host station which transmitted the received trigger frame.

Method Embodiment 19 The method of Method Embodiment 18, wherein processing (3432) signals received on shared resource units of the transmission opportunity corresponding to the received trigger frame includes: checking (3434) to determine if the signals on the shared resource units of the transmission opportunity communicate a destination MAC (media access control) address matching a MAC address of the access point (e.g., first access point).

Method Embodiment 20 The method of Method Embodiment 19, further comprising: processing (3438) MAC physical data units (PDUs) communicated by the signals transmitted using the shared resource units of the transmission opportunity when it is determined that the shared resource units communicate a destination MAC (media access control) address matching a MAC address of the access point (e.g., first access point) (thereby indicating that the data transmitted by the guest station is intended for the first access point even though the BSS color of the host station which also uses the transmission opportunity does not match the BSS color of the first access point).

Method Embodiment 21 The method of Method Embodiment 20, further comprising: transmitting (3442) one or more signal acknowledgments in response to signals received on the shared resource units of the transmission opportunity following determining that the shared resource units communicate a destination MAC (media access control) address matching a MAC address of the access point (e.g., first access point).

Method Embodiment 22 The method of Method Embodiment 19, further comprising: discarding (3436), without processing, MAC physical data units (PDUs) communicated by the signals transmitted using the shared resource units of the transmission opportunity when it is determined that the shared resource units do not communicate a destination MAC (media access control) address matching a MAC address of the access point (e.g., first access point) (thereby indicating that the data transmitted by the guest station is intended for an access point other than the first access point).

Method Embodiment 23 The method of Method Embodiment 19, further comprising: forwarding MAC physical data units (PDUs) communicated by the signals transmitted using the shared resource units of the transmission opportunity to an access point (e.g., a second access point) corresponding to the destination MAC address included in the shared resource units, when it is determined that the shared resource units do not communicate a destination MAC (media access control) address matching a MAC address of the access point (thereby indicating that the data transmitted by the guest station is intended for an access point other than the first access point).

First Numbered List of Exemplary Apparatus Embodiments:

Apparatus Embodiment 1 An access point (2700) (e.g., first access point), comprising: a wireless receiver (2726); a wireless transmitter (2728); and a processor (2702) configured to operate the access point (2700) to: transmit (3322 or 3402), from the access point (2700), (via the wireless transmitter (2728)) a first beacon frame including shared transmission opportunity prioritization information providing information prioritizing stations with respect to one or more shared station transmission opportunities which occur following transmission of said first beacon frame; and receive (3342 or 3420 or 3430) (via the wireless receiver (2726)) on one or more shared transmission resource units of a first station transmission opportunity a signal from a first guest station (e.g., STA2).

Apparatus Embodiment 2 The access point (2700) of Apparatus Embodiment 1, wherein said processor (2702) is further configured to operate the access point (2700) to: receive (3338) (via the wireless receiver (2726)) on unshared transmission resources of the first station transmission opportunity a first trigger based frame transmitted by a first station (e.g., STA1) which is a host station with respect to the first station transmission opportunity.

Apparatus Embodiment 3 The access point (2700) of Apparatus Embodiment 2, wherein said first station transmission opportunity is owned by said first station, said first station having a right to use the transmission resources of the first station transmission opportunity to the exclusion of other stations.

Apparatus Embodiment 4 The access point (2700) of Apparatus Embodiment 3, wherein the first station also has the right to invite one or more other stations to share transmission resources included in the first station transmission opportunity and wherein the first station indicates transmission resources in the first station transmission opportunity which are made available for sharing.

Apparatus Embodiment 5 The access point (2700) of Apparatus Embodiment 2, wherein the shared transmission opportunity prioritization information indicates guest station priorities which depend on which of a plurality of stations operates as a host station during a transmission opportunity.

Apparatus Embodiment 6 The access point (2700) of Apparatus Embodiment 5, wherein the shared transmission opportunity prioritization information identifies a second station which has transmission priority with regard to shared transmission opportunities when said first station operates as a host station.

Apparatus Embodiment 7 The access point (2700) of Apparatus Embodiment 6, wherein the shared transmission opportunity prioritization information identifies a third station which is authorized to use guest transmission opportunities when the second station acts as a host station, said first, second and third stations being different stations.

Apparatus Embodiment 8 The access point (2700) of Apparatus Embodiment 7, wherein said first station acts as a first host station during said first transmission opportunity and wherein said second station acts as a host station in a subsequent transmission opportunity, said second station having transmission priority with regard to shared resources during said first transmission opportunity, said third station having transmission priority with regard to shared resources during said second transmission opportunity.

Apparatus Embodiment 9 The access point (2700) of Apparatus Embodiment 2, wherein said processor (2702) is further configured to operate, prior to transmitting (3322) the first beacon frame, the access point (2700) to perform the step of: generating (3318) said first beacon frame including the shared transmission opportunity prioritization information indicating that said second station is authorized for guest station transmission opportunities that become available during the first transmission opportunity (e.g., in which case stations which are not indicated to be authorized are not authorized as guest stations during the transmission opportunity).

Apparatus Embodiment 9A The access point (2700) of Apparatus Embodiment 9, wherein said processor (2702) is further configured to operate, prior to transmitting (3322) the first beacon frame, the access point (2700) to perform the step of: selecting (3306) a station to be granted use of the first transmission opportunity, said selecting including selecting the first station from a plurality of stations.

Apparatus Embodiment 10 The access point (2700) of Apparatus Embodiment 9, wherein said one or more additional stations are prioritized based on latency requirements of data to be transmitted by stations being prioritized, the priority of data to be transmitted and/or the amount of data stations transmitted in one or more preceding transmission opportunities.

Apparatus Embodiment 11 The access point (2700) of Apparatus Embodiment 2, wherein said processor (2702) is configured to operate the access point (2700) to transmit (3328) (via the wireless transmitter 2728) rule information indicating a rule to be complied with when using guest transmission opportunities that become available during the first transmission opportunity, as part of operating the access point to transmit (3322) (via the wireless transmitter) the first beacon frame.

Apparatus Embodiment 12 The access point (2700) of Apparatus Embodiment 11, wherein said rule information indicates coding schemes and/or modulation rates that can be used by the guest stations during the guest transmission opportunities.

Apparatus Embodiment 13 The access point (2700) of Apparatus Embodiment 12 wherein said rule information indicates that guest stations are to use modulation rates within an indicated range of modulation rates corresponding to the modulation rate used by the host station during the first transmission opportunity (e.g., guest station can use the same modulation rate as the host station, a modulation rate one level above the modulation rate used by the host station or a modulation rate one level below the modulation rate used by the host station.)

Apparatus Embodiment 14 The access point (2700) of Apparatus Embodiment 2, wherein said processor (2702) is configured to operate the access point (2700) to transmit (3326) prioritization information for a second transmission opportunity, as part of operating the access point (2700) to transmit (3322) (via the wireless transmitter (2728)) the first beacon frame, (a second station is authorized to use the second transmission opportunity, said second station being a second host station which is a host with regard to the second transmission opportunity), the second transmission opportunity prioritization information further including second guest station prioritization information, the second guest station prioritization information setting priorities with regard to one or more stations with regard to guest transmission opportunities that become available in the second transmission opportunity.

Apparatus Embodiment 15 The access point (2700) of Apparatus Embodiment 2, wherein said processor (2702) is further configured to operate the access point (2700) to: receive (3334) (via the wireless receiver (2726) from said first station, acting as a first host station, a first trigger frame; and determine (3336) from first guest transmission opportunity information included in the first trigger frame at least one guest transmission opportunity in the first transmission opportunity that is authorized by the first host station that is available as a shared transmission opportunity and which can be used by a guest station.

Apparatus Embodiment 16 The access point (2700) of Apparatus Embodiment 1, wherein said processor (2702) is further configured to operate the access point (2700) to: receive (via the wireless receiver (2726)) a trigger frame (3406) (e.g., a first trigger frame from a first station operating as the host station with respect to the first transmission opportunity, said trigger frame being received prior to receipt of the first trigger based frame); determine (3407) the type of trigger frame that was received from frame type information included in the trigger frame (e.g., check if a frame type indicator in the received trigger frame indicates that the first trigger frame is a shared trigger frame), said step of determining (3407) the type of trigger frame including determining (3309) that the trigger frame is a shared transmission type trigger frame; determine (3412) if a BSS color indicated in the received trigger frame matches a BSS color of the first access point; and process (3421) signals received on resource units of the first station transmission opportunity based on the BSS color indicated in the received trigger frame.

Apparatus Embodiment 17 The access point (2700) of Apparatus Embodiment 16, wherein the BSS color indicated in the received trigger frame matches a BSS color of the first access point (2700), and wherein said processor (2702) is further configured to operate the access point (2700) to: process (3422) signals received on resource units of the first transmission opportunity used by the host station; process (3424) signals received on resource units of the first transmission opportunity used by a guest station; and transmit (3426) (via the wireless transmitter (2728)) one or more acknowledgments acknowledging receipt of the signals received from the host station and signals received from the guest station.

Apparatus Embodiment 18 The access point (2700) of Apparatus Embodiment 16, wherein the BSS color in the received trigger frame is does not match the BSS color of the access point (e.g., first access point), and wherein said processor (2702) is further configured to operate the access point (2700) to: check (3418) to determine if a flag in the trigger frame indicates that a guest station using a trigger based frame corresponding to the trigger frame is permitted to have a different BSS color (e.g., correspond to a different service set) than the host station which transmitted the received trigger frame; discard (3430) said received trigger frame when the flag in the trigger frame indicates that a guest station using the trigger based frame corresponding to the trigger frame is not permitted to have a different BSS color than the host station which transmitted the received trigger frame; and process (3432) signals received on shared resource units of the transmission opportunity corresponding to the received trigger frame when the flag in the trigger frame indicates that a guest station using the trigger based frame corresponding to the trigger frame is permitted to have a different BSS color than the host station which transmitted the received trigger frame.

Apparatus Embodiment 19 The access point (2700) of Apparatus Embodiment 18, wherein said processor (2702) is configured to operate the access point (2700) to: check (3434) to determine if the signals on the shared resource units of the transmission opportunity communicate a destination MAC (media access control) address matching a MAC address of the access point (e.g., first access point), as part of being configured to operate the access point to process (3432) signals received on shared resource units of the transmission opportunity corresponding to the received trigger frame.

Apparatus Embodiment 20 The access point (2700) of Apparatus Embodiment 19, wherein said processor (2702) is further configured to operate the access point (2700) to: process (3438) MAC physical data units (PDUs) communicated by the signals transmitted using the shared resource units of the transmission opportunity when it is determined that the shared resource units communicate a destination MAC (media access control) address matching a MAC address of the access point (e.g., first access point) (thereby indicating that the data transmitted by the guest station is intended for the first access point even though the BSS color of the host station which also uses the transmission opportunity does not match the BSS color of the first access point).

Apparatus Embodiment 21 The access point (2700) of Apparatus Embodiment 20, wherein said processor (2702) is further configured to operate the access point (2700) to: transmit (3442) (via the wireless transmitter (2728)) one or more signal acknowledgments in response to signals received on the shared resource units of the transmission opportunity following determining that the shared resource units communicate a destination MAC (media access control) address matching a MAC address of the access point (e.g., first access point).

Apparatus Embodiment 22 The access point (2700) of Apparatus Embodiment 19, wherein said processor (2702) is further configured to operate the access point to: discard (3436), without processing, MAC physical data units (PDUs) communicated by the signals transmitted using the shared resource units of the transmission opportunity when it is determined that the shared resource units do not communicate a destination MAC (media access control) address matching a MAC address of the access point (e.g., first access point) (thereby indicating that the data transmitted by the guest station is intended for an access point other than the first access point).

Apparatus Embodiment 23 The access point (2700) of Apparatus Embodiment 19, wherein said processor (2702) is further configured to operate the access point (2700) to: forward (via the transmitter (2724) of the network interface (2706)) MAC physical data units (PDUs) communicated by the signals transmitted using the shared resource units of the transmission opportunity to an access point (e.g., a second access point) corresponding to the destination MAC address included in the shared resource units, when it is determined that the shared resource units do not communicate a destination MAC (media access control) address matching a MAC address of the access point (thereby indicating that the data transmitted by the guest station is intended for an access point other than the first access point).

First Numbered List of Exemplary Computer Readable Medium Embodiments:

Non-Transitory Computer Readable Medium Embodiment 1 A non-transitory computer readable medium (2712) including computer executable instructions which when executed by a processor (2702) of an access point (2700), e.g., a first access point, control the access point (2700) to perform the steps of: transmitting (3322 or 3402), from the access point, a first beacon frame including shared transmission opportunity prioritization information providing information prioritizing stations with respect to one or more shared station transmission opportunities which occur following transmission of said first beacon frame; and receiving (3342 or 3420 or 3430) on one or more shared transmission resource units of a first station transmission opportunity a signal from a first guest station (e.g., STA2).

Second Numbered List of Exemplary Method Embodiments:

Method Embodiment 1 A method of operating a first wireless station, the method comprising: during a first time period, operating (2404) the first wireless station to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting a first trigger frame (2412) including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) a first trigger based (TB) frame corresponding to the first trigger frame, said first trigger based frame including a plurality of resource units, transmitting the first trigger based frame including transmitting energy on some but not all of the resource units in said first trigger based frame.

Method Embodiment 2 The method of Method Embodiment 1, wherein said information identifying one or more sets of shared resource units explicitly identifies resource units (e.g., by including one or more resource unit identifiers) of a first trigger based frame, corresponding to the first trigger frame, which are to be used as shared resource units.

Method Embodiment 3 The method of Method Embodiment 1, wherein said information identifying one or more sets of shared resource units identifies non-shared resource units of a first trigger based frame, corresponding to the first trigger frame, remaining units in the first trigger based frame beyond the non-shared resource units being shared resource units (thus in this case the information implicitly identifies the shared resource units by explicitly identify the non-shared resource units with the understanding that the omitted resource units are to be shared).

Method Embodiment 4 The method of Method Embodiment 1, wherein said first frame time period is the time period of the first trigger based frame.

Method Embodiment 5 The method of Method Embodiment 1, wherein said information identifying one or more sets of shared resources units includes information which explicitly identifies one or more sets of shared resource units which may be used by guest wireless stations.

Method Embodiment 6 The method of Method Embodiment 5, wherein said information explicitly identifying one or more sets of shared resource units which may be used by guest wireless stations includes one of more sets of guest information, each set of guest information including a RU allocation field indicating a set of shared resource units, each set of guest information being communicated in a Guest User Info field of a User Info List field of the first trigger frame.

Method Embodiment 7 The method of Method Embodiment 6, wherein said User Info List field of the first trigger frame includes a Host User Info field and one or more Guest User Info fields.

Method Embodiment 8 The method of Method Embodiment 7, wherein each of one or more guest information fields in the first trigger frame includes an AID12 field with its AID12 field value being a predetermined value.

Method Embodiment 9 The method of Method Embodiment 6, wherein said AID12 field value, which is used in each guest information field of the first trigger frame, equals 000000000000.

Method Embodiment 10 The method of Method Embodiment 1, wherein said information which can be used to identify one or more sets of shared resources units includes information identifying the total resources of the trigger based frame and information identifying the resource units of the trigger based frame which the first wireless station has reserved for its own use. (There is a single set of shared resource units in the first TB frame which may be used by a guest STA, where the single set of shared resource units is implicitly communicated by the host STA, which sends information in the first trigger frame identifying the total resource units of the first TB frame and resource units of the first TB frame allocated by the host STA to the host STA, with guest STAs and AP determining the single set of available guest STA resource units, e.g., by calculating: single set of guest STA resource units=total resource units for TB frame−resource units allocated by the host STA to the host STA.)

Method Embodiment 11 The method of Method Embodiment 10, wherein the information identifying the resource units of the trigger based frame which the first wireless station has reserved for its own use is communicated in a RU allocation field of a Host User Info field of a User Info List field of the first trigger frame.

Method Embodiment 12 The method of Method Embodiment 11, wherein the User Info List field of the first trigger frame includes a Host User Info field but does not include any guest User Info fields.

Method Embodiment 13 The method of Method Embodiment 12 wherein resource units of the trigger based frame corresponding to the first trigger frame which are not identified in the User Info List field of the first trigger frame are available for use as shared resource units.

Method Embodiment 14 The method of Method Embodiment 1, wherein operating as a host station further includes: selecting, (2408) based on the amount of data to be transmitted by the first wireless station during the first trigger based frame, a subset of resource units in said first trigger based frame to be used exclusively by the first wireless station; and designating (2410) one or more subsets of resource units in said first trigger based frame to be shared, each of said designated subsets of resource units being a set of shared resource units.

Method Embodiment 15 The method of Method Embodiment 1, wherein said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point.

Method Embodiment 16 The method of Method Embodiment 1, wherein transmitting (2414) a first trigger based frame corresponding to the first trigger frame includes transmitting (2416) energy on at least one resource unit in said first trigger based frame while not transmitting any energy on the shared resource units identified by the information in said first trigger frame.

Method Embodiment 17 The method of Method Embodiment 16, wherein operating (2404) the wireless station to act as a host station further includes: monitoring (2418) for an acknowledgement from a first access point to which said first trigger based frame is transmitted; and receiving (2420) a first acknowledgement from the first access point corresponding to the first trigger based frame.

Method Embodiment 18 The method of Method Embodiment 17, wherein said first acknowledgment includes an indication whether data was successfully received from the host station on one or more resource units on which the host station transmitted energy, wherein operating (2404) the wireless station to act as a host station further includes: processing (2422) the first acknowledgement to determine if data transmitted in the resource units in said first trigger based frame on which the first wireless station transmitted energy was successfully received without checking to determine if the first access point successfully received data in the shared resource units of the first trigger based frame.

Method Embodiment 19 The method of Method Embodiment 1, further comprising: during a second time period, operating (2426) the first wireless station to act as a guest station, operating the first wireless station as the guest station including: receiving (2428) a second trigger frame from another wireless station; determining (2430) that a second trigger based frame corresponding to the second trigger frame includes one or more sets of shared resource units that are available for use by the first wireless station; transmitting (2458) data to the first access point in at least one of the one or more sets of shared resource units included in the second trigger based frame.

Method Embodiment 20 The method of Method Embodiment 19, wherein determining (2430) that a second trigger based frame corresponding to the second trigger frame includes one or more set of shared resource units that are available for use by the first wireless station includes: determining (2432) that a type indicator in said received second trigger frame indicates that the trigger frame is a shared transmission type of trigger frame.

Method Embodiment 21 The method of Method Embodiment 19, wherein operating (2426) the first wireless station as a guest station further includes: identifying (2434) the shared resource units corresponding to each of one or more set of shared resources units in said second trigger based frame.

Method Embodiment 22 The method of Method Embodiment 21, wherein identifying (2434) the shared resource units corresponding to each of one or more set of shared resources units in said second trigger based frame includes: identifying (2438) a set of shared resource units in said trigger based frame.

Method Embodiment 23 The method of Method Embodiment 22, wherein identifying (2438) set of shared resource units in said trigger based frame includes: recovering (2440)

information identifying a set of shared resource units from a RU allocation field of a Guest User information field of a User Info List Field of the second trigger frame.

Method Embodiment 24 The method of Method Embodiment 21, wherein said second trigger frame includes a User Info List field including a Host User Info field and one or more Guest User Info fields.

Method Embodiment 25 The method of Method Embodiment 21, wherein said second trigger based frame includes two or more sets of shared resource units; and wherein operating (2426) the first wireless station to act as a guest station further includes: selecting (2442) one of said sets of shared resources units to be used by the first wireless station.

Method Embodiment 26 The method of Method Embodiment 20, wherein operating (2426) the first wireless station to act as a guest station further includes: determining (2444 or 2448) that only a single set of shared resources is available to be used by a guest STA in the second trigger based frame.

Method Embodiment 27 The method of Method Embodiment 26, wherein said determining (2444) that only a single set of shared resources is available to be used by a guest STA in the second TB frame includes: determining (2446) that only one set of Guest User Information in a Guest User Info Field of a User Info List Field of said second Trigger Frame was received.

Method Embodiment 28 The method of Method Embodiment 27 further comprising: identifying (2338 and 2440) the single set of shared resource units in said trigger based frame from information included in the RU allocation field of the Guest User Info Field.

Method Embodiment 29 The method of Method Embodiment 26, wherein said determining (2448) that only a single set of shared resources is available to be used by a guest STA in the second TB frame includes: determining (2450) that receiving a set of Host User information in a Host User Info Field of a User Info List field of the second Trigger frame without receiving any Guest User Info fields in the User Info List field of the second Trigger frame.

Method Embodiment 30 The method of Method Embodiment 29, wherein operating (2426) the first wireless stations to act as a guest station further includes: determining (2452) the single set of shared resources that are available to be used by a guest STA in the second trigger based frame from received information identifying the total resources of the second trigger based frame and information identifying the resource units of the second trigger based frame which the another wireless station has reserved for its own use.

Method Embodiment 31 The method of Method Embodiment 30, wherein determining (2452) the single set of available guest STA resource units includes: identifying (2454) the single set of shared resources as the resources left over after removing the identified resource units of the second trigger based frame which the another wireless station has reserved for its own use from the total resource units of the trigger based frame.

Method Embodiment 32 The method of Method Embodiment 19, wherein operating (2426) as the first wireless station as the guest station further includes: receiving (2458) a second acknowledgement from the first access point indicating whether or not the first access point successfully received data transmitted by the first wireless station using one or more shared resource units included in the second trigger based frame.

Method Embodiment 33 The method of Method Embodiment 32, wherein operating (2426) as the first wireless station as the guest station further includes: determining (2462) from the received second acknowledgement if any of the data transmitted using a shared resource unit of the second trigger based frame was not successfully received (note that that the first wireless stations does this without checking or determining if data transmitted in non-shared resource units of the second trigger based frame were successfully received or acknowledged since such non-shared resource units of the second trigger based frame are not used by the first wireless station to communicate data)

Method Embodiment 34 The method of Method Embodiment 32, wherein operating (2426) the first wireless station as the guest station further includes: prior to transmitting (2458) data to the first access point in at least one of the one or more shared resource units included in the second trigger frame, identifying (2436) from information in the second trigger frame one or more sets of shared resource units that are included in the second trigger based frame.

Method Embodiment 35 The method of Method Embodiment 34, wherein operating (2426) the first wireless station as the guest station further includes: identifying (2433) attributes of the second trigger based frame (e.g., the TB frame duration, the number of non-legacy STF/LTF of the TB frame, RUs of all shared occasion) from trigger frame fields included in the second trigger frame.

Method Embodiment 36 The method of method embodiment 35, wherein operating (2426) the first wireless station as the guest station further includes: generating (1515) a trigger based frame in accordance with one or more of the identified attributes of the second trigger based frame, generating the trigger based frame including generating at least one legacy symbol, said at least one legacy symbol being a Legacy STF symbol, LTF symbol or SIG symbol and generating at least one non-legacy symbol, said non-legacy symbol being anon-legacy STF symbol or non-legacy LTF symbol; and transmitting (1516) the generated trigger based frame wherein transmitting the generated trigger based frame includes transmits the generated non-legacy symbol on the shared resources of the non-legacy STF or LTF portion of the generated trigger based frame (e.g. only transmits on the shared resources of the non-legacy STF/LTF).

Second Numbered List of Exemplary Apparatus Embodiments:

Apparatus Embodiment 1 A first wireless station (2600) comprising: a wireless transmitter (2624); a wireless receiver (2622); memory (2612); and a processor (2602) configured to: operate (2404) the first wireless station (2600), during a first time period, to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting (2412) (via wireless transmitter 2624) a first trigger frame including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) (via wireless transmitter 2624) a first trigger based (TB) frame corresponding to the first trigger frame, said first trigger based frame including a plurality of resource units, transmitting the first trigger based frame including transmitting energy on some but not all of the resource units in said first trigger based frame.

Apparatus Embodiment 2 The first wireless station of Apparatus Embodiment 1, wherein said memory includes a trigger type subfield encoding table which maps different trigger frame types to different predetermined values, one of said different trigger frame types being a shared resource trigger frame type. (For example, the table includes: trigger type subfield value=8 which maps to "Shared Transmission".)

Apparatus Embodiment 3 The first wireless station of Apparatus Embodiment 1, wherein said information identifying one or more sets of shared resource units explicitly identifies resource units (e.g., by including one or more resource unit identifiers) of a first trigger based frame, corresponding to the first trigger frame, which are to be used as shared resource units.

Apparatus Embodiment 4 The first wireless station of Apparatus Embodiment 1, wherein said information identifying one or more sets of shared resource units identifies non-shared resource units of a first trigger based frame, corresponding to the first trigger frame, remaining units in the first trigger based frame beyond the non-shared resource units being shared resource units (thus in this case the information implicitly identifies the shared resource units by explicitly identify the non-shared resource units with the understanding that the omitted resource units are to be shared).

Apparatus Embodiment 5 The first wireless station of Apparatus Embodiment 1, wherein said first frame time period is the time period of the first trigger based frame.

Apparatus Embodiment 6 The first wireless station of Apparatus Embodiment 1, wherein said information identifying one or more sets of shared resources units includes information which explicitly identifies one or more sets of shared resource units which may be used by guest wireless stations.

Apparatus Embodiment 7 The first wireless station of Apparatus Embodiment 6, wherein said information explicitly identifying one or more sets of shared resource units which may be used by guest wireless stations includes one of more sets of guest information, each set of guest information including a RU allocation field indicating a set of shared resource units, each set of guest information being communicated in a Guest User Info field of a User Info List field of the first trigger frame.

Apparatus Embodiment 8 The first wireless station of Apparatus Embodiment 7, wherein said User Info List field of the first trigger frame includes a Host User Info field and one or more Guest User Info fields.

Apparatus Embodiment 9 The first wireless station of Apparatus Embodiment 8, wherein each of one or more guest information fields in the first trigger frame includes an AID12 field with its AID12 field value being a predetermined value; and wherein said memory (2612) includes said AID12 field predetermined value to be included in the one or more guest information fields of the first trigger frame.

Apparatus Embodiment 10 The first wireless station of Apparatus Embodiment 7, wherein said AID12 field value, which is used in each guest information field of the first trigger frame, equals 000000000000.

Apparatus Embodiment 11 The first wireless station of Apparatus Embodiment 1, wherein said information which can be used to identify one or more sets of shared resources units includes information identifying the total resources of the trigger based frame and information identifying the resource units of the trigger based frame which the first wireless station has reserved for its own use. (There is a single set of shared resource units in the first TB frame which may be used by a guest STA, where the single set of shared resource units is implicitly communicated by the host STA, which sends information in the first trigger frame identifying the total resource units of the first TB frame and resource units of the first TB frame allocated by the host STA to the host STA, with guest STAs and AP determining the single set of available guest STA resource units, e.g., by calculating: single set of guest STA resource units=total resource units for TB frame−resource units allocated by the host STA to the host STA.)

Apparatus Embodiment 12 The first wireless station of Apparatus Embodiment 11, wherein the information identifying the resource units of the trigger based frame which the first wireless station has reserved for its own use is communicated in a RU allocation field of a Host User Info field of a User Info List field of the first trigger frame.

Apparatus Embodiment 13 The first wireless station of Apparatus Embodiment 12, wherein the User Info List field of the first trigger frame includes a Host User Info field but does not include any guest User Info fields.

Apparatus Embodiment 14 The first wireless station of Apparatus Embodiment 13 wherein resource units of the trigger based frame corresponding to the first trigger frame which are not identified in the User Info List field of the first trigger frame are available for use as shared resource units.

Apparatus Embodiment 15 The first wireless station of Apparatus Embodiment 1, wherein operating as a host station further includes: selecting, (2408) based on the amount of data to be transmitted by the first wireless station during the first trigger based frame, a subset of resource units in said first trigger based frame to be used exclusively by the first wireless station; and designating (2410) one or more subsets of resource units in said first trigger based frame to be shared, each of said designated subsets of resource units being a set of shared resource units.

Apparatus Embodiment 16 The first wireless station of Apparatus Embodiment 1, wherein said decision to make one or more transmission resources acquired by the first wireless station available for use by one or more other wireless stations a during a first frame time period is a decision to participate in a shared transmission in which the host station will allow one or more wireless stations to operate as guest stations and use at least some of the shared transmission resources in the first trigger based frame while the first wireless stations exclusively uses one or more other resource units of the first trigger based frame to communicate data to a first access point.

Apparatus Embodiment 17 The first wireless station of Apparatus Embodiment 1, wherein transmitting (2414) a first trigger based frame corresponding to the first trigger frame includes transmitting (2416) energy on at least one resource unit in said first trigger based frame while not transmitting any energy on the shared resource units identified by the information in said first trigger frame.

Apparatus Embodiment 18 The first wireless station of Apparatus Embodiment 17, wherein operating (2404) the wireless station to act as a host station further includes: monitoring (2418) for an acknowledgement from a first access point to which said first trigger based frame is transmitted; and receiving (2420) (via wireless receiver 2622) a first acknowledgement from the first access point corresponding to the first trigger based frame.

Apparatus Embodiment 19 The first wireless station of Apparatus Embodiment 18, wherein said first acknowledgment includes an indication whether data was successfully received from the host station on one or more resource units on which the host station transmitted energy, wherein operating (2404) the wireless station to act as a host station further includes: processing (2422) the first acknowledgement to determine if data transmitted in the resource units in said first trigger based frame on which the first wireless station transmitted energy was successfully received without checking to determine if the first access point successfully received data in the shared resource units of the first trigger based frame.

Apparatus Embodiment 20 The first wireless station of Apparatus Embodiment 1, wherein said processor is further configured to: operate (2426) the first wireless station, during a second time period, to act as a guest station, operating the first wireless station as the guest station including: receiving (2428) (via wireless receiver 2622) a second trigger frame from another wireless station; determining (2430) that a second trigger based frame corresponding to the second trigger frame includes one or more sets of shared resource units that are available for use by the first wireless station; transmitting (2458) (via wireless transmitter 2624) data to the first access point in at least one of the one or more sets of shared resource units included in the second trigger based frame.

Apparatus Embodiment 21 The first wireless station of Apparatus Embodiment 20, wherein determining (2430) that a second trigger based frame corresponding to the second trigger frame includes one or more set of shared resource units that are available for use by the first wireless station includes: determining (2432) that a type indicator in said received second trigger frame indicates that the trigger frame is a shared transmission type of trigger frame.

Apparatus Embodiment 22 The first wireless station of Apparatus Embodiment 20, wherein operating (2426) the first wireless station as a guest station further includes: identifying (2434) the shared resource units corresponding to each of one or more set of shared resources units in said second trigger based frame.

Apparatus Embodiment 23 The first wireless station of Apparatus Embodiment 22, wherein identifying (2434) the shared resource units corresponding to each of one or more set of shared resources units in said second trigger based frame includes: identifying (2438) a set of shared resource units in said trigger based frame.

Apparatus Embodiment 24 The first wireless station of Apparatus Embodiment 23, wherein identifying (2438) set of shared resource units in said trigger based frame includes: recovering (2440) information identifying a set of shared resource units from a RU allocation field of a Guest User information field of a User Info List Field of the second trigger frame.

Apparatus Embodiment 25 The first wireless station of Apparatus Embodiment 22, wherein said second trigger frame includes a User Info List field including a Host User Info field and one or more Guest User Info fields.

Apparatus Embodiment 26 The first wireless station of Apparatus Embodiment 22, wherein said second trigger based frame includes two or more sets of shared resource units; and wherein operating (2426) the first wireless station to act as a guest station further includes: selecting (2442) one of said sets of shared resources units to be used by the first wireless station.

Apparatus Embodiment 27 The first wireless station of Apparatus Embodiment 21, wherein operating (2426) the first wireless station to act as a guest station further includes: determining (2444 or 2448) that only a single set of shared resources is available to be used by a guest STA in the second trigger based frame.

Apparatus Embodiment 28 The first wireless station of Apparatus Embodiment 27, wherein said determining (2444) that only a single set of shared resources is available to be used by a guest STA in the second TB frame includes: determining (2446) that only one set of Guest User Information in a Guest User Info Field of a User Info List Field of said second Trigger Frame was received.

Apparatus Embodiment 29 The first wireless station of Apparatus Embodiment 28 wherein operating (2426) the first wireless station to act as a guest station further includes: identifying (2338 and 2440) the single set of shared resource units in said trigger based frame from information included in the RU allocation field of the Guest User Info Field.

Apparatus Embodiment 30 The first wireless station of Apparatus Embodiment 27, wherein said determining (2448) that only a single set of shared resources is available to be used by a guest STA in the second TB frame includes: determining (2450) that receiving a set of Host User information in a Host User Info Field of a User Info List field of the second Trigger frame without receiving any Guest User Info fields in the User Info List field of the second Trigger frame.

Apparatus Embodiment 31 The first wireless station of Apparatus Embodiment 30, wherein operating (2426) the first wireless station to act as a guest station further includes: determining (2452) the single set of shared resources that are available to be used by a guest STA in the second trigger based frame from received information identifying the total resources of the second trigger based frame and information identifying the resource units of the second trigger based frame which the another wireless station has reserved for its own use.

Apparatus Embodiment 32 The first wireless station of Apparatus Embodiment 31, wherein determining (2452) the single set of available guest STA resource units includes: identifying (2454) the single set of shared resources as the resources left over after removing the identified resource units of the second trigger based frame which the another wireless station has reserved for its own use from the total resource units of the trigger based frame.

Apparatus Embodiment 33 The first wireless station of Apparatus Embodiment 20, wherein operating (2426) as the first wireless station as the guest station further includes: receiving (2458) (via wireless receiver 2622) a second acknowledgement from the first access point indicating whether or not the first access point successfully received data transmitted by the first wireless station using one or more shared resource units included in the second trigger based frame.

Apparatus Embodiment 34 The first wireless station of Apparatus Embodiment 33, wherein operating (2426) as the first wireless station as the guest station further includes: determining (2462) from the received second acknowledgement if any of the data transmitted using a shared resource unit of the second trigger based frame was not successfully received (note that that the first wireless stations does this without checking or determining if data transmitted in non-shared resource units of the second trigger based frame were successfully received or acknowledged since such non-shared resource units of the second trigger based frame are not used by the first wireless station to communicate data)

Apparatus Embodiment 35 The first wireless station of Apparatus Embodiment 33, wherein operating (2426) the first wireless station as the guest station further includes: prior to transmitting (2458) data to the first access point in at least one of the one or more shared resource units included in the second trigger frame, identifying (2436) from information in the second trigger frame one or more sets of shared resource units that are included in the second trigger based frame.

Apparatus Embodiment 36 The first wireless station of Apparatus Embodiment 35, wherein operating (2426) the first wireless station as the guest station further includes: identifying (2433) attributes of the second trigger based frame (e.g., the TB frame duration, the number of (non-legacy) STF/LTF of the TB frame, RUs of all shared occasion) from trigger frame fields included in the second trigger frame.

Apparatus Embodiment 37 The first wireless station of apparatus embodiment 36, wherein the processor is further configures as part of operating (2426) the first wireless station as the guest station to control the first wireless station to: generate (1515) a trigger based frame in accordance with one or more of the identified attributes of the second trigger based frame, generating the trigger based frame including generating at least one legacy symbol, said at least one legacy symbol being a Legacy STF symbol, LTF symbol or SIG symbol and generating at least one non-legacy symbol, said non-legacy symbol being a non-legacy STF symbol or non-legacy LTF symbol; and transmit (1516) the generated trigger based frame wherein transmitting the generated trigger based frame includes transmits the generated non-legacy symbol on the shared resources of the non-legacy STF or LTF portion of the generated trigger based frame (e.g. only transmits on the shared resources of the non-legacy STF/LTF).

Second Numbered List of Exemplary Non-Transitory Computer Readable Medium Embodiments:

Non-Transitory Computer Readable Medium Embodiment 1 A non-transitory computer readable medium including computer executable instructions which when executed by a processor of a first wireless station control the first wireless station to perform the steps of: during a first time period, operating (2404) the first wireless station to act as a host station, operating as a host station including: making a decision (2406) to make one or more transmission resources acquired by the first wireless station (e.g., by successfully completing a listen before talk and acquiring the right to transmit or through other means such as by a resource grant to the host station) available for use by one or more other wireless stations a during a first frame time period; transmitting a first trigger frame (2412) including a type indicator indicating that the trigger frame is a shared transmission type of trigger frame and information identifying one or more sets of shared resource units (e.g., where shared resource units are resource units that are available for sharing and are thus available for use by other wireless stations); and transmitting (2414) a first trigger based (TB) frame corresponding to the first trigger frame, said first trigger based frame including a plurality of resource units, transmitting the first trigger based frame including transmitting energy on some but not all of the resource units in said first trigger based frame.

The techniques of various embodiments may be implemented using software, hardware and/or a combination of software and hardware. Various embodiments are directed to apparatus, e.g., user devices such as a user equipment (UE) device, stations, e.g. wireless stations, base stations such as a gNB or ng-eNB, access points, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, stations, e.g. wireless stations, base stations, access points, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., access point, a station, e.g., a wireless station, or a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node or device, e.g., an access point or a station. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device, e.g., an access point or a wireless station, described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating an access point, the method comprising:
receiving a trigger frame from a first host station, said trigger frame indicating that a guest station using a trigger based frame corresponding to the trigger frame is permitted to have a different BSS color than the first host station which transmitted the received trigger frame;
discarding said received trigger frame when a flag in the trigger frame indicates that a guest station using the trigger based frame corresponding to the trigger frame is not permitted to have a different BSS color than the first host station which transmitted the received trigger frame;
receiving, on one or more shared transmission resource units of a first station transmission opportunity, a signal from a first guest station; and
processing the signal received on the one or more shared transmission resource units of the first station transmission opportunity corresponding to the received trigger frame when the flag in the trigger frame indicates that a guest station using the trigger based frame corresponding to the trigger frame is permitted to have a different BSS color than the first host station which transmitted the received trigger frame.

2. The method of claim 1, further comprising:
receiving on unshared transmission resources of the first station transmission opportunity a first trigger based frame transmitted by the first host station.

3. The method of claim 1, further comprising:
transmitting a first management frame, wherein transmitting the first management frame includes transmitting, as part of said first management frame, rule information indicating a rule to be complied with when using guest transmission opportunities that become available during the first station transmission opportunity.

4. The method of claim 1, further comprising:
transmitting a first management frame, wherein transmitting the first management frame includes transmitting, as part of said first management frame, prioritization information for a second transmission opportunity, the second transmission opportunity prioritization information further including second guest station prioritization information, the second guest station prioritization information setting priorities with regard to one or more stations with regard to guest transmission opportunities that become available in the second transmission opportunity.

5. The method of claim 1, further comprising:
determining from first guest transmission opportunity information included in the trigger frame at least one guest transmission opportunity that is authorized by the first host station that is available as a shared transmission opportunity.

6. The method of claim 1, wherein the flag in the trigger frame indicates that a guest station using a trigger based frame corresponding to the trigger frame is permitted to have a different BSS color than the first host station which transmitted the received trigger frame.

7. The method of claim 6, further comprising:
processing signals received on a shared resource unit to determine if a destination media access control (MAC) address corresponding to the shared resource unit is the same as a MAC address of the access point.

8. The method of claim 7, further comprising:
transmitting an acknowledgement frame in response to determining that the destination MAC address corresponding to the shared resource unit is the same as the MAC address of the access point.

9. The method of claim 1, wherein processing the signal received on the one or more shared resource units of the first station transmission opportunity corresponding to the received trigger frame includes:
checking to determine if the signal received on the one or more shared resource units of the first station transmission opportunity communicates a destination media access control (MAC) address matching a MAC address of the access point.

10. The method of claim 9, further comprising:
processing MAC physical data units (PDUs) communicated by the signal transmitted using the one or more shared resource units of the first station transmission opportunity when the one or more shared resource units are determined to communicate the destination MAC address matching the MAC address of the access point.

11. An access point, comprising:
a wireless receiver;
a wireless transmitter; and
a processor configured to operate the access point to:
receive a trigger frame from a first host station indicating that a guest station using a trigger based frame corresponding to the trigger frame is permitted to have a different BSS color than the first host station which transmitted the received trigger frame;
discard said received trigger frame when a flag in the trigger frame indicates that a guest station using the trigger based frame corresponding to the trigger frame is not permitted to have a different BSS color than the first host station which transmitted the received trigger frame;
receive, on one or more shared transmission resource units of a first station transmission opportunity, a signal from a first guest station; and
process the signal received on the one or more shared transmission resource units of the first station transmission opportunity corresponding to the received trigger frame when the flag in the trigger frame indicates that a guest station using the trigger based frame corresponding to the trigger frame is permitted to have a different BSS color than the first host station which transmitted the received trigger frame.

12. The access point of claim 11, wherein said processor is further configured to operate the access point to:
receive on unshared transmission resources of the first station transmission opportunity a first trigger based frame transmitted by the first host station.

13. The access point of claim 11, wherein said processor is further configured to operate the access point to transmit a first management frame, and
wherein said processor is configured to operate the access point to transmit rule information indicating a rule to be complied with when using guest transmission opportunities that become available during the first transmission opportunity, as part of being configured to operate the access point to transmit the first management frame.

14. The access point of claim 11,
wherein said processor is further configured to operate the access point to transmit a first management frame, and
wherein said processor is configured to operate the access point to transmit prioritization information for a second transmission opportunity, as part of being configured to operate the access point to transmit the first management frame, the second transmission opportunity prioritization information further including second guest station prioritization information, the second guest station prioritization information setting priorities with regard to one or more stations with regard to guest transmission opportunities that become available in the second transmission opportunity.

15. The access point of claim 11, wherein said processor is further configured to operate the access point to:
determine from first guest transmission opportunity information included in the trigger frame at least one guest transmission opportunity that is authorized by the first host station that is available as a shared transmission opportunity.

16. The access point of claim 11, wherein the flag in the trigger frame indicates that a guest station using a trigger based frame corresponding to the trigger frame is permitted to have a different BSS color than the first host station which transmitted the received trigger frame.

17. The access point of claim 16, wherein said processor is further configured to operate the access point to:
process signals received on a shared resource unit to determine if a destination media access control (MAC) address corresponding to the shared resource unit is the same as a MAC address of the access point.

18. The access point of claim 16, wherein said processor is further configured to operate the access point to:
transmit an acknowledgement frame in response to determining that the destination media access control (MAC) address corresponding to the shared resource unit is the same as the MAC address of the access point.

19. The access point of claim 18, wherein said processor is configured to operate the access point to:
check to determine if the signal received on the one or more shared transmission resource units of the first station transmission opportunity communicates a destination MAC address matching a MAC address of the access point, as part of being configured to operate the access point to process the signal received on the one or more shared transmission resource units of the first station transmission opportunity corresponding to the received trigger frame.

20. A non-transitory computer readable medium including computer executable instructions which when executed by a processor of an access point control the access point to perform the steps of:
receiving a trigger frame from a first host station indicating that a guest station using a trigger based frame corresponding to the trigger frame is permitted to have a different BSS color than the first host station which transmitted the received trigger frame;
discarding said received trigger frame when a flag in the trigger frame indicates that a guest station using the trigger based frame corresponding to the trigger frame is not permitted to have a different BSS color than the first host station which transmitted the received trigger frame;
receiving, on one or more shared transmission resource units of a first station transmission opportunity, a signal from a first guest station; and
processing the signal received on the one or more shared transmission resource units of the first station transmission opportunity corresponding to the received trigger frame when the flag in the trigger frame indicates that a guest station using the trigger based frame corresponding to the trigger frame is permitted to have a different BSS color than the first host station which transmitted the received trigger frame.

* * * * *